United States Patent
Satori

(10) Patent No.: US 7,675,690 B2
(45) Date of Patent: Mar. 9, 2010

(54) ZOOM LENS SYSTEM AND ELECTRONIC IMAGE PICKUP APPARATUS USING THE SAME

(75) Inventor: Tomoyuki Satori, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 242 days.

(21) Appl. No.: 11/894,520

(22) Filed: Aug. 20, 2007

(65) Prior Publication Data

US 2008/0049333 A1    Feb. 28, 2008

(30) Foreign Application Priority Data

Aug. 25, 2006  (JP) .............................. 2006-229220
Aug. 25, 2006  (JP) .............................. 2006-229300

(51) Int. Cl.
    *G02B 15/14* (2006.01)
(52) U.S. Cl. ..................................... 359/687; 359/683
(58) Field of Classification Search ................. 359/687, 359/686
    See application file for complete search history.

(56) References Cited

U.S. PATENT DOCUMENTS 5,119,237 A * 6/1992 Mihara ...................... 359/676
5,717,526 A * 2/1998 Ohtake ....................... 359/683
6,185,048 B1 * 2/2001 Ishii et al. .................... 359/687
7,315,424 B2 * 1/2008 Saruwatari .................. 359/687
7,319,562 B2 * 1/2008 Itoh ............................ 359/687
7,417,801 B2 * 8/2008 Nakatani et al. ............ 359/687
7,453,650 B2 * 11/2008 Hankawa et al. ........... 359/687
7,457,046 B2 * 11/2008 Hamano et al. ............. 359/687
2006/0268427 A1 * 11/2006 Mihara ........................ 359/686

FOREIGN PATENT DOCUMENTS

| JP | 11-119100 | 4/1999 |
| JP | 2001-133687 | 5/2001 |
| JP | 2004-199000 | 7/2004 |
| JP | 2004-258240 | 9/2004 |

* cited by examiner

*Primary Examiner*—Jordan M. Schwartz
(74) *Attorney, Agent, or Firm*—Kenyon & Kenyon LLP

(57) ABSTRACT

There is disclosed a zoom lens system comprising: in order from an object side, a first lens unit having a positive refractive power; a second lens unit having a negative refractive power; a third lens unit having a positive refractive power; and a fourth lens unit having a refractive power, during zooming from a wide-angle end to a telephoto end, a space between the first lens unit and the second lens unit, a space between the second lens unit and the third lens unit and a space between the third lens unit and the fourth lens unit are changed, and the second lens unit includes two lenses of a negative lens and a positive lens in order from the object side.

49 Claims, 21 Drawing Sheets

ZOOM LENS SYSTEM AND ELECTRONIC IMAGE PICKUP APPARATUS USING THE SAME

CROSS REFERENCE TO RELATED APPLICATIONS

This application claims benefit under 35 U.S.C. §119 of Japanese patent application of No. 2006-229,220 filed in Japan on Aug. 25, 2006, and Japanese patent application of No. 2006-229,300 filed in Japan on Aug. 25, 2006, the contents of which are incorporated herein by reference.

BACKGROUND OF THE INVENTION

1. Field of the Invention

The present invention relates to a zoom lens system and an electronic image pickup apparatus using the zoom lens system.

2. Description of the Related Art

In recent years, instead of a silver halide film camera, a digital camera has been a mainstream which photographs a subject by use of an electronic image pickup device such as a CCD image sensor or a CMOS type image sensor. Furthermore, the camera has a large number of categories in a broad range from a highly functional type for business to a compact popular type. A user of the popular type of digital camera would like to readily enjoy photographing in various scenes anywhere and anytime. Therefore, the user would like a small-sized camera, especially a digital camera of a thin type which is conveniently carried with a good storage property in clothing, a bag pocket or the like and which has a small size in a thickness direction.

On the other hand, a zoom ratio of the digital camera of the compact type has been generally about three, but there is a demand for a camera having a higher zoom ratio. As a zoom lens system which easily retains a comparatively high zoom ratio, a type is known which has, in order from an object side, a first lens unit having a positive refractive power, a second lens unit having a negative refractive power, a third lens unit having a positive refractive power and a fourth lens unit having a positive refractive power.

Moreover, since a size of the camera in a thickness direction is mainly determined by a size of a lens barrel, thinning of the lens barrel is effective in order to achieve the thinned camera.

In recent years, a so-called collapsible lens barrel of the camera has been generalized which is projected from a camera body when used and which is stored in the camera body when carried. Therefore, there is a demand for the zoom lens system in which the thinning of the lens barrel when collapsed is considered. In, for example, Japanese Patent Application Laid-Open Nos. 2004-258,240, 2004-199,000, 2001-133,687 and 11-119,100, a zoom lens system is disclosed in which a second lens unit includes two lenses of a negative lens and a positive lens, so that the size of the second lens unit in the thickness direction is reduced.

BRIEF SUMMARY OF THE INVENTION

In a first aspect, a zoom lens system according to the present invention comprises, in order from an object side, a first lens unit having a positive refractive power, a second lens unit having a negative refractive power, a third lens unit having a positive refractive power and a fourth lens unit having a refractive power.

During zooming from a wide-angle end to a telephoto end, a space between the first lens unit and the second lens unit, a space between the second lens unit and the third lens unit and a space between the third lens unit and the fourth lens unit are changed.

The second lens unit includes two lenses of a negative lens and a positive lens in order from the object side.

The following conditions are satisfied:

$$1.88 < n_{d2p} < 2.20 \quad (1A); \text{ and}$$

$$13.0 < v_{d2p} < 30.0 \quad (2A),$$

in which $n_{d2p}$ is a refractive index of the positive lens of the second lens unit for the d-line, and $v_{d2p}$ is the Abbe number of the positive lens of the second lens unit.

In a second aspect, a zoom lens system according to the present invention comprises, in order from an object side, a first lens unit having a positive refractive power, a second lens unit having a negative refractive power, a third lens unit having a positive refractive power and a fourth lens unit having a refractive power.

During zooming from a wide-angle end to a telephoto end, a space between the first lens unit and the second lens unit, a space between the second lens unit and the third lens unit and a space between the third lens unit and the fourth lens unit are changed.

The first lens unit includes a positive lens and a negative lens, and the total number of the lenses of the first lens unit is two.

The second lens unit includes a negative lens and a positive lens in order from the object side, and the total number of the lenses of the second lens unit is two.

Moreover, the following conditions are satisfied:

$$1.78 < n_{d2n} < 2.10 \quad (1B); \text{ and}$$

$$35.0 < v_{d2n} < 50.0 \quad (2B),$$

in which $n_{d2n}$ is a refractive index of the negative lens of the second lens unit for the d-line, and $v_{d2n}$ is the Abbe number of the negative lens of the second lens unit.

In the first aspect, the zoom lens system can be provided which includes a small number of the lenses of the second lens unit to provide a compact constitution and in which an optical performance is easily maintained.

In the second aspect, the zoom lens system can be provided which includes a small number of the lenses of the first lens unit and a small number of the lenses of the second lens unit to provide a compact constitution and in which the optical performance is easily maintained.

Moreover, an electronic image pickup apparatus can be provided which is easily miniaturized by use of these zoom lens systems.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a sectional view of the system in a wide-angle end, FIG. 1B is a sectional view of the system in an intermediate position, and FIG. 1C is a sectional view of the system in a telephoto end;

FIG. 2A is a sectional view of the system in a wide-angle end, FIG. 2B is a sectional view of the system in an intermediate position, and FIG. 2C is a sectional view of the system in a telephoto end;

FIG. 3A is a sectional view of the system in a wide-angle end, FIG. 3B is a sectional view of the system in an intermediate position, and FIG. 3C is a sectional view of the system in a telephoto end;

FIG. 4A is a sectional view of the system in a wide-angle end, FIG. 4B is a sectional view of the system in an intermediate position, and FIG. 4C is a sectional view of the system in a telephoto end;

FIG. 5A is a sectional view of the system in a wide-angle end, FIG. 5B is a sectional view of the system in an intermediate position, and FIG. 5C is a sectional view of the system in a telephoto end;

FIG. 6A is a sectional view of the system in a wide-angle end, FIG. 6B is a sectional view of the system in an intermediate position, and FIG. 6C is a sectional view of the system in a telephoto end;

FIG. 7A is a sectional view of the system in a wide-angle end, FIG. 7B is a sectional view of the system in an intermediate position, and FIG. 7C is a sectional view of the system in a telephoto end;

FIG. 8A is a sectional view of the system in a wide-angle end, FIG. 8B is a sectional view of the system in an intermediate position, and FIG. 8C is a sectional view of the system in a telephoto end;

FIG. 9A is a sectional view of the system in a wide-angle end, FIG. 9B is a sectional view of the system in an intermediate position, and FIG. 9C is a sectional view of the system in a telephoto end;

FIG. 10A shows a state of the wide-angle end, FIG. 10B shows a state of the intermediate position, and FIG. 10C shows a state of the telephoto end;

FIG. 11A shows a state of the wide-angle end, FIG. 11B shows a state of the intermediate position, and FIG. 11C shows a state of the telephoto end;

FIG. 12A shows a state of the wide-angle end, FIG. 12B shows a state of the intermediate position, and FIG. 12C shows a state of the telephoto end;

FIG. 13A shows a state of the wide-angle end, FIG. 13B shows a state of the intermediate position, and FIG. 13C shows a state of the telephoto end;

FIG. 14A shows a state of the wide-angle end, FIG. 14B shows a state of the intermediate position, and FIG. 14C shows a state of the telephoto end;

FIG. 15A shows a state of the wide-angle end, FIG. 15B shows a state of the intermediate position, and FIG. 15C shows a state of the telephoto end;

FIG. 16A shows a state of the wide-angle end, FIG. 16B shows a state of the intermediate position, and FIG. 16C shows a state of the telephoto end;

FIG. 17A shows a state of the wide-angle end, FIG. 17B shows a state of the intermediate position, and FIG. 17C shows a state of the telephoto end;

FIG. 18A shows a state of the wide-angle end, FIG. 18B shows a state of the intermediate position, and FIG. 18C shows a state of the telephoto end;

DETAILED DESCRIPTION OF THE PREFERRED EMBODIMENT

Figure 1A:
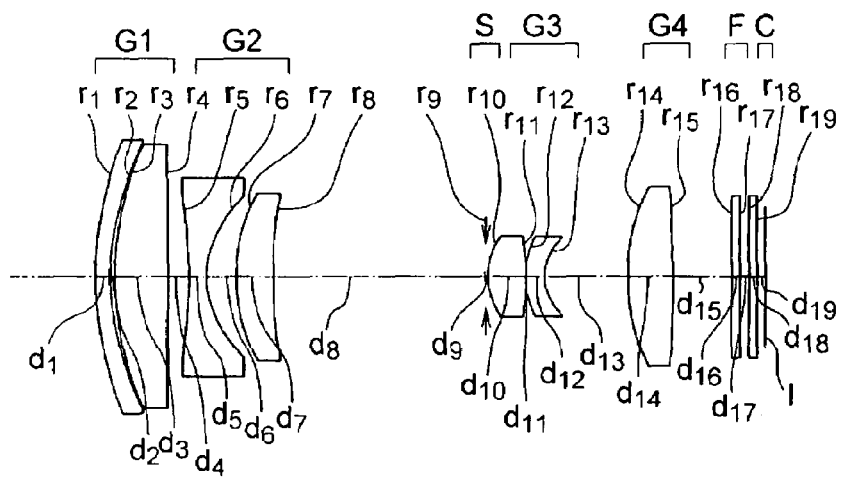
FIGS. 1A to 1C are sectional views of Example 1 of a zoom lens system including an optical axis according to the present invention when focused at infinity.

In a first aspect, a zoom lens system according to the present invention comprises, in order from an object side, a first lens unit having a positive refractive power, a second lens unit having a negative refractive power, a third lens unit having a positive refractive power and a fourth lens unit having a refractive power. During zooming from a wide-angle end to a telephoto end, a space between the first lens unit and the second lens unit, a space between the second lens unit and the third lens unit and a space between the third lens unit and the fourth lens unit are changed. The second lens unit includes two lenses of a negative lens and a positive lens in order from the object side, and satisfies the following conditions (1A) and (2A):

$$1.88 < n_{d2p} < 2.20 \quad (1A); \text{ and}$$

$$13.0 < v_{d2p} < 30.0 \quad (2A),$$

in which $n_{d2p}$ is a refractive index of the positive lens of the second lens unit for the d-line, and $v_{d2p}$ is the Abbe number of the positive lens of the second lens unit.

As described above, the zoom lens system has, in order from the object side, the first lens unit having the positive refractive power, the second lens unit having the negative refractive power, the third lens unit having the positive refractive power and the fourth lens unit having the positive refractive power, and the space between the units is changed to perform the zooming. Since such a constitution is adopted, burdens of a zooming function can efficiently be shared by the lens units. This reduces aberration fluctuations during the zooming. A movement amount of each lens unit is prevented from being excessively enlarged, and the zoom lens system can be constituted to be compact.

Moreover, since the second lens unit includes two lenses of the negative lens and the positive lens in order from the object side, a size of the lens unit in a thickness direction can be reduced, and a size of the unit in a diametric direction can also be reduced. An incidence height of an off-axial from an optical axis ray easily increases in the second lens unit. Therefore, when a necessary thickness of an edge of the lens is to be secured, an axial thickness of the lens unit tends to easily increase.

Furthermore, when the number of the lenses of the second lens unit increases, the height of the off-axial ray passing through the second lens unit further increases, and a larger axial thickness is required in order to secure the thickness of the edge. Needless to say, when the number of the lenses of the second lens unit increases, the axial thickness accordingly increases.

From such a viewpoint, the constitution in which the number of the lenses constituting the second lens unit is as small as two is advantageous in reducing the size of this lens unit in the diametric direction and the axial thickness of the unit and achieving a compact lens barrel in a collapsed state.

Moreover, to sufficiently correct aberrations even in a case where the second lens unit includes two lenses, the positive lens of the second lens unit is constituted so as to satisfy the conditions (1A) and (2A). They are conditions concerning the refractive index for the d-line and the Abbe number of the positive lens of the second lens unit.

Since a large burden of the zooming function is easily imposed on the second lens unit, the unit has a large negative power in many cases. Therefore, to correct the aberrations generated in the negative lens of the second lens unit with one positive lens, it is effective to appropriately set the refractive index and dispersion of this lens.

The condition (1A) is a condition concerning the correction of a curvature of field and a coma, and cost. When $n_{d2p}$ is not above an upper limit of the condition (1A), the cost of a material for use and a manufacturing cost are easily reduced. If $n_{d2p}$ exceeds the upper limit of the condition (1A), the material for use becomes expensive, and is not easily processed.

In a case where $n_{d2p}$ is not below a lower limit of the condition (1A), even when a curvature of a lens surface is reduced, the refractive power is easily secured.

As a result, the curvature of field in the wide-angle end is reduced, the coma and the like generated by the positive lens itself can be reduced, and the generation of the coma and the like in the wide-angle end and telephoto end and aberration fluctuations during the zooming are easily reduced.

The condition (2A) is a condition concerning the correction of a chromatic aberration, especially the correction of an off-axial chromatic aberration of magnification. It is preferable to impart appropriate dispersion to the positive lens in order to satisfactorily correct the chromatic aberration generated by the negative lens of the second lens unit in this lens unit.

When $v_{d2p}$ is not above an upper limit of the condition (2A), the dispersion of the positive lens is secured to cancel the chromatic aberration generated by the negative lens of the second lens unit. In consequence, color blur of a shot image is preferably reduced.

When $v_{d2p}$ is not below a lower limit of the condition (2A), the dispersion at a short wavelength region is inhibited from being excessively enlarged. In consequence, the color blur due to a secondary spectrum is preferably reduced.

It is further preferable to satisfy the following conditions:

$$1.90 < n_{d2p} < 2.16 \quad (1A'); \text{ and}$$

$$15.0 < v_{d2p} < 25.0 \quad (2A').$$

It is still further preferable to satisfy the following conditions:

$$1.92 < n_{d2p} < 2.11 \quad (1A''); \text{ and}$$

$$17.0 < v_{d2p} < 21.0 \quad (2A'').$$

It is to be noted that combining of upper limit values and lower limit values of a plurality of conditions concerning the same parameter to set a new condition belongs to matters disclosed in the present application. That is, the combining of the lower limit value of the condition (1A) and the upper limit value of the condition (1A') to set a new condition "$1.88 < n_{d2p} < 2.16$" falls in the scope of the present application. This applies to not only the illustrated condition concerning $n_{d2p}$ but also a condition concerning another parameter.

To obtain a satisfactory optical performance efficiently while realizing a compact constitution, in addition to the above-mentioned inventive implementation, it is more preferable to provide various additional inventive implementations. Details will be described hereinafter.

To correct the aberration of the second lens unit more effectively, it is preferable that the positive lens of the second lens unit has a convex meniscus shape on the object side to reduce an incidence angle of an off-axial light flux. At this time, it is preferable that the shape of the positive lens of the second lens unit satisfies the following condition (3A):

$$-5.0 < SF_{2p} < -1.0 \quad (3A),$$

in which $SF_{2p}$ is defined by $SF_{2p} = (R_{2pf} + R_{2pr})/(R_{2pf} - R_{2pr})$, $R_{2pf}$ is a paraxial radius of curvature of an object-side surface of the positive lens of the second lens unit, and $R_{2pr}$ is a paraxial radius of curvature of an image-side surface of the positive lens of the second lens unit.

When $SF_{2p}$ is not above an upper limit of the condition (3A) and the curvature of the object-side surface of this lens is secured, an astigmatism in the wide-angle end and a spherical aberration in the telephoto end are advantageously corrected.

When $SF_{2p}$ is not below a lower limit of the condition (3A) and the curvature of the lens surface is inhibited from being excessively enlarged, generation of an off-axial high-order aberration is easily inhibited. Specifically, an off-axial curvature of field and the chromatic aberration of magnification are preferably reduced.

It is further preferable to satisfy the following condition:

$$-3.8 < SF_{2p} < -1.4 \quad (3A').$$

It is still further preferable to satisfy the following condition:

$$-2.6 < SF_{2p} < -1.8 \quad (3A'').$$

It is preferable that the power of the second lens unit satisfies the following condition (4A):

$$0.12 < |f_2/f_t| < 0.60 \quad (4A),$$

in which $f_2$ is a focal length of the second lens unit and $f_t$ is a focal length of the zoom lens system in the telephoto end.

When $|f_2/f_t|$ is not above an upper limit of the condition (4A), the power of the second lens unit can be secured, a zoom ratio is easily obtained with respect to a change amount of the space between the first lens unit and the second lens unit, and this is advantageous in obtaining the compact lens barrel.

Moreover, it is preferable to set $|f_2/f_t|$ so that the value is not below a lower limit of the condition (4A). In consequence, the power of the second lens unit is reduced to reduce the aberrations.

It is further preferable to satisfy the following condition:

$$0.18 < |f_2/f_t| < 0.49 \quad (4A').$$

It is still further preferable to satisfy the following condition:

$$0.24 < |f_2/f_t| < 0.38 \quad (4A'').$$

It is preferable that the negative lens of the second lens unit satisfies the following conditions (5A) and (6A):

$$1.76 < n_{d2n} < 2.00 \quad (5A); \text{ and}$$

$$35.0 < v_{d2n} < 50.0 \quad (6A),$$

in which $n_{d2n}$ is a refractive index of the negative lens of the second lens unit for the d-line, and $v_{d2n}$ is the Abbe number of the negative lens of the second lens unit.

The condition (5A) is a condition concerning a balance between the cost and an aberration correcting function.

When $n_{d2n}$ is not above an upper limit of the condition (5A), the cost of the material for use and the manufacturing cost are easily reduced. If $n_{d2n}$ is above the upper limit of the condition (5A), the material for use becomes expensive, and is not easily processed.

In a case where $n_{d2n}$ is not below a lower limit of the condition (5A), even when the curvature of the lens surface is reduced, the negative refractive power is easily secured.

As a result, a barrel type distortion in the wide-angle end is inhibited from being excessively enlarged, the coma and the like generated by the negative lens itself can be reduced, and the generation of the coma and the like in the wide-angle end and telephoto end and the aberration fluctuations during the zooming are easily reduced.

The condition (6A) is a condition concerning the correction of the chromatic aberration, especially the correction of the off-axial chromatic aberration of magnification.

It is preferable to set $v_{d2n}$ so that the value is not above an upper limit of the condition (6A). In consequence, the refractive index of the material for use is secured, and the aberrations are easily corrected. If $v_{d2n}$ exceeds the upper limit of the condition (6A), the chromatic aberration is advantageously corrected, but the existing lens material easily has a reduced refractive index.

It is preferable to set $v_{d2n}$ so that the value is not below a lower limit of the condition (6A). In consequence, color dispersion is reduced to easily reduce the chromatic aberration.

It is further preferable to satisfy the following conditions:

$$1.78 < n_{d2n} < 1.95 \quad (5A'); \text{ and}$$

$$39.0 < v_{d2n} < 45.0 \quad (6A').$$

It is still further preferable to satisfy the following conditions:

$$1.80 < n_{d2n} < 1.90 \quad (5A''); \text{ and}$$

$$40.0 < v_{d2n} < 43.0 \quad (6A'').$$

In a case where the zoom lens system has a constitution in which the second lens unit includes only two lenses of a negative lens and a positive lens, the negative lens of the second lens unit bears a large negative power. To secure a high optical performance in the whole zooming region, it is preferable to reduce the aberrations generated in this negative lens as much as possible.

For this purpose, it is preferable that this lens is a double-concave lens and is provided with a large power. Furthermore, it is preferable that the lens is formed into such a shape as to satisfy the following condition (7A):

$$0.35 < SF_{2n} < 1.00 \quad (7A),$$

in which $SF_{2n}$ is defined by $SF_{2n}=(R_{2nf}+R_{2nr})/(R_{2nf}-R_{2nr})$, $R_{2nf}$ is a paraxial radius of curvature of an object-side surface of the negative lens of the second lens unit, and $R_{2nr}$ is a paraxial radius of curvature of an image-side surface of the negative lens of the second lens unit.

When $SF_{2n}$ is not above an upper limit of the condition (7A) and a curvature of the image-side surface of the negative lens is reduced, the generation of the curvature of field in the wide-angle end is easily suppressed. The axial thickness of the second lens unit is easily reduced. Moreover, an angle of view is easily secured.

When $SF_{2n}$ is not below a lower limit of the condition (7A) and a negative curvature of the object-side surface of the negative lens is reduced, off-axial aberrations in the wide-angle end are easily reduced.

It is further preferable to satisfy the following condition:

$$0.45 < SF_{2n} < 0.85 \quad (7A').$$

It is still further preferable to satisfy the following condition:

$$0.55 < SF_{2n} < 0.70 \quad (7A'').$$

Moreover, to suppress the generation of the aberration and obtain a satisfactory optical performance, it is preferable that an aspherical surface is arranged on at least one lens surface of the negative lens of the second lens unit. Both of the object-side surface and the image-side surface of this negative lens may be aspherical surfaces.

In this case, it is further preferable to satisfy the following condition (8A):

$$0.030 < (|ASP_{2nf}|+|ASP_{2nr}|)/f_w < 0.320 \quad (8A),$$

in which $ASP_{2nf}$ is an aspherical displacement of the object-side lens surface of the negative lens of the second lens unit, $ASP_{2nr}$ is an aspherical displacement of the image-side lens surface of the negative lens of the second lens unit, and $f_w$ is a focal length of the zoom lens system in the wide-angle end.

The aspherical displacement is a distance from the reference spherical surface and the lens surface, which is measured in parallel with an optical axis at a position of the maximum incidence height of a ray entering the lens surface in the wide-angle end. A distance measured toward the image side is represented by a positive sign. Here, the reference spherical surface has a radius of curvature equal to a paraxial radius of curvature of the lens surface, and a vertex of this spherical surface comes in contact with the lens surface. The aspherical displacement in a case where the lens surface is a spherical surface or a flat surface is zero.

When $(|ASP_{2nf}|+|ASP_{2nr}|)/f_w$ is not above an upper limit of the condition (8A) and a sum of absolute values of the aspherical displacements is not excessively large, deterioration of the optical performance at a time when eccentricity is generated between the aspherical lens surfaces owing to a manufacturing error can easily be inhibited.

It is preferable to set $(|ASP_{2nf}|+|ASP_{2nr}|)/f_w$ so that the value is not below a lower limit of the condition (8A). In consequence, the sum of the absolute values of the aspherical displacement is secured, and an aberration correcting function due to the aspherical surface is secured.

It is further preferable to satisfy the following condition:

$$0.040<(|ASP_{2nf}|+|ASP_{2nr}|)/f_w<0.250 \quad (8A').$$

It is still further preferable to satisfy the following condition:

$$0.050<(|ASP_{2nf}|+|ASP_{2nr}|)/f_w<0.180 \quad (8A'').$$

Moreover, it is preferable that the aspherical surface of the negative lens of the second lens unit is an aspherical surface, a refractive power of a portion of which increases as the portion comes away from the optical axis. Here, "the refractive power increases" means that the negative refractive power is reduced or that the positive refractive power increases. In consequence, the distortion and the coma in the wide-angle end are easily reduced.

Furthermore, it is preferable that the negative lens of the second lens unit is a double-concave lens and that each of the object-side surface and the image-side surface of the double-concave lens is an aspherical surface, a refractive power of a portion of which increases as the portion comes away from the optical axis.

This is advantageous in achieving both of reduction of thicknesses of a central portion and a peripheral portion of the second lens unit and reduction of aberrations of the second lens unit.

Moreover, it is preferable that the first lens unit includes two or less lenses.

In the first lens unit, the height of the off-axial ray from the optical axis is large in the same manner as in the second lens unit. Therefore, to secure a necessary thickness of an edge of the lens, the axial thickness easily increases. When the number of the lenses increases, the off-axial ray height further increases. To secure the edge thickness, a larger axial thickness is required. Since the number of the lenses increases, the axial thickness also increases.

Therefore, as the number of the lenses increases, the size of the first lens unit in the diametric direction and the axial thickness of the unit increase. From such a viewpoint, it is preferable that the first lens unit includes two or less lenses to miniaturize the system.

Furthermore, a constitution in which the first lens unit includes two lenses of a negative lens and a positive lens in order from the object side is advantageous in achieving a compact lens barrel while reducing the chromatic aberration and the like.

Moreover, when the negative lens and the positive lens are arranged in this order, fluctuations of the aberrations due to the zooming are easily reduced while imparting a chromatic aberration correcting function to the unit.

The negative lens may be cemented to the positive lens in the first lens unit. When the unit includes the cemented lens, it is possible to efficiently correct the axial chromatic aberration which easily raises a problem in a case where the zoom ratio is increased to increase the focal length in the telephoto end. The deterioration of the optical performance due to lens relative eccentricity caused by an assembly error can be inhibited. This contributes to improvement of yield and reduction of the cost.

The negative lens and the positive lens of the first lens unit may be single lenses which are not cemented to each other. In consequence, the first lens unit has four refractive surfaces, and a degree of freedom of design improves. Therefore, the distortion in the wide-angle end and the coma in the telephoto end can more effectively be corrected.

Moreover, it is preferable that the space between the negative lens and the positive lens of the first lens unit satisfies the following condition (9A):

$$0.0<L_{1np}/L_1<0.2 \quad (9A),$$

in which $L_{1np}$ is the axial space between the negative lens and the positive lens of the first lens unit, and $L_1$ is a total axial thickness of the first lens unit.

When $L_{1np}/L_1$ is not above an upper limit of the condition (9A), the height of the off-axial ray which passes through the lens closest to the object side is reduced to reduce an effective diameter of this lens. In consequence, the whole zoom lens system can be constituted to be compact in the diametric direction. It is not realistic that $L_{1np}/L_1$ is below the lower limit of the condition (9A).

It is further preferable to satisfy the following condition:

$$0.0<L_{1np}/L_1<0.15 \quad (9A').$$

It is still further preferable to satisfy the following condition:

$$0.0<L_{1np}/L_1<0.10 \quad (9A'').$$

It is preferable that the third lens unit includes three or less lenses in order to thin the lens barrel.

To minimize the zoom lens system, it is preferable that the third lens unit includes two lenses of a positive lens and a negative lens in order from the object side.

When the third lens unit includes the minimum number of the lenses for the correction of aberrations such as the chromatic aberration generated in the lens unit, the lens barrel is thinned. According to such a lens arrangement, a front principal point can be positioned closer to an object, a zoom ratio can easily be secured, and a movement amount of the lens unit can easily be reduced. The constitution is advantageous in achieving compactness also from this respect.

To secure a higher optical performance, the third lens unit may include three lenses of a positive lens, a positive lens and a negative lens in order from the object side. According to such a lens arrangement, the positive power of the third lens unit can mainly be shared by two positive lenses. The arrangement is advantageous in correcting the spherical aberration and the coma.

Moreover, it is preferable that the negative lens of the third lens unit is cemented to the adjacent positive lens on the object side. When the positive lens is cemented to the negative lens, the axial chromatic aberration can more effectively be corrected. Furthermore, the deterioration of the optical performance due to the relative eccentricity between the lenses in an assembly process can be prevented. Therefore, the improvement of the yield and the reduction of the cost are achieved.

When one or more aspherical surfaces are arranged in the third lens unit, the spherical aberration and the coma are effectively corrected. It is more preferable that opposite surfaces of the positive lens of the third lens unit closest to the object side are aspherical surfaces.

When the aspherical surfaces are arranged at a plurality of lenses, the optical performance is largely deteriorated owing to the relative eccentricity between the lenses. However, when opposite side surfaces of one lens are aspherical surfaces in this manner, the deterioration of the optical performance due to the lens relative eccentricity can be reduced, and the spherical aberration and the coma can more satisfactorily be corrected.

Especially, when the third lens is constituted of two lenses, the aspherical surfaces are advantageous to improve a degree of freedom of design. This constitution is preferable in achieving both of the miniaturization and the securing of the optical performance.

Moreover, from a viewpoint of a balance between the compact constitution and the optical performance, it is preferable that the first lens unit satisfies the following condition (10A):

$$0.50 < f_1/f_t < 2.00 \tag{10A}$$

in which $f_1$ is a focal length of the first lens unit, and $f_t$ is a focal length of the zoom lens system in the telephoto end.

In a case where $f_1/f_t$ is set so that the value does not exceed an upper limit of the condition (10A) to secure the power of the first lens unit, the total length of the zoom lens system is easily reduced, and this is advantageous in miniaturizing the lens barrel.

In a case where $f_1/f_t$ is set so that the value is not below a lower limit of the condition (10A) to reduce the power of the first lens unit, the generation of the spherical aberration and the coma in the telephoto end is easily suppressed, and a satisfactory optical performance is easily secured.

It is further preferable to satisfy the following condition:

$$0.75 < f_1/f_t < 1.80 \tag{10A'}$$

It is still further preferable to satisfy the following condition:

$$0.95 < f_1/f_t < 1.60 \tag{10A''}$$

It is preferable that the power of the third lens unit satisfies the following condition (11A):

$$0.16 < f_3/f_t < 0.80 \tag{11A}$$

in which $f_3$ is a focal length of the third lens unit, and $f_t$ is a focal length of the zoom lens system in the telephoto end.

It is preferable to set $f_3/f_t$ so that the value is not above an upper limit of the condition (11A). In consequence, the power of the third lens unit is secured, and the zooming burden on the third lens unit is secured. This is advantageous for the miniaturization.

It is preferable to set $f_3/f_t$ so that the value is not below a lower limit of the condition (11A). In consequence, the power of the third lens unit is appropriately reduced, and the generation of the aberration in the third lens unit is suppressed.

It is further preferable to satisfy the following condition:

$$0.23 < f_3/f_t < 0.60 \tag{11A'}$$

It is still further preferable to satisfy the following condition:

$$0.30 < f_3/f_t < 0.40 \tag{11A''}$$

It is preferable that the power of the fourth lens unit satisfies the following condition (12A) so as to secure telecentricity and correct the curvature of field:

$$0.24 < f_4/f_t < 0.80 \tag{12A}$$

in which $f_4$ is a focal length of the fourth lens unit, and $f_t$ is a focal length of the whole zoom lens system in the telephoto end.

It is preferable to set $f_4/f_t$ so that the value is not above an upper limit of the condition (12A). In consequence, the power of the fourth lens unit can be secured to secure the telecentricity on the image side, and the curvature of field can be inhibited from being overcorrected.

It is preferable to set $f_4/f_t$ so that the value is not below a lower limit of the condition (12A). In consequence, the power of the fourth lens unit is appropriately reduced, and the curvature of field is inhibited from being undercorrected.

It is further preferable to satisfy the following condition:

$$0.36 < f_4/f_t < 0.70 \tag{12A'}$$

It is still further preferable to satisfy the following condition:

$$0.48 < f_4/f_t < 0.62 \tag{12A''}$$

The fourth lens unit may be formed of a plastic material. A main function of the fourth lens unit is that an exit pupil is arranged at an appropriate position so as to allow a ray to efficiently enter an electronic image pickup device such as a CCD image sensor or a CMOS type image sensor. For such a function, a very large power is not required. Therefore, when the power of the fourth lens unit is set in a range of the condition (12A), the unit can be constituted using a material such as the plastic material having a small refractive index.

When the plastic lens is used in the fourth lens unit, the cost can be reduced, and it is possible to provide a more inexpensive zoom lens system.

To increase the zoom ratio while the performance of the system is maintained, the zooming function is efficiently imparted to each lens unit. Moreover, the aberration can more effectively be corrected satisfactorily over the whole zooming region.

Therefore, it is more preferable that during the zooming from the wide-angle end to the telephoto end, the first, second, third and fourth lens units move so that the space between the first lens unit and the second lens unit enlarges, the space between the second lens unit and the third lens unit narrows and the space between the third lens unit and the fourth lens unit enlarges. In addition, it is preferable that the zoom lens system has an aperture stop which moves together with the third lens unit in an optical axis direction during the zooming, that is, which moves when the third lens unit moves in an optical axis direction during the zooming.

When the lens units are moved in this manner, the zooming function can effectively be imparted to each lens unit. Even when the zoom ratio is increased, the high performance can advantageously be achieved.

When the aperture stop is moved together with the third lens unit, the chromatic aberration of magnification and the distortion can effectively be corrected, and an effect can be produced in respect of the performance. Moreover, it is possible to appropriately control positions of an entrance pupil and the exit pupil.

That is, the ray height of the off-axial light flux in the wide-angle end and the ray height of the off-axial light flux in the telephoto end are balanced. An outer diameter of the first lens unit and an outer diameter of the fourth lens unit can be reduced with good balance. Especially, the reduction of the outer diameter of the first lens unit in the wide-angle end is effective in reducing the size of each lens in the thickness direction. Fluctuations of the position of the exit pupil during the zooming can be controlled and reduced. Therefore, the incidence angle of the ray which enters the image pickup device (e.g., the CCD image sensor, the CMOS type image sensor or the like) can be kept in an appropriate range, and generation of shading of brightness at a corner of an image surface can be prevented. The system is suitable for the electronic image pickup apparatus.

Furthermore, to reduce the total length of the zoom lens system and obtain a satisfactory aberration balance and the like, during the zooming from the wide-angle end to the telephoto end, it is preferable to move the first lens unit so that the unit is positioned closer to the object side in the telephoto end than in the wide-angle end. In this case, the unit may be moved toward only the object side or along a locus convex toward the image side.

The second lens unit may be moved toward only the image side or along a locus convex toward the image side.

The third lens unit may be moved toward only the object side.

The fourth lens unit may be moved toward only the object or image side. Alternatively, the fourth lens unit may be moved along a locus convex toward the object or image side.

The aperture stop and a shutter unit may be arranged between the second lens unit and the third lens unit, and may be moved integrally with the third lens unit during the zooming, that is, may be moved with the third lens unit in a manner that the positional relationship between the aperture stop and the third lens unit is fixed during the zooming.

The entrance pupil can be disposed at a position close to the object side (a shallow position), and the exit pupil can easily be disposed away from the image surface. Moreover, since the height of the off-axial ray is lowered between the second lens unit and the third lens unit, the shutter unit does not have to be enlarged, and a dead space at a time when the aperture stop and the shutter unit are moved can be reduced.

Moreover, it is preferable that the zoom lens system is a four-unit zoom lens system, so that the total number of the lens units constituting the zoom lens system is four.

The reduction of the number of the lens units to four is preferable for the miniaturization of the system at a time when the lens barrel is collapsed.

Moreover, it is preferable that the zoom lens system satisfies the following condition (13A):

$$3.8 < f_t/f_w < 10.0 \tag{13A},$$

in which $f_w$ is a focal length of the zoom lens system in the wide-angle end, and $f_t$ is a focal length of the zoom lens system in the telephoto end.

When $f_t/f_w$ is not above an upper limit of the condition (13A), the movement amount of the lens unit is easily reduced, and the total length is easily reduced.

When $f_t/f_w$ is not below a lower limit of the condition (13A), a sufficient zoom ratio can be secured, and photographing can be performed with a changed angle of view, while utilizing the above-mentioned merits of the zoom lens system in respect of the size and the cost.

It is further preferable to satisfy the following condition:

$$4.3 < f_t/f_w < 7.0 \tag{13A'}.$$

It is still further preferable to satisfy the following condition:

$$4.7 < f_t/f_w < 5.0 \tag{13A''}.$$

Next, a second aspect of the zoom lens system according to the present invention will be described. In the second aspect, the zoom lens system comprises, in order from an object side, a first lens unit having a positive refractive power, a second lens unit having a negative refractive power, a third lens unit having a positive refractive power and a fourth lens unit having a refractive power. During zooming from a wide-angle end to a telephoto end, a space between the first lens unit and the second lens unit, a space between the second lens unit and the third lens unit and a space between the third lens unit and the fourth lens unit are changed. The first lens unit includes a positive lens and a negative lens, and the total number of the lenses of the first lens unit is two. The second lens unit includes a negative lens and a positive lens in order from the object side, and the total number of the lenses of the second lens unit is two. Moreover, the following conditions are satisfied:

$$1.78 < n_{d2n} < 2.10 \tag{1B); and}$$

$$35.0 < v_{d2n} < 50.0 \tag{2B},$$

in which $n_{d2n}$ is a refractive index of the negative lens of the second lens unit for the d-line, and $v_{d2n}$ is the Abbe number of the negative lens of the second lens unit.

As described above, the zoom lens system has, in order from the object side, the first lens unit having the positive refractive power, the second lens unit having the negative refractive power, the third lens unit having the positive refractive power and the fourth lens unit having the positive refractive power, and each space between the lens units is changed to perform the zooming. Since such a constitution is adopted, burdens of a zooming function can efficiently be shared by the lens units. This reduces aberration fluctuations during the zooming. A movement amount of each lens unit is prevented from being enlarged, and the zoom lens system can be constituted to be compact.

Moreover, the first lens unit includes two lenses of the positive lens and the negative lens, and the second lens unit includes two lenses of the negative lens and the positive lens in order from the object side. In consequence, a size of the lens unit in a thickness direction can be reduced, and a size of the unit in a diametric direction can also be reduced.

An incidence height of an off-axial ray from an optical axis easily increases in the first and second lens units. Therefore, when a necessary thickness of an edge of the lens is to be secured, an axial thickness of the lens unit tends to easily increase. When the number of the lenses of the first and second lens units increases, the height of the off-axial ray passing through these lens units further increases, and a larger axial thickness is required for securing the edge thickness. Needless to say, when the number of the lenses of the first and second lens units increases, the axial thickness also increases.

From such a viewpoint, the number of the lenses constituting each of the first and second lens units is set to be as small as two. This constitution is advantageous in reducing sizes of these lens units in a diametric direction and the axial thicknesses of the units and achieving a compact lens barrel in a collapsed state.

Moreover, the constitution in which the first lens unit includes one positive lens and one negative lens is advantageous in correcting a chromatic aberration with less lenses. As a result, even when the change of the space between the first lens unit and the second lens unit is enlarged to secure a zoom ratio, deterioration of the chromatic aberration is easily suppressed.

Moreover, the second lens unit which has heretofore had a large size in a thickness direction is constituted of two lenses of the negative lens and the positive lens in order from the object side. Since a large burden of a zooming function is easily imposed on the second lens unit, the unit has a large negative power in many cases.

When the second lens unit includes only two lenses of the negative lens and the positive lens, the one negative lens of the second lens unit bears a large negative power. On the other hand, to secure a high optical performance over the whole zooming region, it is effective to minimize the generation of the aberration of the lens unit. Therefore, to reduce the aberrations generated in this negative lens, the conditions (1B) and (2B) are satisfied by the negative lens of the second lens unit. These conditions define the refractive index for the d-line and the Abbe number of the negative lens of the second lens unit.

The condition (1B) is a condition concerning a balance between cost and an aberration correcting function. When $n_{d2n}$ is not above an upper limit of the condition (1B), the cost of a material for use and a manufacturing cost are easily reduced. If $n_{d2n}$ exceeds the upper limit of the condition (1B), the material for use becomes expensive, and is not easily processed.

In a case where $n_{d2n}$ is not below a lower limit of the condition (1B), even when a curvature of a lens surface is reduced, the negative refractive power is easily secured. As a result, a barrel type distortion in the wide-angle end is inhibited from being excessively enlarged, and a coma and the like generated by the negative lens itself can be reduced. The generation of the coma and the like in the wide-angle end and telephoto end and aberration fluctuations during the zooming are easily reduced.

The condition (2B) is a condition concerning the correction of the chromatic aberration, especially the correction of an off-axial chromatic aberration of magnification. It is preferable to set $v_{d2n}$ so that the value is not above an upper limit of the condition (2B). In consequence, the refractive index of the material for use is secured, and the correction of the aberration is facilitated.

If the value exceeds the upper limit of the condition (2B), the chromatic aberration is advantageously corrected, but the refractive index is easily reduced with the existing lens material.

It is preferable to set $v_{d2n}$ so that the value is not below a lower limit of the condition (2B). In consequence, color dispersion is reduced, and the chromatic aberration is easily reduced.

It is further preferable to satisfy the following conditions:

$$1.79 < n_{d2n} < 2.00 \quad (1B'); \text{ and}$$

$$37.0 < v_{d2n} < 45.0 \quad (2B').$$

It is still further preferable to satisfy the following conditions:

$$1.80 < n_{d2n} < 1.95 \quad (1B''); \text{ and}$$

$$40.0 < v_{d2n} < 47.0 \quad (2B'').$$

It is to be noted that only upper or lower limit values of the more restricted conditions (1B'), (1B''), (2B') or (2B'') may be used to set a new condition which related to the same parameter. This also applies to conditions for another parameters described hereinafter.

In the above zoom lens system, since the negative lenses are arranged in the first and second lens units, generation of a spherical aberration or the like in a composite optical system of the first and second lens units in the wide-angle end is easily suppressed. Even when the second lens unit is disposed apart from the first lens unit, the spherical aberration of the first lens unit is reduced. Therefore, the powers of the first and second lens units can easily be secured. Even when the change of the space between the first lens unit and the second lens unit is enlarged, the fluctuations of the spherical aberration are easily reduced. Therefore, the constitution is advantageous in obtaining a high zoom ratio.

It is preferable that a focal length of the negative lens of the first lens unit and a focal length of the negative lens of the second lens unit satisfy the following conditions (A), (B) or (C):

$$0.6 < |f_{1n}|/f_t < 5.0 \quad (A);$$

$$0.08 < |f_{2n}|/f_t < 0.35 \quad (B); \text{ or}$$

$$5.0 < |f_{1n}|/|f_{2n}| < 25.0 \quad (C),$$

in which $f_{1n}$ is a focal length of the negative lens of the first lens unit, $f_{2n}$ is a focal length of the negative lens of the second lens unit, and $f_t$ is a focal length of the zoom lens system in the telephoto end.

These conditions (A), (B) and (C) are conditions on which an aberration correcting effect due to the negative power is secured while the powers of the negative lenses of the first and second lens units are appropriately balanced.

When $|f_{1n}|/f_t$ is not above an upper limit of the condition (A), the chromatic aberration of magnification and the spherical aberration of the first lens unit are advantageously corrected.

When $|f_{1n}|/f_t$ is not below a lower limit of the condition (A), the power of the first lens unit is easily secured, and the zooming function of the second lens unit is easily secured.

When $|f_{2n}|/f_t$ is not above an upper limit of the condition (B), the negative power of the second lens unit is easily secured. The constitution is advantageous for miniaturization and a high zoom ratio.

When $|f_{2n}|/f_t$ is not below a lower limit of the condition (B), generation of aberrations in the second lens unit is easily suppressed.

When $|f_{1n}|/|f_{2n}|$ is not above an upper limit of the condition (C), the chromatic aberration during the zooming and fluctuations of the spherical aberration are easily reduced.

When $|f_{1n}|/|f_{2n}|$ is not below a lower limit of the condition (C), a change amount of a variable space with respect to a zooming amount is easily reduced.

When these conditions (A), (B) and (C) are simultaneously satisfied, the aberration correction, the miniaturization and the increase of the zoom ratio are advantageously performed.

It is further preferable to satisfy the following conditions:

$$0.8 < |f_{1n}|/f_t < 4.0 \quad (A');$$

$$0.10 < |f_{2n}|/f_t < 0.30 \quad (B'); \text{ or}$$

$$6.0 < |f_{1n}|/|f_{2n}| < 21.0 \quad (C').$$

It is still further preferable to satisfy the following conditions:

$$1.0 < |f_{1n}|/f_t < 3.0 \quad (A'');$$

$$0.12 < |f_{2n}|/f_t < 0.25 \quad (B''); \text{ or}$$

$$7.0 < |f_{1n}|/|f_{2n}| < 18.0 \quad (C'').$$

Moreover, it is preferable that two lenses of the first lens unit satisfy the following condition:

$$1.4 < |f_{1n}|/f_{1p} < 4.5 \quad (D),$$

in which $f_{1p}$ is a focal length of the positive lens of the first lens unit, and $f_{1n}$ is a focal length of the negative lens of the first lens unit.

When $|f_{1n}|/f_{1p}$ is not above an upper limit of the condition (D), the power of the negative lens is secured. In consequence, the chromatic aberration and the like generated in the positive lens can advantageously be corrected.

When $|f_{1n}|/f_{1p}$ is not below a lower limit of the condition (D), the power of the negative lens is inhibited from being excessively strengthened, and the positive power of the first lens unit including two lenses is easily secured. An influence of the relative eccentricity between the lenses on the aberration is easily suppressed.

It is further preferable to satisfy the following condition:

$$1.6 < |f_{1n}|/f_{1p} < 4.0 \quad (D').$$

It is still further preferable to satisfy the following condition:

$$1.8 < |f_{1n}|/f_{1p} < 3.5 \quad (D'').$$

To obtain a satisfactory optical performance efficiently while realizing a compact constitution, in addition to the above-mentioned inventive implementation, it is more preferable to provide various additional inventive implementations. Details will be described hereinafter.

To correct the aberration of the second lens unit more effectively, it is preferable that the positive lens of the second lens unit has a convex meniscus shape on the object side to reduce an incidence angle of an off-axial light flux. At this time, it is preferable that the shape of the positive lens of the second lens unit satisfies the following condition (3A):

$$-5.0 < SF_{2p} < -1.0 \quad (3A),$$

in which $SF_{2p}$ is defined by $SF_{2p} = (R_{2pf} + R_{2pr})/(R_{2pf} - R_{2pr})$, $R_{2pf}$ is a paraxial radius of curvature of an object-side surface of the positive lens of the second lens unit, and $R_{2pr}$ is a paraxial radius of curvature of an image-side surface of the positive lens of the second lens unit.

When $SF_{2p}$ is not above an upper limit of the condition (3A) and a curvature of the object-side surface of this lens is secured, an astigmatism in the wide-angle end and the spherical aberration in the telephoto end are advantageously corrected.

When $SF_{2p}$ is not below a lower limit of the condition (3A) and the curvature of the lens surface is inhibited from being excessively enlarged, generation of an off-axial high-order aberration is easily inhibited. Specifically, an off-axial curvature of field and the chromatic aberration of magnification are preferably reduced.

It is further preferable to satisfy the following condition:

$$-3.8 < SF_{2p} < -1.4 \quad (3A').$$

It is still further preferable to satisfy the following condition:

$$-2.6 < SF_{2p} < -1.8 \quad (3A'').$$

It is preferable that the power of the second lens unit satisfies the following condition (4A):

$$0.12 < |f_2/f_t| < 0.60 \quad (4A),$$

in which $f_2$ is a focal length of the second lens unit and $f_t$ is a focal length of the zoom lens system in the telephoto end.

When $|f_2/f_t|$ is not above an upper limit of the condition (4A), the power of the second lens unit can be secured, a zoom ratio is easily obtained with respect to a change amount of the space between the first lens unit and the second lens unit, and this is advantageous in obtaining the compact lens barrel.

It is preferable to set $|f_2/f_t|$ so that the value is not below a lower limit of the condition (4A). In consequence, the power of the second lens unit can be suppressed, and the aberrations are reduced.

It is further preferable to satisfy the following condition:

$$0.18 < |f_2/f_t| < 0.49 \quad (4A').$$

It is still further preferable to satisfy the following condition:

$$0.24 < |f_2/f_t| < 0.38 \quad (4A'').$$

To correct the aberrations further sufficiently even in a constitution in which the second lens unit constituted of two lenses, it is preferable that the positive lens of the second lens unit satisfy the following conditions (1A) and (2A):

$$1.88 < n_{d2p} < 2.20 \quad (1A); \text{ and}$$

$$13.0 < v_{d2p} < 30.0 \quad (2A),$$

in which $n_{d2p}$ is a refractive index of the positive lens of the second lens unit for the d-line, and $v_{d2p}$ is the Abbe number of the positive lens of the second lens unit.

The conditions (1A) and (2A) define the refractive index for the d-line and the Abbe number of the positive lens of the second lens unit.

Since a large burden of the zooming function is easily imposed on the second lens unit, the unit has a large negative power in many cases. Therefore, to correct the aberrations generated in the negative lens of the second lens unit with one positive lens, it is effective to appropriately set the refractive index and dispersion of this lens.

The condition (1A) is a condition concerning the correction of the curvature of field and the coma, and cost. When $n_{d2p}$ is not above an upper limit of the condition (1A), the cost of a material for use and a manufacturing cost are easily reduced. If $n_{d2p}$ exceeds the upper limit of the condition (1A), the material for use becomes expensive, and is not easily processed.

In a case where $n_{d2p}$ is not below a lower limit of the condition (1A), even when a curvature of a lens surface is reduced, the refractive power is easily secured. As a result, the curvature of field in the wide-angle end is reduced, the coma and the like generated by the positive lens itself can be reduced, and the generation of the coma and the like in the wide-angle end and telephoto end and aberration fluctuations during the zooming are easily reduced.

The condition (2A) is a condition concerning the correction of a chromatic aberration, especially the correction of an off-axial chromatic aberration of magnification. It is preferable to impart appropriate dispersion to the positive lens in order to satisfactorily correct the chromatic aberration generated by the negative lens of the second lens unit in this lens unit.

When $v_{d2p}$ is not above an upper limit of the condition (2A), the dispersion of the positive lens is secured to cancel the chromatic aberration generated by the negative lens of the second lens unit. In consequence, color blur of a shot image is preferably reduced.

When $v_{d2p}$ is not below a lower limit of the condition (2A), the dispersion at a short wavelength region is inhibited from being excessively enlarged. In consequence, the color blur due to a secondary spectrum is preferably reduced.

It is further preferable to satisfy the following conditions:

$$1.90 < n_{d2p} < 2.16 \quad (1A'); \text{ and}$$

$$15.0 < v_{d2p} < 25.0 \quad (2A').$$

It is still further preferable to satisfy the following conditions:

$$1.92 < n_{d2p} < 2.11 \quad (1A''); \text{ and}$$

$$17.0 < v_{d2p} < 21.0 \quad (2A'').$$

In a case where the zoom lens system has a constitution in which the second lens unit includes only two lenses of a negative lens and a positive lens, the negative lens of the second lens unit bears a large negative power. To secure a high optical performance in the whole zooming region, it is preferable to reduce the aberrations generated in this negative lens as much as possible.

For this purpose, it is preferable that this lens is a double-concave lens and is provided with a large power. Furthermore, it is preferable that the lens is formed into such a shape as to satisfy the following condition (7A):

$$0.35 < SF_{2n} < 1.00 \tag{7A},$$

in which $SF_{2n}$ is defined by $SF_{2n}=(R_{2nf}+R_{2nr})/(R_{2nf}-R_{2nr})$, $R_{2nf}$ is a paraxial radius of curvature of an object-side surface of the negative lens of the second lens unit, and $R_{2nr}$ is a paraxial radius of curvature of an image-side surface of the negative lens of the second lens unit.

When $SF_{2n}$ is not above an upper limit of the condition (7A) and a curvature of the image-side surface of the negative lens is reduced, the generation of the curvature of field in the wide-angle end is easily suppressed. The axial thickness of the second lens unit is easily reduced, and an angle of view is easily secured.

When $SF_{2n}$ is not below a lower limit of the condition (7A) and a negative curvature of the object-side surface of the negative lens is reduced, off-axial aberrations in the wide-angle end are easily reduced.

It is further preferable to satisfy the following condition:

$$0.45 < SF_{2n} < 0.85 \tag{7A'}.$$

It is still further preferable to satisfy the following condition:

$$0.55 < SF_{2n} < 0.70 \tag{7A''}.$$

Moreover, to suppress the generation of the aberration and obtain a satisfactory optical performance, it is preferable that an aspherical surface is arranged on at least one lens surface of the negative lens of the second lens unit. Both of the object-side surface and the image-side surface of this negative lens may be aspherical surfaces.

In this case, it is further preferable to satisfy the following condition (8A):

$$0.030 < (|ASP_{2nf}|+|ASP_{2nr}|)/f_w < 0.320 \tag{8A},$$

in which $ASP_{2nf}$ is an aspherical displacement of the object-side lens surface of the negative lens of the second lens unit, $ASP_{2nr}$ is an aspherical displacement of the image-side lens surface of the negative lens of the second lens unit, and $f_w$ is a focal length of the zoom lens system in the wide-angle end. The aspherical displacement in a case where the lens surface is a spherical surface or a flat surface is zero.

The aspherical displacement is a distance from the reference spherical surface and the lens surface, which is measured in parallel with an optical axis at a position of the maximum incidence height of a ray entering the lens surface in the wide-angle end. A distance measured toward the image side is represented by a positive sign. Here, the reference spherical surface has a radius of curvature equal to a paraxial radius of curvature of the lens surface, and a vertex of this spherical surface comes in contact with the lens surface. The aspherical displacement in a case where the lens surface is a spherical surface or a flat surface is zero.

When $(|ASP_{2nf}|+|ASP_{2nr}|)/f_w$ is not above an upper limit of the condition (8A) and a sum of absolute values of the aspherical displacements is not excessively large, deterioration of the optical performance at a time when eccentricity is generated between the aspherical lens surfaces owing to a manufacturing error can easily be inhibited.

It is preferable to set $(|ASP_{2nf}|+|ASP_{2nr}|)/f_w$ so that the value is not below a lower limit of the condition (8A). In consequence, the sum of the absolute values of the aspherical displacement is secured, and an aberration correcting function due to the aspherical surface is secured.

It is further preferable to satisfy the following condition:

$$0.040 < (|ASP_{2nf}|+|ASP_{2nr}|)/f_w < 0.250 \tag{8A'}.$$

It is still further preferable to satisfy the following condition:

$$0.050 < (|ASP_{2nf}|+|ASP_{2nr}|)/f_w < 0.180 \tag{8A''}.$$

Moreover, it is preferable that the aspherical surface of the negative lens of the second lens unit is an aspherical surface, a refractive power of a portion of which increases as the portion of the surface comes away from the optical axis. Here, "the refractive power increases" means that the negative refractive power is reduced or that the positive refractive power increases. In consequence, the distortion and the coma in the wide-angle end are easily reduced.

Furthermore, it is preferable that the negative lens of the second lens unit is a double-concave lens and that each of the object-side surface and the image-side surface of the double-concave lens is an aspherical surface, a refractive power of a portion of which increases as the portion of the surfaces come away from the optical axis.

This is advantageous in achieving both of reduction of a thickness on the optical axis and in a peripheral portion of the second lens unit and reduction of aberrations of the second lens unit.

It is preferable that the first lens unit constituted of two lenses of a negative lens and a positive lens in order from the object side. According to such a lens arrangement, while a chromatic aberration correcting function is imparted to the unit, fluctuations of the aberrations due to the zooming are easily reduced.

The negative lens may be cemented to the positive lens in the first lens unit. When the unit includes the cemented lens, it is possible to efficiently correct the axial chromatic aberration which easily raises a problem in a case where the zoom ratio is increased to increase the focal length in the telephoto end. The deterioration of the optical performance due to lens relative eccentricity caused by an assembly error can be inhibited. This contributes to improvement of yield and reduction of the cost.

The negative lens and the positive lens of the first lens unit may be single lenses which are not cemented to each other. In consequence, the first lens unit has four refractive surfaces, and a degree of freedom of design improves. Therefore, the distortion in the wide-angle end and the coma in the telephoto end can more effectively be corrected.

Moreover, it is preferable that the space between the negative lens and the positive lens of the first lens unit satisfies the following condition (9A):

$$0.0 < L_{1np}/L_1 < 0.2 \tag{9A},$$

in which $L_{1np}$ is the axial space between the negative lens and the positive lens of the first lens unit, and $L_1$ is a total axial thickness of the first lens unit.

When $L_{1np}/L_1$ is not above an upper limit of the condition (9A), the height of the off-axial ray which passes through the lens closest to the object side is reduced to reduce an effective diameter of this lens. In consequence, the whole zoom lens system can be constituted to be compact in the diametric direction. It is not realistic that $L_{1np}/L_1$ is below the lower limit of the condition (9A).

It is further preferable to satisfy the following condition:

$$0.0 < L_{1np}/L_1 < 0.15 \qquad (9A').$$

It is still further preferable to satisfy the following condition:

$$0.0 < L_{1np}/L_1 < 0.10 \qquad (9A'').$$

It is preferable that the third lens unit includes three or less lenses in order to thin the lens barrel.

To minimize the zoom lens system, it is preferable that the third lens unit includes two lenses of a positive lens and a negative lens in order from the object side.

When the third lens unit includes the minimum number of the lenses for the correction of aberrations such as the chromatic aberration generated in the lens unit, the lens barrel is thinned. According to such a lens arrangement, a front principal point can be positioned closer to an object, a zoom ratio can easily be secured, and a movement amount of the lens unit can easily be reduced. The constitution is advantageous in achieving compactness also from this respect.

To secure a higher optical performance, the third lens unit may include three lenses of a positive lens, a positive lens and a negative lens in order from the object side.

According to such a lens arrangement, the positive power of the third lens unit can mainly be shared by two positive lenses. The arrangement is advantageous in correcting the spherical aberration and the coma.

Moreover, it is preferable that the negative lens of the third lens unit is cemented to the adjacent positive lens on the object side. When the positive lens is cemented to the negative lens, the axial chromatic aberration can more effectively be corrected. Furthermore, the deterioration of the optical performance due to the relative eccentricity between the lenses in an assembly step can be prevented. Therefore, the improvement of the yield and the reduction of the cost are achieved.

When one or more aspherical surfaces are arranged in the third lens unit, the spherical aberration and the coma are effectively corrected. It is more preferable that opposite surfaces of the positive lens of the third lens unit closest to the object side are aspherical surfaces.

When the aspherical surfaces are arranged at a plurality of lenses, the optical performance is largely deteriorated owing to the relative eccentricity between the lenses. However, when opposite side surfaces of one lens are aspherical surfaces in this manner, the deterioration of the optical performance due to the lens relative eccentricity can be reduced, and the spherical aberration and the coma can more satisfactorily be corrected.

Especially, when the third lens unit is constituted of two lenses, the aspherical is advantageous in improving a degree of freedom of design. This constitution is preferable in achieving both of the miniaturization and the securing of the optical performance.

Moreover, from a viewpoint of a balance between the compact constitution and the optical performance, it is preferable that the first lens unit satisfies the following condition (10A):

$$0.50 < f_1/f_t < 2.00 \qquad (10A),$$

in which $f_1$ is a focal length of the first lens unit, and $f_t$ is a focal length of the zoom lens system in the telephoto end.

In a case where $f_1/f_t$ is set so that the value does not exceed an upper limit of the condition (10A) to secure the power of the first lens unit, the total length of the zoom lens system is easily reduced, and this is advantageous in miniaturizing the lens barrel.

In a case where $f_1/f_t$ is set so that the value is not below a lower limit of the condition (10A) to reduce the power of the first lens unit, the generation of the spherical aberration and the coma in the telephoto end is easily suppressed, and a satisfactory optical performance is easily secured.

It is further preferable to satisfy the following condition:

$$0.75 < f_1/f_t < 1.80 \qquad (10A').$$

It is still further preferable to satisfy the following condition:

$$0.95 < f_1/f_t < 1.60 \qquad (10A'').$$

Furthermore, it is preferable that the power of the third lens unit satisfies the following condition (11A):

$$0.16 < f_3/f_t < 0.80 \qquad (11A),$$

in which $f_3$ is a focal length of the third lens unit, and $f_t$ is a focal length of the zoom lens system in the telephoto end.

It is preferable to set $f_3/f_t$ so that the value is not above an upper limit of the condition (11A). In consequence, the power of the third lens unit is secured, and the zooming burden on the third lens unit is secured. This is advantageous for the miniaturization.

It is preferable to set $f_3/f_t$ so that the value is not below a lower limit of the condition (11A). In consequence, the power of the third lens unit is appropriately reduced, and the generation of the aberration in the third lens unit is suppressed.

It is further preferable to satisfy the following condition:

$$0.23 < f_3/f_t < 0.60 \qquad (11A').$$

It is still further preferable to satisfy the following condition:

$$0.30 < f_3/f_t < 0.40 \qquad (11A'').$$

It is preferable that the power of the fourth lens unit satisfies the following condition (12A) so as to secure telecentricity and correct the curvature of field:

$$0.24 < f_4/f_t < 0.80 \qquad (12A),$$

in which $f_4$ is a focal length of the fourth lens unit, and $f_t$ is a focal length of the zoom lens system in the telephoto end.

It is preferable to set $f_4/f_t$ so that the value is not above an upper limit of the condition (12A). In consequence, the power of the fourth lens unit can be secured to secure the telecentricity on the image side, and the curvature of field can be inhibited from being overcorrected.

It is preferable to set $f_4/f_t$ so that the value is not below a lower limit of the condition (12A). In consequence, the power of the fourth lens unit is appropriately reduced, and the curvature of field is inhibited from being undercorrected.

It is further preferable to satisfy the following condition:

$$0.36 < f_4/f_t < 0.70 \qquad (12A').$$

It is still further preferable to satisfy the following condition:

$$0.48 < f_4/f_t < 0.62 \qquad (12A'').$$

The fourth lens unit may be formed of a plastic material. A main function of the fourth lens unit is that an exit pupil is arranged at an appropriate position so as to allow a ray to efficiently enter an electronic image pickup device such as a CCD image sensor or a CMOS type image sensor. For such a function, a very large power is not required. Therefore, when the power of the fourth lens unit is set in a range of the condition (12A), the unit can be constituted using a material such as the plastic material having a small refractive index.

When the plastic lens is used in the fourth lens unit, the cost can be reduced, and it is possible to provide a more inexpensive zoom lens system.

To increase the zoom ratio while the performance of the system is maintained, the zooming function is efficiently imparted to each lens unit. Moreover, the aberration can more effectively be corrected satisfactorily over the whole zooming region.

Therefore, it is more preferable that during the zooming from the wide-angle end to the telephoto end, the first, second, third and fourth lens units move so that the space between the first lens unit and the second lens unit enlarges, the space between the second lens unit and the third lens unit narrows and the space between the third lens unit and the fourth lens unit enlarges. In addition, it is preferable that the zoom lens system has an aperture stop which moves together with the third lens unit in an optical axis direction during the zooming.

When the lens units are moved in this manner, the zooming function can effectively be imparted to each lens unit. Even when the zoom ratio is increased, the high performance can advantageously be achieved.

When the aperture stop is moved together with the third lens unit, the chromatic aberration of magnification and the distortion can effectively be corrected, and an effect can be produced in respect of the performance. Moreover, it is possible to appropriately control positions of an entrance pupil and the exit pupil.

That is, the ray height of the off-axial light flux in the wide-angle end and the ray height of the off-axial light flux in the telephoto end are balanced. An outer diameter of the first lens unit and an outer diameter of the fourth lens unit can be reduced with good balance. Especially, the reduction of the outer diameter of the first lens unit in the wide-angle end is effective in reducing the size of each lens in the thickness direction. Fluctuations of the position of the exit pupil during the zooming can be controlled and reduced. Therefore, the incidence angle of the ray which enters the image pickup device (e.g., the CCD image sensor, the CMOS type image sensor or the like) can be kept in an appropriate range, and generation of shading of brightness at a corner of an image surface can be prevented. The system is suitable for the electronic image pickup apparatus.

Furthermore, to reduce the total length of the zoom lens system and obtain a satisfactory aberration balance and the like, during the zooming from the wide-angle end to the telephoto end, it is preferable to move the first lens unit so that the unit is positioned closer to the object side in the telephoto end than in the wide-angle end. In this case, the unit may be moved toward only the object side or along a locus convex toward the image side.

The second lens unit may be moved toward only the image side or along a locus convex toward the image side.

The third lens unit may be moved toward only the object side.

The fourth lens unit may be moved toward only the object or image side. Alternatively, the fourth lens unit may be moved along a locus convex toward the object or image side.

The aperture stop and a shutter unit may be arranged between the second lens unit and the third lens unit, and may be moved integrally with the third lens unit during the zooming.

The entrance pupil can be disposed at a position close to the object side (a shallow position), and the exit pupil can easily be disposed away from the image surface. Moreover, since the height of the off-axial ray is lowered between the second lens unit and the third lens unit, the shutter unit does not have to be enlarged, and a dead space at a time when the aperture stop and the shutter unit are moved can be reduced.

Moreover, it is preferable that the zoom lens system is a four-unit zoom lens system, so that the total number of the lens units constituting the zoom lens system is four.

The reduction of the number of the lens units to four is preferable for the miniaturization of the system at a time when the lens barrel is collapsed.

Moreover, it is preferable that the zoom lens system satisfies the following condition (13A):

$$3.8 < f_t/f_w < 10.0 \qquad (13A),$$

in which $f_w$ is a focal length of the zoom lens system in the wide-angle end, and $f_t$ is a focal length of the zoom lens system in the telephoto end.

When $f_t/f_w$ is not above an upper limit of the condition (13A), the movement amount of the lens unit is easily reduced, and the total length is easily reduced.

When $f_t/f_w$ is not below a lower limit of the condition (13A), a sufficient zoom ratio can be secured, and photographing can be performed with a changed angle of view, while utilizing the above-mentioned merits of the zoom lens system in respect of the size and the cost.

It is further preferable to satisfy the following condition:

$$4.3 < f_t/f_w < 7.0 \qquad (13A').$$

It is still further preferable to satisfy the following condition:

$$4.7 < f_t/f_w < 5.0 \qquad (13A'').$$

In the zoom lens system according to the present invention, the telecentricity is easily secured. Therefore, the zoom lens system is preferable for use in a photographing lens of an electronic image pickup apparatus.

It is preferable that the image pickup apparatus of the present invention comprises any one of the above-mentioned zoom lens systems, and an electronic image pickup device which is arranged on an image side of the zoom lens system and which converts an optical image formed by the zoom lens system into an electric signal.

Next, numerical examples of the zoom lens system according to the present invention will be described in detail.

FIGS. 1A to 9C are sectional views of Examples 1 to 9 including an optical axis when focused at infinity. In these drawings, FIGS. 1A, 2A, 3A, . . . are sectional views in a wide-angle end, FIGS. 1B, 2B, 3B, . . . are sectional views in an intermediate state, and FIGS. 1C, 2C, 3C, . . . are sectional views in a telephoto end, respectively. In FIGS. 1A to 9C, a first lens unit is denoted with G1, a second lens unit is denoted with G2, an aperture stop is denoted with S, a third lens unit is denoted with G3, a fourth lens unit is denoted with G4, a parallel flat plate provided with a wavelength band restrictive coating which restricts an infrared ray and constituting a low pass filter is denoted with F, a parallel flat plate of a cover glass of an electronic image pickup device is denoted with C, and an image surface is denoted with I. It is to be noted that the surface of the cover glass C may be provided with a multi-layered thin film for restricting a wavelength band. The cover glass C may be provided with a low pass filter function.

Figure 1B:
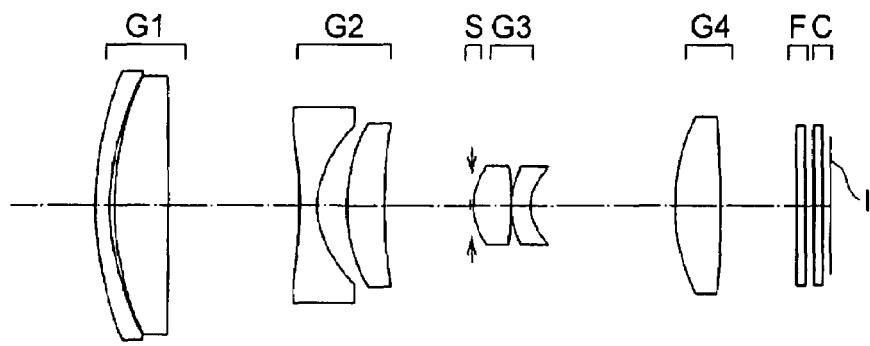
Figure 1C:
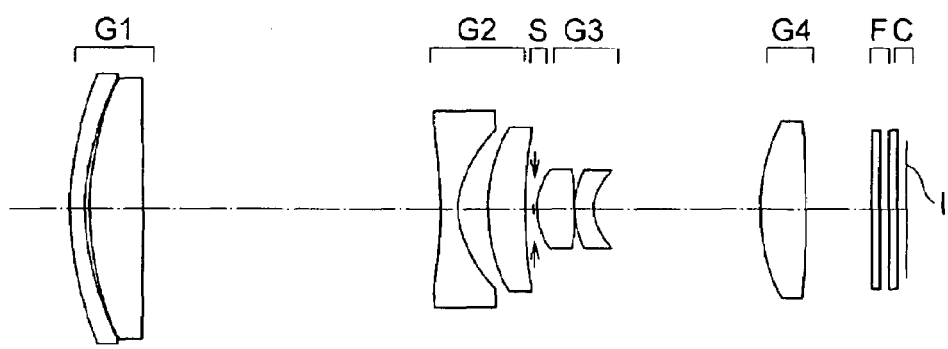

As shown in FIGS. 1A to 1C, Example 1 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 moves toward the object side, the second lens unit G2 moves toward an image side, the third lens unit G3 moves toward the object side, and the fourth lens unit G4 once moves toward the object side and then reverses a movement direction thereof to move toward the image side, that is, moves along a locus convex toward the object side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes, in order from the object side, a fifth double-convex positive lens and a sixth negative meniscus lens whose convex surface faces the object side. The fourth lens unit G4 includes a seventh double-convex positive lens.

Aspherical surfaces are used on five surfaces including opposite surfaces of the third double-concave negative lens, opposite surfaces of the fifth double-convex positive lens and an object-side surface of the seventh double-convex positive lens.

Figure 2A:
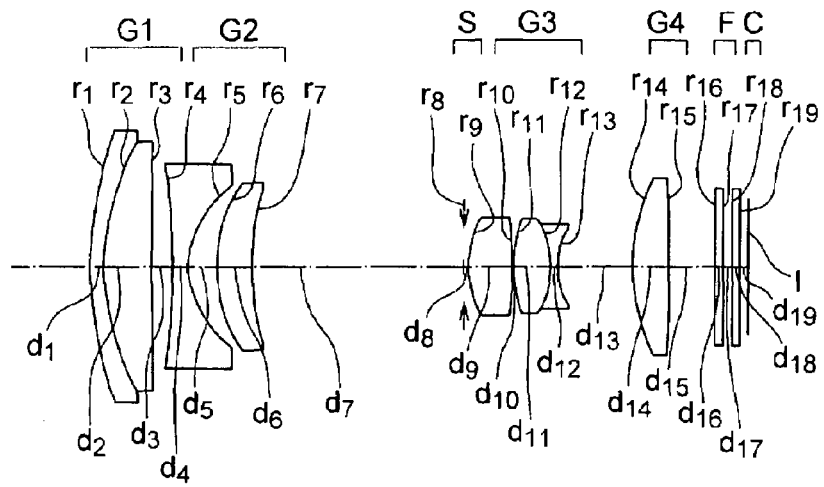
FIGS. 2A to 2C are sectional views of Example 2 of the zoom lens system including constitution optical axis according to the present invention when focused at infinity.
Figure 2B:
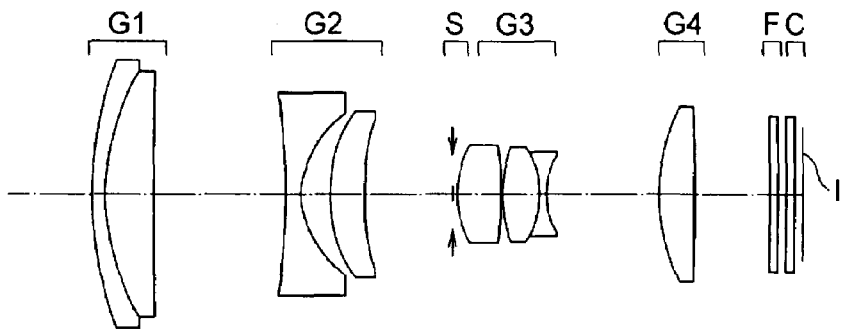
Figure 2C:
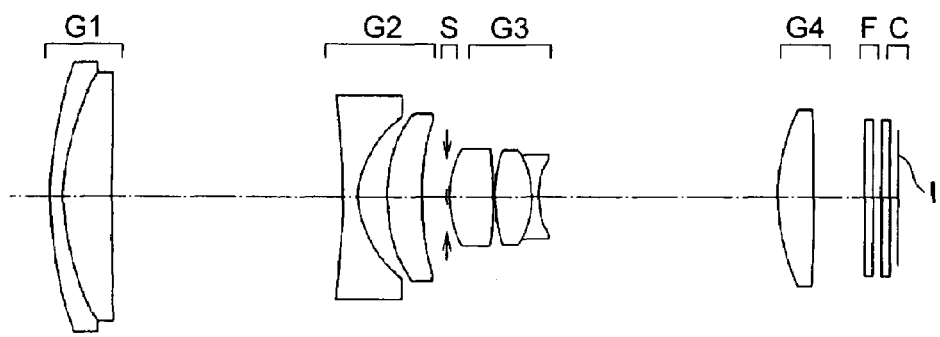

As shown in FIGS. 2A to 2C, Example 2 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 moves toward the object side, the second lens unit G2 once moves toward an image side and then reverses a movement direction thereof to move toward the object side, the third lens unit G3 moves toward the object side, and the fourth lens unit G4 once moves toward the object side and then reverses a movement direction thereof to move toward the image side.

The first lens unit G1 includes a first negative meniscus lens whose convex surface faces the object side and a second double-convex positive lens in order from the object side. The first negative meniscus lens is cemented to the second double-convex positive lens. The second lens unit G2 includes a third double-concave negative lens and a fourth positive meniscus lens whose convex surface faces the object side in order from the object side. The third lens unit G3 includes a fifth double-convex positive lens, a sixth double-convex positive lens and a seventh double-concave negative lens in order from the object side. The sixth double-convex positive lens is cemented to the seventh double-concave negative lens. The fourth lens unit G4 includes an eighth double-convex positive lens.

Aspherical surfaces are used on five surfaces including opposite surfaces of the third double-concave negative lens, opposite surfaces of the fifth double-convex positive lens and an object-side surface of the eighth double-convex positive lens.

Figure 3A:
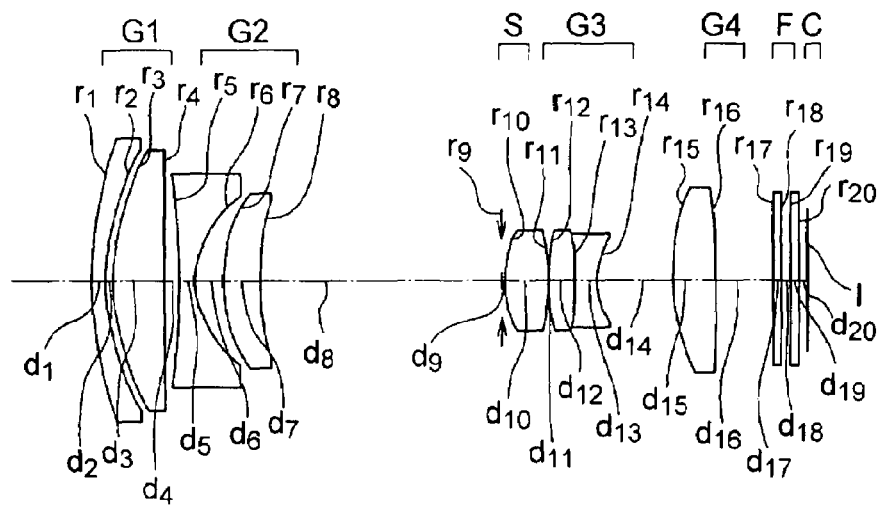
FIGS. 3A to 3C are sectional views of Example 3 of the zoom lens system including the optical axis according to the present invention when focused at infinity.
Figure 3B:
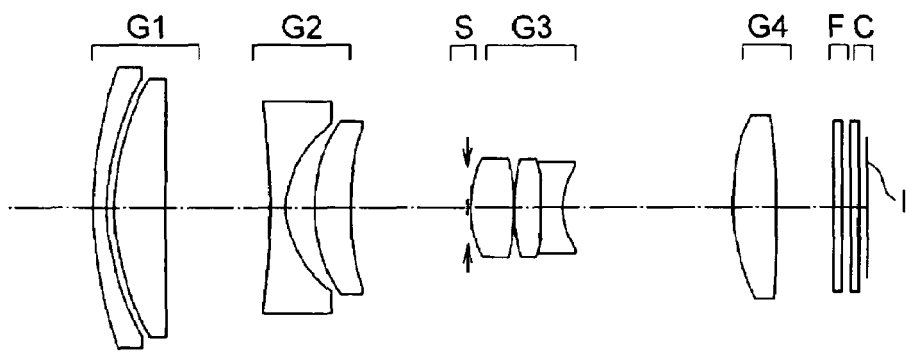
Figure 3C:
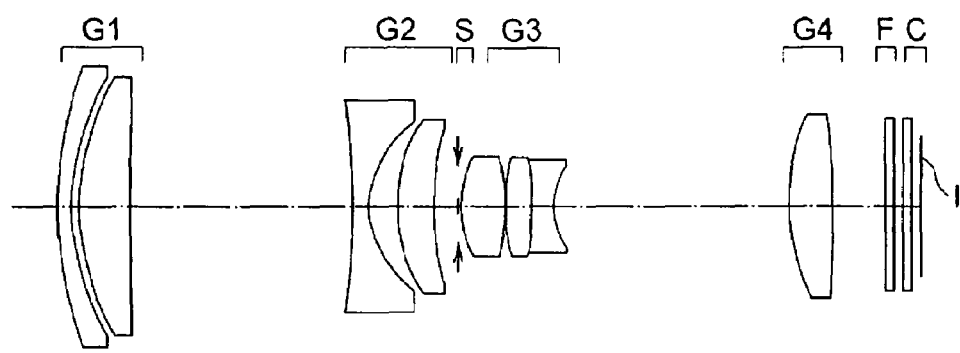

As shown in FIGS. 3A to 3C, Example 3 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 moves toward the object side, the second lens unit G2 moves toward an image side, the third lens unit G3 moves toward the object side, and the fourth lens unit G4 moves toward the object side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes a fifth double-convex positive lens, a sixth double-convex positive lens and a seventh double-concave negative lens in order from the object side. The sixth double-convex positive lens is cemented to the seventh double-concave negative lens. The fourth lens unit G4 includes an eighth double-convex positive lens.

Aspherical surfaces are used on five surfaces including opposite surfaces of the third double-concave negative lens, opposite surfaces of the fifth double-convex positive lens and an object-side surface of the eighth double-convex positive lens.

Figure 4A:
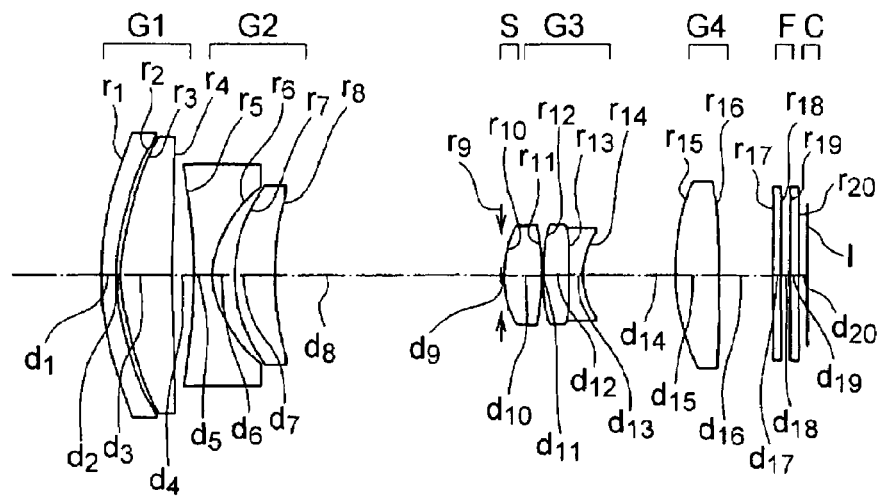
FIGS. 4A to 4C are sectional views of Example 4 of the zoom lens system including the optical axis according to the present invention when focused at infinity.
Figure 4B:
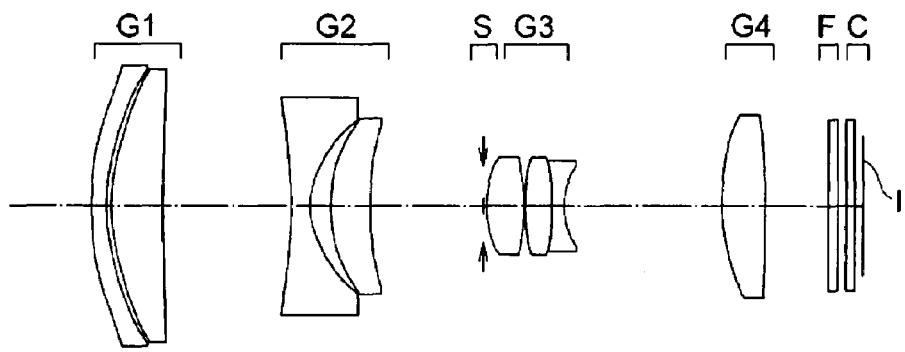
Figure 4C:
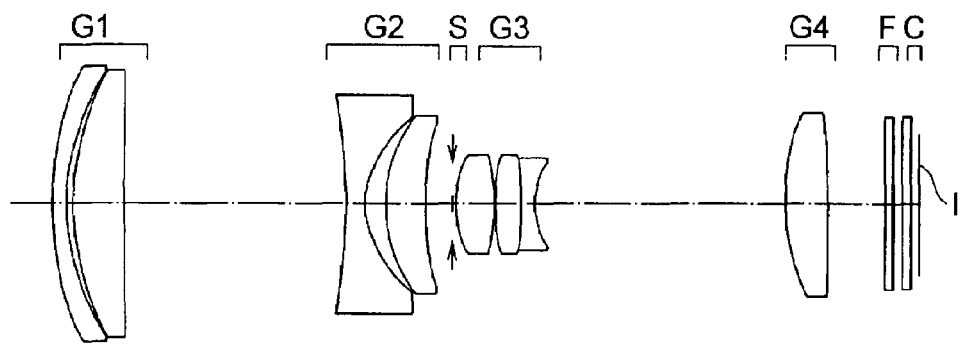

As shown in FIGS. 4A to 4C, Example 4 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 moves toward the object side, the second lens unit G2 once moves toward an image side and then moves toward the object side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes a fifth double-convex positive lens, a sixth double-convex positive lens and a seventh double-concave negative lens. The sixth double-convex positive lens is cemented to the seventh double-concave negative lens. The fourth lens unit G4 includes an eighth double-convex positive lens.

Aspherical surfaces are used on five surfaces including opposite surfaces of the third double-concave negative lens, opposite surfaces of the fifth double-convex positive lens and an object-side surface of the eighth double-convex positive lens.

Figure 5A:
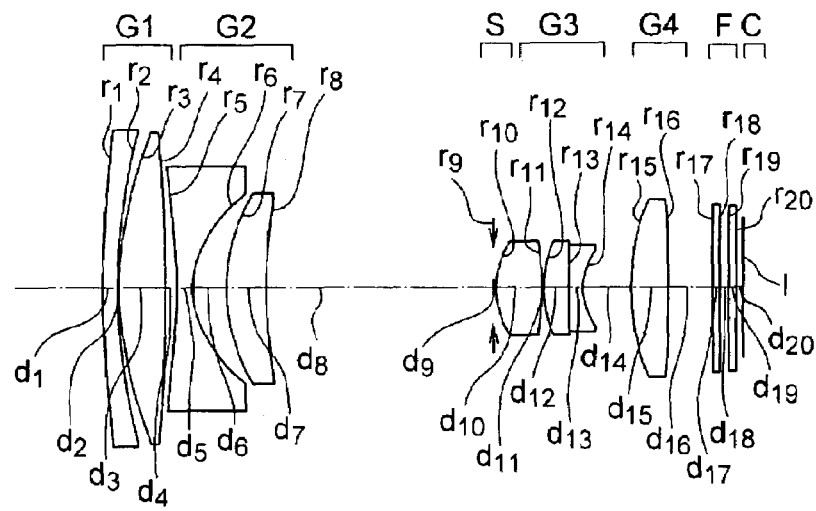
FIGS. 5A to 5C are sectional views of Example 5 of the zoom lens system including the optical axis according to the present invention when focused at infinity.
Figure 5B:
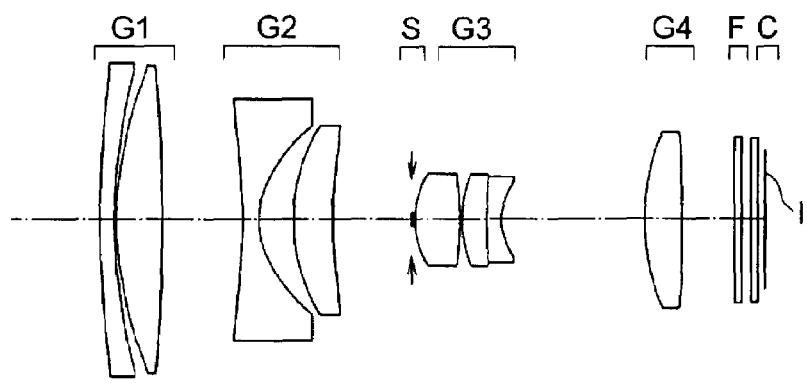
Figure 5C:
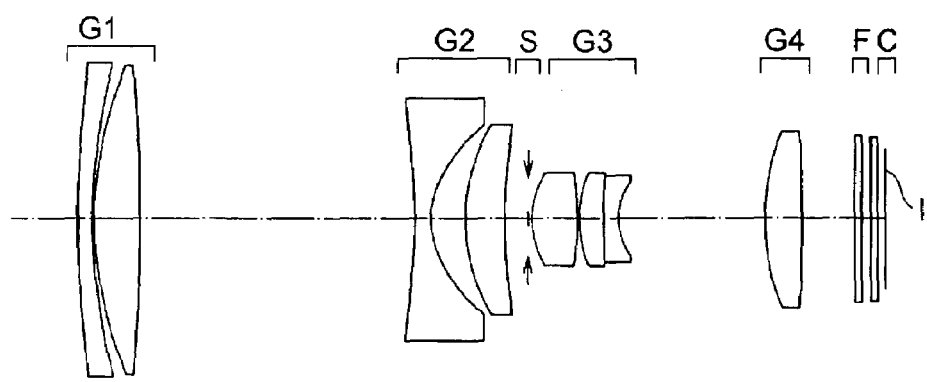

As shown in FIGS. 5A to 5C, Example 5 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes a fifth double-convex positive lens, a sixth positive meniscus lens whose convex surface faces the object side and a seventh negative meniscus lens whose convex surface faces the object side. The sixth positive meniscus lens is cemented to the seventh negative meniscus lens. The fourth lens unit G4 includes an eighth double-convex positive lens.

Aspherical surfaces are used on six surfaces including an image-side surface of the second double-convex positive lens, opposite surfaces of the third double-concave negative lens, opposite surfaces of the fifth double-convex positive lens and an object-side surface of the eighth double-convex positive lens.

Figure 6A:
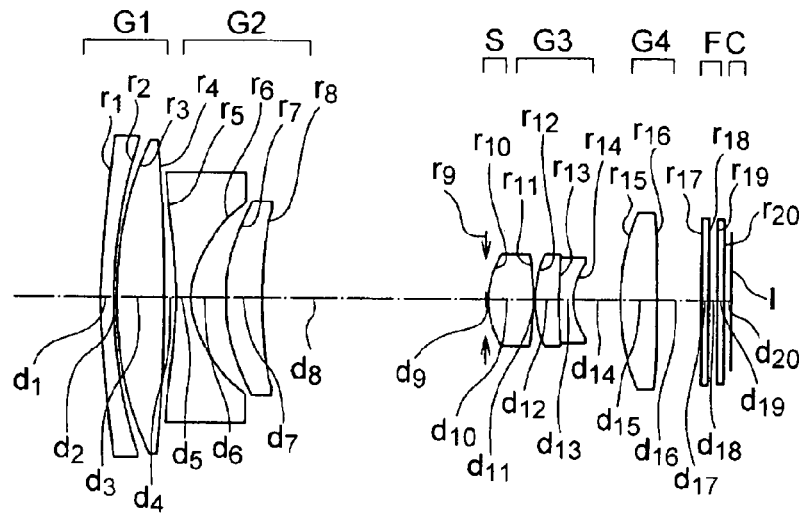
FIGS. 6A to 6C are sectional views of Example 6 of the zoom lens system including the optical axis according to the present invention when focused at infinity.
Figure 6B:
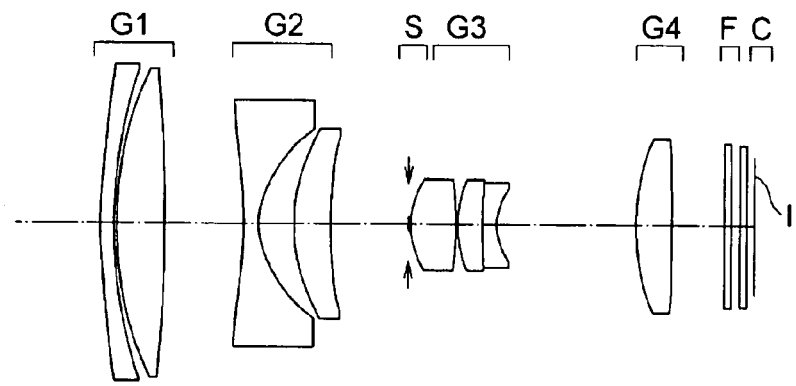
Figure 6C:
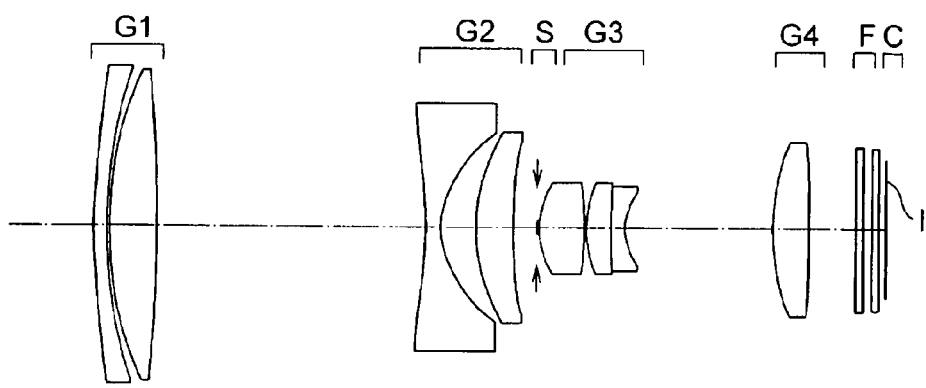

As shown in FIGS. 6A to 6C, Example 6 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes a fifth double-convex positive lens, a sixth positive meniscus lens whose convex surface faces the object side and a seventh negative meniscus lens whose convex surface faces the object side in order from the object side. The sixth positive meniscus lens is cemented to the seventh negative meniscus lens. The fourth lens unit G4 includes an eighth double-convex positive lens.

Aspherical surfaces are used on six surfaces including an image-side surface of the second double-convex positive lens, opposite surfaces of the third double-concave negative lens, opposite surfaces of the fifth double-convex positive lens and an object-side surface of the eighth double-convex positive lens.

Figure 7A:
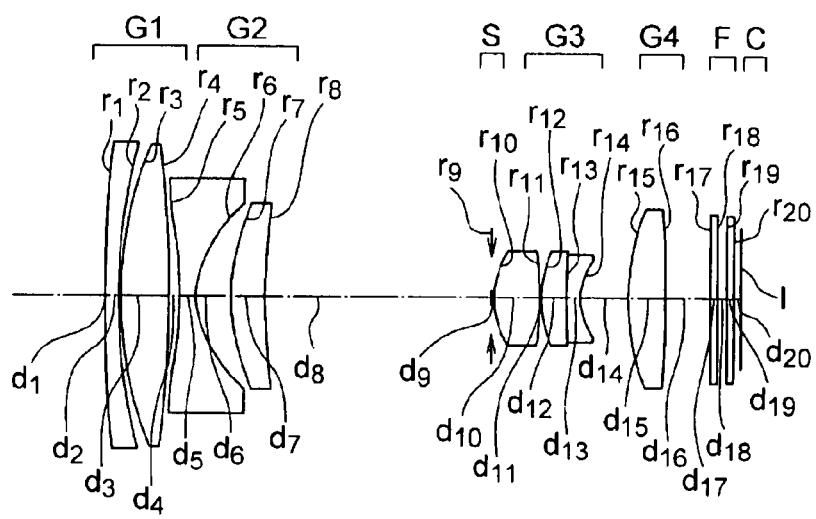
FIGS. 7A to 7C are sectional views of Example 7 of the zoom lens system including the optical axis according to the present invention when focused at infinity.
Figure 7B:
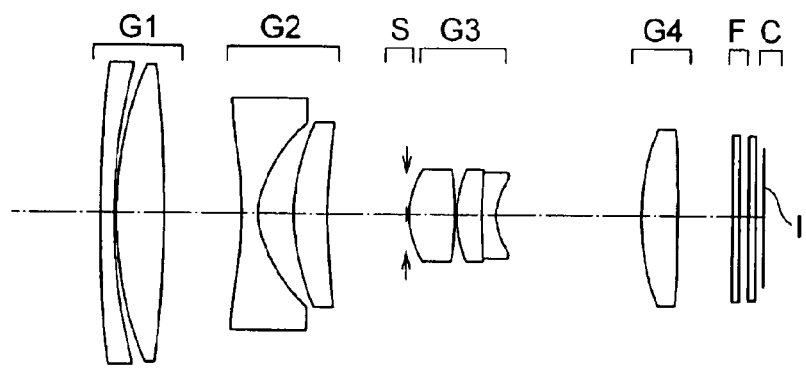
Figure 7C:
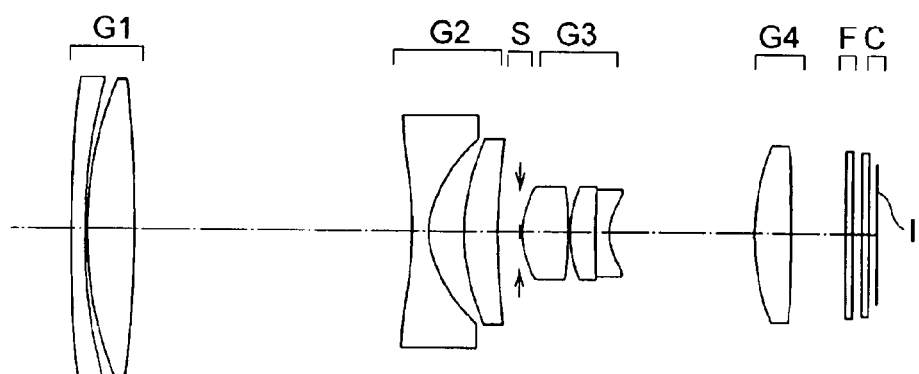

As shown in FIGS. 7A to 7C, Example 7 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens and a fourth positive meniscus lens in order from the object side. The third lens unit G3 includes a fifth double-convex positive lens, a sixth positive meniscus lens whose convex surface faces the object side and a seventh negative meniscus lens whose convex surface faces the object side in order from the object side. The sixth positive meniscus lens is cemented to the seventh negative meniscus lens. The fourth lens unit G4 includes an eighth double-convex positive lens.

Aspherical surfaces are used on six surfaces including an image-side surface of the second double-convex positive lens, opposite surfaces of the third double-concave negative lens, opposite surfaces of the fifth double-convex positive lens and an object-side surface of the eighth double-convex positive lens.

Figure 8A:
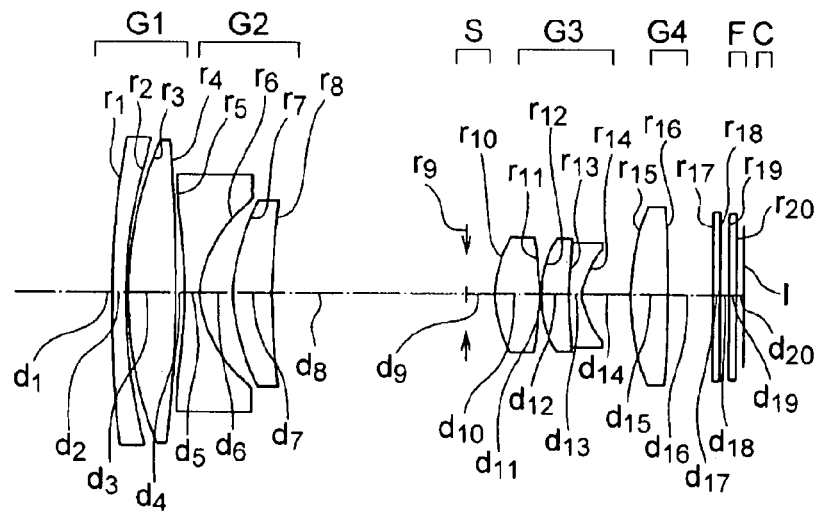
FIGS. 8A to 8C are sectional views of Example 8 of the zoom lens system including the optical axis according to the present invention when focused at infinity.
Figure 8B:
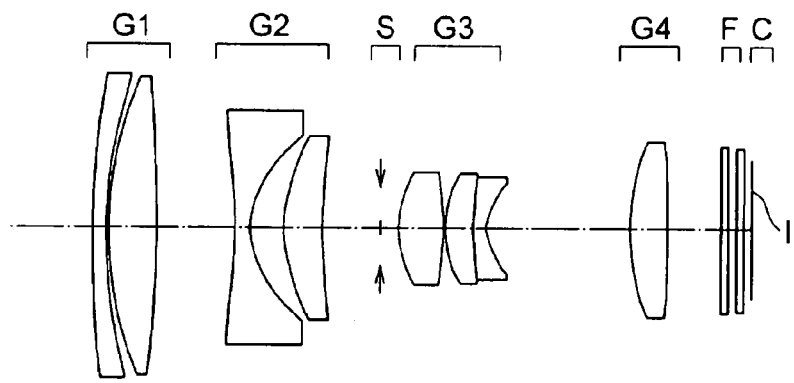
Figure 8C:
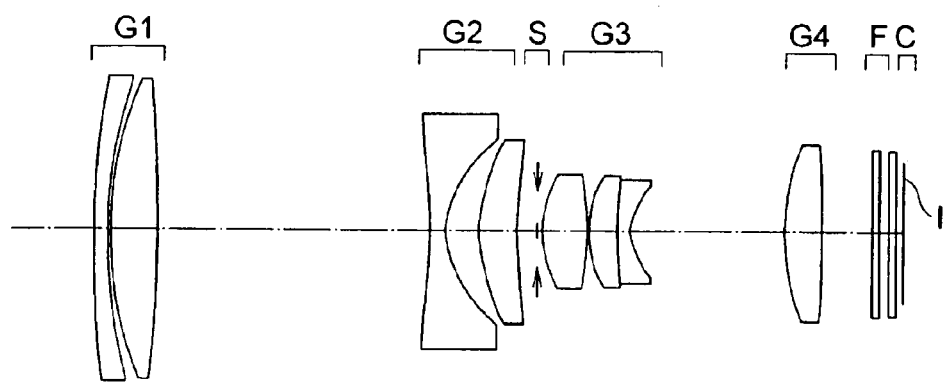

As shown in FIGS. 8A to 8C, Example 8 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes a fifth double-convex positive lens, a sixth positive meniscus lens whose convex surface faces the object side and a seventh negative meniscus lens whose convex surface faces the object side in order from the object side. The sixth positive meniscus lens is cemented to the seventh negative meniscus lens. The fourth lens unit G4 includes an eighth double-convex positive lens.

Aspherical surfaces are used on six surfaces including an image-side surface of the second double-convex positive lens, opposite surfaces of the third double-concave negative lens, opposite surfaces of the fifth double-convex positive lens and an object-side surface of the eighth double-convex positive lens.

Figure 9A:
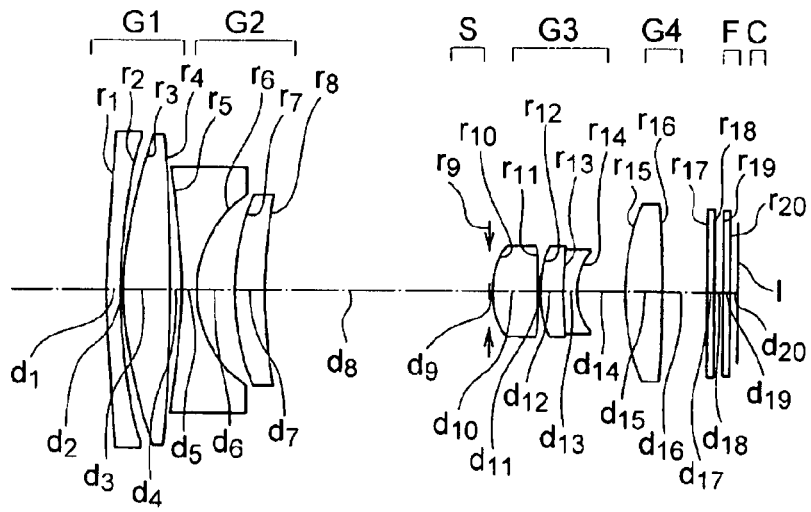
FIGS. 9A to 9C are sectional views of Example 9 of the zoom lens system including the optical axis according to the present invention when focused at infinity.
Figure 9B:
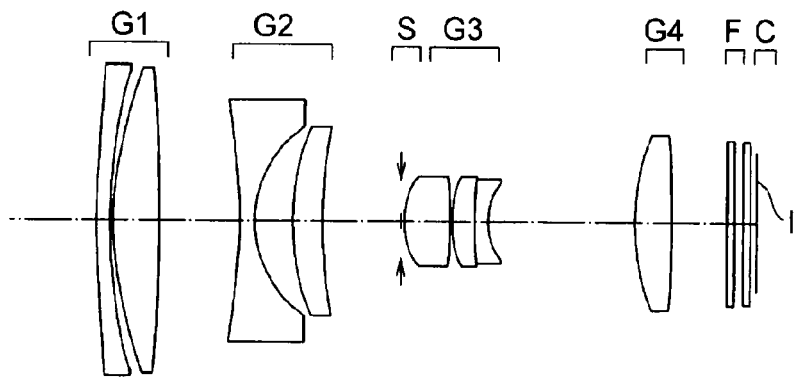
Figure 9C:
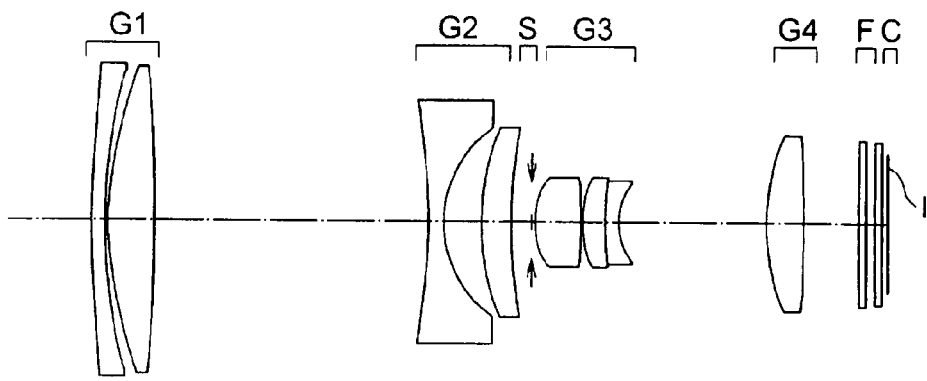

As shown in FIGS. 9A to 9C, Example 9 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes a fifth double-convex positive lens, a sixth positive meniscus lens whose convex surface faces the object side and a seventh negative meniscus lens whose convex surface faces the object side in order from the object side. The sixth positive meniscus lens is cemented to the seventh negative meniscus lens. The fourth lens unit G4 includes an eighth double-convex positive lens.

Aspherical surfaces are used on six surfaces including an image-side surface of the second double-convex positive lens, opposite surfaces of the third double-concave negative lens, opposite surfaces of the fifth double-convex positive lens and an object-side surface of the eighth double-convex positive lens.

Next, numerical data of the above examples will be described. In addition to the above symbols, f is a focal length of a zoom lens system, $F_{NO}$ is the F-number, ω is a half angle of view, WE is a wide-angle end, ST is an intermediate state, TE is a telephoto end, $r_1, r_2, \ldots$ are paraxial radii of curvature of lens surfaces, $d_1, d_2, \ldots$ are spaces between the lens surfaces, $n_{d1}, n_{d2}, \ldots$ are refractive indices of lenses for the d-line, and $v_{d1}, v_{d2}, \ldots$ are the Abbe numbers of the lenses. Symbol (AS) after the radius of curvature indicates that the surface is an aspherical surface, (S) indicates that the surface is an aperture stop surface and (I) indicates that the surface is an image surface, respectively. It is to be noted that a shape of the aspherical surface is represented by the following equation in a coordinate system in which an optical axis is an x-axis (a light travel direction is a positive direction), an intersection between the optical axis and the aspherical surface is an origin, and a y-axis passes through the origin and crosses the optical axis at right angles:

$$x=(y^2/r)/[1+\{1-(K+1)(y/r)^2\}^{1/2}]+A_4 y^4+A_6 y^6+A_8 y^8+A_{10} y^{10}+A_{12} y^{12},$$

in which r is a paraxial radius of curvature, K is a conic constant, and $A_4, A_6, A_8, A_{10}$ and $A_{12}$ are 4-th, 6-th, 8-th, 10-th and 12-th order aspherical coefficients. Among the aspherical coefficients, "e-n" (n is an integer) is multiplication by "$10^{-n}$".

NUMERICAL EXAMPLE 1

| | | | |
|---|---|---|---|
| $r_1 = 21.447$ | $d_1 = 0.80$ | $n_{d1} = 1.92286$ | $v_{d1} = 18.90$ |
| $r_2 = 16.568$ | $d_2 = 0.33$ | | |
| $r_3 = 19.065$ | $d_3 = 3.00$ | $n_{d2} = 1.72916$ | $v_{d2} = 54.68$ |
| $r_4 = -635.214$ | $d_4 = $ variable | | |
| $r_5 = -27.371$(AS) | $d_5 = 1.00$ | $n_{d3} = 1.88300$ | $v_{d3} = 40.76$ |
| $r_6 = 5.547$(AS) | $d_6 = 1.71$ | | |
| $r_7 = 10.368$ | $d_7 = 2.16$ | $n_{d4} = 1.92286$ | $v_{d4} = 18.90$ |
| $r_8 = 32.087$ | $d_8 = $ variable | | |
| $r_9 = \infty$(S) | $d_9 = 0.10$ | | |
| $r_{10} = 4.015$(AS) | $d_{10} = 2.14$ | $n_{d5} = 1.58313$ | $v_{d5} = 59.38$ |
| $r_{11} = -20.737$(AS) | $d_{11} = 0.07$ | | |
| $r_{12} = 6.067$ | $d_{12} = 1.07$ | $n_{d6} = 1.92286$ | $v_{d6} = 20.88$ |
| $r_{13} = 3.042$ | $d_{13} = $ variable | | |
| $r_{14} = 13.673$(AS) | $d_{14} = 2.68$ | $n_{d7} = 1.52542$ | $v_{d7} = 55.78$ |
| $r_{15} = -65.892$ | $d_{15} = $ variable | | |
| $r_{16} = \infty$ | $d_{16} = 0.50$ | $n_{d8} = 1.54771$ | $v_{d8} = 62.84$ |
| $r_{17} = \infty$ | $d_{17} = 0.50$ | | |
| $r_{18} = \infty$ | $d_{18} = 0.50$ | $n_{d9} = 1.51633$ | $v_{d9} = 64.14$ |
| $r_{19} = \infty$ | $d_{19} = 0.50$ | | |
| $r_{20} = \infty$ (I) | | | |

Aspherical Coefficient

5th Surface

R = −27.371
K = 0.065
$A_4 = 2.93685e-04$    $A_6 = -1.29521e-05$    $A_8 = 2.63539e-07$
$A_{10} = -7.77717e-10$

6th Surface

R = 5.547
K = −0.216
$A_4 = -2.74527e-04$    $A_6 = 5.81879e-06$    $A_8 = -2.46028e-06$
$A_{10} = 7.68048e-08$

10th Surface

R = 4.015
K = −0.052
$A_4 = -1.29073e-03$    $A_6 = -6.12402e-06$    $A_8 = 1.86699e-06$

11th Surface

R = −20.737
K = 0.000
$A_4 = 7.99142e-04$    $A_6 = 6.56260e-05$    $A_8 = 4.48582e-06$

14th Surface

R = 13.673
K = −0.880
$A_4 = 3.32538e-05$    $A_6 = 3.03636e-05$    $A_8 = -2.12591e-06$
$A_{10} = 6.32654e-08$

Zoom Data (∞)

| | WE | ST | TE |
|---|---|---|---|
| f(mm) | 6.60 | 14.49 | 31.76 |
| $F_{NO}$ | 4.47 | 5.71 | 5.99 |
| 2ω(°) | 62.67 | 29.43 | 13.60 |
| $d_4$ | 1.18 | 7.61 | 17.27 |
| $d_8$ | 12.07 | 5.03 | 0.55 |
| $d_{13}$ | 4.74 | 8.30 | 9.73 |
| $d_{15}$ | 3.31 | 4.30 | 3.77 |

NUMERICAL EXAMPLE 2

| | | | |
|---|---|---|---|
| $r_1 = 22.824$ | $d_1 = 0.80$ | $n_{d1} = 1.84666$ | $v_{d1} = 23.78$ |
| $r_2 = 14.601$ | $d_2 = 2.82$ | $n_{d2} = 1.72916$ | $v_{d2} = 54.68$ |
| $r_3 = 414.790$ | $d_3 = $ variable | | |
| $r_4 = -19.623$(AS) | $d_4 = 0.90$ | $n_{d3} = 1.80495$ | $v_{d3} = 40.90$ |
| $r_5 = 5.406$(AS) | $d_5 = 1.71$ | | |
| $r_6 = 8.975$ | $d_6 = 2.07$ | $n_{d4} = 1.92286$ | $v_{d4} = 18.90$ |
| $r_7 = 20.246$ | $d_7 = $ variable | | |
| $r_8 = \infty$ (S) | $d_8 = 0.10$ | | |
| $r_9 = 5.364$(AS) | $d_9 = 2.57$ | $n_{d5} = 1.58313$ | $v_{d5} = 59.38$ |
| $r_{10} = -16.396$(AS) | $d_{10} = 0.10$ | | |
| $r_{11} = 8.877$ | $d_{11} = 2.16$ | $n_{d6} = 1.72916$ | $v_{d6} = 54.68$ |
| $r_{12} = -5.099$ | $d_{12} = 0.40$ | $n_{d7} = 1.80100$ | $v_{d7} = 34.97$ |
| $r_{13} = 4.240$ | $d_{13} = $ variable | | |
| $r_{14} = 11.188$(AS) | $d_{14} = 2.14$ | $n_{d8} = 1.52542$ | $v_{d8} = 55.78$ |
| $r_{15} = -171.452$ | $d_{15} = $ variable | | |
| $r_{16} = \infty$ | $d_{16} = 0.50$ | $n_{d9} = 1.54771$ | $v_{d9} = 62.84$ |
| $r_{17} = \infty$ | $d_{17} = 0.50$ | | |
| $r_{18} = \infty$ | $d_{18} = 0.50$ | $n_{d10} = 1.51633$ | $v_{d10} = 64.14$ |
| $r_{19} = \infty$ | $d_{19} = 0.50$ | | |
| $r_{20} = \infty$(I) | | | |

Aspherical Coefficient

4th Surface

R = −19.623
K = 0.089
$A_4 = 8.04207e-04$    $A_6 = -2.03534e-05$    $A_8 = 2.82387e-07$
$A_{10} = -1.69194e-09$

5th Surface

R = 5.406
K = −0.329
$A_4 = 4.28184e-04$    $A_6 = 2.10097e-05$    $A_8 = -1.65174e-06$
$A_{10} = 1.28854e-08$

9th Surface

R = 5.364
K = −0.166
$A_4 = -2.03573e-04$    $A_6 = 4.18417e-05$    $A_8 = 3.69979e-06$

10th Surface

R = −16.396
K = 0.000
$A_4 = 9.35195e-04$    $A_6 = 6.75272e-05$    $A_8 = 5.30410e-06$

-continued

14th Surface

R = 11.188
K = −1.490
$A_4$ = 5.63156e−05    $A_6$ = 1.24846e−05    $A_8$ = −1.04700e−06
$A_{10}$ = 3.12395e−08

Zoom Data (∞)

|  | WE | ST | TE |
|---|---|---|---|
| f(mm) | 6.61 | 14.38 | 31.74 |
| $F_{NO}$ | 3.60 | 4.46 | 6.02 |
| 2ω(°) | 62.90 | 29.44 | 13.45 |
| $d_3$ | 1.26 | 7.82 | 13.73 |
| $d_7$ | 12.51 | 5.36 | 1.54 |
| $d_{13}$ | 4.42 | 6.52 | 14.10 |
| $d_{15}$ | 2.69 | 4.42 | 3.00 |

NUMERICAL EXAMPLE 3

| $r_1$ = 23.457 | $d_1$ = 0.80 | $n_{d1}$ = 1.84666 | $ν_{d1}$ = 23.78 |
| $r_2$ = 14.154 | $d_2$ = 0.40 | | |
| $r_3$ = 15.271 | $d_3$ = 3.00 | $n_{d2}$ = 1.77250 | $ν_{d2}$ = 49.60 |
| $r_4$ = −215.758 | $d_4$ = variable | | |
| $r_5$ = −23.097(AS) | $d_5$ = 1.00 | $n_{d3}$ = 1.80495 | $ν_{d3}$ = 40.90 |
| $r_6$ = 5.348(AS) | $d_6$ = 1.40 | | |
| $r_7$ = 8.580 | $d_7$ = 2.00 | $n_{d4}$ = 1.92286 | $ν_{d4}$ = 18.90 |
| $r_8$ = 18.871 | $d_8$ = variable | | |
| $r_9$ = ∞(S) | $d_9$ = 0.10 | | |
| $r_{10}$ = 5.766(AS) | $d_{10}$ = 2.45 | $n_{d5}$ = 1.58313 | $ν_{d5}$ = 59.38 |
| $r_{11}$ = −10.882(AS) | $d_{11}$ = 0.10 | | |
| $r_{12}$ = 15.328 | $d_{12}$ = 1.44 | $n_{d6}$ = 1.69680 | $ν_{d6}$ = 55.53 |
| $r_{13}$ = −15.328 | $d_{13}$ = 1.22 | $n_{d7}$ = 1.68893 | $ν_{d7}$ = 31.07 |
| $r_{14}$ = 4.089 | $d_{14}$ = variable | | |
| $r_{15}$ = 14.324(AS) | $d_{15}$ = 2.60 | $n_{d8}$ = 1.52542 | $ν_{d8}$ = 55.78 |
| $r_{16}$ = −27.378 | $d_{16}$ = variable | | |
| $r_{17}$ = ∞ | $d_{17}$ = 0.50 | $n_{d9}$ = 1.54771 | $ν_{d9}$ = 62.84 |
| $r_{18}$ = ∞ | $d_{18}$ = 0.50 | | |
| $r_{19}$ = ∞ | $d_{19}$ = 0.50 | $n_{d10}$ = 1.51633 | $ν_{d10}$ = 64.14 |
| $r_{20}$ = ∞ | $d_{20}$ = 0.45 | | |
| $r_{21}$ = ∞(I) | | | |

Aspherical Coefficient

5th Surface

R = −23.097
K = 0.089
$A_4$ = 1.80967e−04    $A_6$ = −1.62280e−07    $A_8$ = 3.96691e−08
$A_{10}$ = −7.98836e−10

6th Surface

R = 5.348
K = −0.296
$A_4$ = −1.84110e−04    $A_6$ = 1.36361e−07    $A_8$ = 1.68053e−07
$A_{10}$ = −1.07186e−09

10th Surface

R = 5.766
K = −1.073
$A_4$ = −9.79726e−05    $A_6$ = 1.50579e−06

11th Surface

R = −10.882
K = 7.693
$A_4$ = 1.32858e−03    $A_6$ = 3.01907e−05    $A_8$ = 2.16650e−08
$A_{10}$ = 6.54410e−11

15th Surface

R = 14.324
K = −0.001

-continued $A_4$ = 4.02883e−05    $A_6$ = 5.91976e−06    $A_8$ = −1.61602e−07
$A_{10}$ = 2.12392e−09

Zoom Data (∞)

|  | WE | ST | TE |
|---|---|---|---|
| f(mm) | 6.62 | 14.37 | 32.09 |
| $F_{NO}$ | 3.83 | 5.11 | 6.00 |
| 2ω(°) | 62.68 | 29.65 | 13.53 |
| $d_4$ | 0.88 | 5.76 | 12.75 |
| $d_8$ | 13.63 | 6.80 | 1.53 |
| $d_{14}$ | 4.27 | 9.62 | 13.30 |
| $d_{16}$ | 3.19 | 3.12 | 2.96 |

NUMERICAL EXAMPLE 4

| $r_1$ = 18.613 | $d_1$ = 0.83 | $n_{d1}$ = 2.00170 | $ν_{d1}$ = 20.64 |
| $r_2$ = 14.132 | $d_2$ = 0.32 | | |
| $r_3$ = 15.458 | $d_3$ = 3.00 | $n_{d2}$ = 1.72916 | $ν_{d2}$ = 54.68 |
| $r_4$ = −7762.115 | $d_4$ = variable | | |
| $r_5$ = −19.900(AS) | $d_5$ = 1.00 | $n_{d3}$ = 1.80495 | $ν_{d3}$ = 40.90 |
| $r_6$ = 4.735(AS) | $d_6$ = 1.32 | | |
| $r_7$ = 7.926 | $d_7$ = 2.25 | $n_{d4}$ = 2.00170 | $ν_{d4}$ = 20.64 |
| $r_8$ = 18.204 | $d_8$ = variable | | |
| $r_9$ = ∞(S) | $d_9$ = 0.10 | | |
| $r_{10}$ = 5.243(AS) | $d_{10}$ = 2.14 | $n_{d5}$ = 1.58313 | $ν_{d5}$ = 59.38 |
| $r_{11}$ = −14.423(AS) | $d_{11}$ = 0.10 | | |
| $r_{12}$ = 13.297 | $d_{12}$ = 1.41 | $n_{d6}$ = 1.69680 | $ν_{d6}$ = 55.53 |
| $r_{13}$ = −13.297 | $d_{13}$ = 0.84 | $n_{d7}$ = 1.68893 | $ν_{d7}$ = 31.07 |
| $r_{14}$ = 4.302 | $d_{14}$ = variable | | |
| $r_{15}$ = 12.620(AS) | $d_{15}$ = 2.32 | $n_{d8}$ = 1.52542 | $ν_{d8}$ = 55.78 |
| $r_{16}$ = −41.640 | $d_{16}$ = variable | | |
| $r_{17}$ = ∞ | $d_{17}$ = 0.50 | $n_{d9}$ = 1.54771 | $ν_{d9}$ = 62.84 |
| $r_{18}$ = ∞ | $d_{18}$ = 0.50 | | |
| $r_{19}$ = ∞ | $d_{19}$ = 0.50 | $n_{d10}$ = 1.51633 | $ν_{d10}$ = 64.14 |
| $r_{20}$ = ∞ | $d_{20}$ = 0.50 | | |
| $r_{21}$ = ∞(I) | | | |

Aspherical Coefficient

5th Surface

R = −19.900
K = 0.089
$A_4$ = 7.68359e−04    $A_6$ = −2.74885e−05    $A_8$ = 5.05160e−07
$A_{10}$ = −3.51817e−09

6th Surface

R = 4.735
K = −0.296
$A_4$ = 2.06227e−04    $A_6$ = 1.05145e−05    $A_8$ = −3.20724e−06
$A_{10}$ = 5.51277e−08

10th Surface

R = 5.243
K = −0.166
$A_4$ = −3.57087e−04    $A_6$ = 6.29255e−05    $A_8$ = −2.02800e−07
$A_{10}$ = 1.01728e−06

11th Surface

R = −14.423
K = 0.000
$A_4$ = 1.07710e−03    $A_6$ = 7.69622e−05    $A_8$ = 3.07399e−06
$A_{10}$ = 1.50112e−06

15th Surface

R = 12.620
K = −1.490
$A_4$ = 5.63156e−05    $A_6$ = 3.25061e−06    $A_8$ = −1.24032e−07
$A_{10}$ = 2.58656e−09

-continued

| Zoom Data (∞) | | | |
|---|---|---|---|
| | WE | ST | TE |
| f(mm) | 6.62 | 14.41 | 31.64 |
| $F_{NO}$ | 3.82 | 4.77 | 6.00 |
| 2ω(°) | 62.97 | 29.10 | 13.54 |
| $d_4$ | 1.12 | 7.18 | 12.54 |
| $d_8$ | 12.66 | 6.25 | 1.55 |
| $d_{14}$ | 5.19 | 8.85 | 14.31 |
| $d_{16}$ | 3.01 | 3.57 | 3.17 |

NUMERICAL EXAMPLE 5

| | | | |
|---|---|---|---|
| $r_1$ = 84.159 | $d_1$ = 0.80 | $n_{d1}$ = 2.00170 | $ν_{d1}$ = 20.64 |
| $r_2$ = 34.486 | $d_2$ = 0.10 | | |
| $r_3$ = 22.651 | $d_3$ = 2.64 | $n_{d2}$ = 1.76802 | $ν_{d2}$ = 49.24 |
| $r_4$ = −68.862(AS) | $d_4$ = variable | | |
| $r_5$ = −22.850(AS) | $d_5$ = 0.87 | $n_{d3}$ = 1.88300 | $ν_{d3}$ = 40.76 |
| $r_6$ = 5.672(AS) | $d_6$ = 1.94 | | |
| $r_7$ = 11.112 | $d_7$ = 2.21 | $n_{d4}$ = 1.94595 | $ν_{d4}$ = 17.98 |
| $r_8$ = 35.757 | $d_8$ = variable | | |
| $r_9$ = ∞(S) | $d_9$ = 0.10 | | |
| $r_{10}$ = 4.712(AS) | $d_{10}$ = 2.61 | $n_{d5}$ = 1.58913 | $ν_{d5}$ = 61.14 |
| $r_{11}$ = −14.330(AS) | $d_{11}$ = 0.10 | | |
| $r_{12}$ = 7.122 | $d_{12}$ = 1.40 | $n_{d6}$ = 1.73400 | $ν_{d6}$ = 51.47 |
| $r_{13}$ = 38.362 | $d_{13}$ = 0.80 | $n_{d7}$ = 2.00069 | $ν_{d7}$ = 25.46 |
| $r_{14}$ = 3.667 | $d_{14}$ = variable | | |
| $r_{15}$ = 14.436(AS) | $d_{15}$ = 2.07 | $n_{d8}$ = 1.74330 | $ν_{d8}$ = 49.33 |
| $r_{16}$ = −91.806 | $d_{16}$ = variable | | |
| $r_{17}$ = ∞ | $d_{17}$ = 0.40 | $n_{d9}$ = 1.54771 | $ν_{d9}$ = 62.84 |
| $r_{18}$ = ∞ | $d_{18}$ = 0.50 | | |
| $r_{19}$ = ∞ | $d_{19}$ = 0.50 | $n_{d10}$ = 1.51633 | $ν_{d10}$ = 64.14 |
| $r_{20}$ = ∞ | $d_{20}$ = 0.35 | | |
| $r_{21}$ = ∞(I) | | | |

Aspherical Coefficient

4th Surface

R = −68.862
K = 0.000
$A_4$ = 1.40060e−05   $A_6$ = 4.74804e−08   $A_8$ = −1.12302e−09
$A_{10}$ = 6.63012e−12

5th Surface

R = −22.850
K = 0.005
$A_4$ = 4.03460e−04   $A_6$ = −7.22829e−06   $A_8$ = 6.48822e−08
$A_{10}$ = −8.73779e−11

6th Surface

R = 5.672
K = −0.125
$A_4$ = −1.79384e−04   $A_6$ = 1.31075e−05   $A_8$ = −1.16124e−06
$A_{10}$ = 8.98567e−09

10th Surface

R = 4.712
K = −0.084
$A_4$ = −3.51732e−04   $A_6$ = 2.84641e−05   $A_8$ = 5.84562e−06
$A_{10}$ = 4.88769e−07

11th Surface

R = −14.330
K = 0.000
$A_4$ = 1.77733e−03   $A_6$ = 5.54637e−05   $A_8$ = 1.61880e−05
$A_{10}$ = 5.93748e−07

15th Surface

R = 14.436
K = 0.000
$A_4$ = −4.85530e−05   $A_6$ = 2.21564e−05   $A_8$ = −1.01006e−06
$A_{10}$ = 1.88543e−08

| Zoom Data (∞) | | | |
|---|---|---|---|
| | WE | ST | TE |
| f(mm) | 5.06 | 12.01 | 24.25 |
| $F_{NO}$ | 3.39 | 4.97 | 5.05 |
| 2ω(°) | 79.96 | 35.52 | 17.47 |
| $d_4$ | 0.65 | 4.60 | 15.76 |
| $d_8$ | 12.81 | 4.53 | 1.33 |
| $d_{14}$ | 2.79 | 8.13 | 8.51 |
| $d_{16}$ | 2.64 | 3.14 | 2.93 |

NUMERICAL EXAMPLE 6

| | | | |
|---|---|---|---|
| $r_1$ = 62.175 | $d_1$ = 0.80 | $n_{d1}$ = 2.00170 | $ν_{d1}$ = 20.64 |
| $r_2$ = 30.238 | $d_2$ = 0.10 | | |
| $r_3$ = 22.683 | $d_3$ = 2.74 | $n_{d2}$ = 1.76802 | $ν_{d2}$ = 49.24 |
| $r_4$ = −70.003(AS) | $d_4$ = variable | | |
| $r_5$ = −21.636(AS) | $d_5$ = 0.87 | $n_{d3}$ = 1.83481 | $ν_{d3}$ = 42.71 |
| $r_6$ = 5.619(AS) | $d_6$ = 2.02 | | |
| $r_7$ = 11.015 | $d_7$ = 2.12 | $n_{d4}$ = 1.94595 | $ν_{d4}$ = 17.98 |
| $r_8$ = 28.744 | $d_8$ = variable | | |
| $r_9$ = ∞(S) | $d_9$ = 0.10 | | |
| $r_{10}$ = 4.673(AS) | $d_{10}$ = 2.61 | $n_{d5}$ = 1.58913 | $ν_{d5}$ = 61.14 |
| $r_{11}$ = −14.486(AS) | $d_{11}$ = 0.10 | | |
| $r_{12}$ = 6.566 | $d_{12}$ = 1.30 | $n_{d6}$ = 1.67790 | $ν_{d6}$ = 50.72 |
| $r_{13}$ = 28.591 | $d_{13}$ = 0.80 | $n_{d7}$ = 2.00069 | $ν_{d7}$ = 25.46 |
| $r_{14}$ = 3.627 | $d_{14}$ = variable | | |
| $r_{15}$ = 13.996(AS) | $d_{15}$ = 2.07 | $n_{d8}$ = 1.74330 | $ν_{d8}$ = 49.33 |
| $r_{16}$ = −127.391 | $d_{16}$ = variable | | |
| $r_{17}$ = ∞ | $d_{17}$ = 0.40 | $n_{d9}$ = 1.54771 | $ν_{d9}$ = 62.84 |
| $r_{18}$ = ∞ | $d_{18}$ = 0.50 | | |
| $r_{19}$ = ∞ | $d_{19}$ = 0.50 | $n_{d10}$ = 1.51633 | $ν_{d10}$ = 64.14 |
| $r_{20}$ = ∞ | $d_{20}$ = 0.35 | | |
| $r_{21}$ = ∞(I) | | | |

Aspherical Coefficient

4th Surface

R = −70.003
K = 0.000
$A_4$ = 1.20840e−05   $A_6$ = 7.76197e−08   $A_8$ = −1.68487e−09
$A_{10}$ = 1.05563e−11

5th Surface

R = −21.636
K = 0.004
$A_4$ = 4.00902e−04   $A_6$ = −7.46870e−06   $A_8$ = 7.98424e−08
$A_{10}$ = −2.55494e−10

6th Surface

R = 5.619
K = −0.119
$A_4$ = −1.83831e−04   $A_6$ = 1.27460e−05   $A_8$ = −1.17445e−06
$A_{10}$ = 9.45337e−09

10th Surface

R = 4.673
K = −0.080
$A_4$ = −3.64410e−04   $A_6$ = 3.88128e−05   $A_8$ = 3.87823e−06
$A_{10}$ = 7.28414e−07

11th Surface

R = −14.486
K = 0.000
$A_4$ = 1.77598e−03   $A_6$ = 8.31238e−05   $A_8$ = 9.04999e−06
$A_{10}$ = 1.61068e−06

-continued

15th Surface

R = 13.996
K = 0.000
$A_4 = -4.62486e-05$   $A_6 = 2.50668e-05$   $A_8 = -1.31854e-06$
$A_{10} = 2.85912e-08$

Zoom Data (∞)

|  | WE | ST | TE |
|---|---|---|---|
| f(mm) | 5.06 | 12.03 | 24.30 |
| $F_{NO}$ | 3.38 | 4.95 | 5.05 |
| 2ω(°) | 80.22 | 35.50 | 17.42 |
| $d_4$ | 0.67 | 4.59 | 15.71 |
| $d_8$ | 12.79 | 4.54 | 1.39 |
| $d_{14}$ | 2.79 | 8.12 | 8.57 |
| $d_{16}$ | 2.63 | 3.11 | 2.92 |

NUMERICAL EXAMPLE 7

| | | | |
|---|---|---|---|
| $r_1 = 94.096$ | $d_1 = 0.80$ | $n_{d1} = 2.00170$ | $v_{d1} = 20.64$ |
| $r_2 = 36.640$ | $d_2 = 0.10$ | | |
| $r_3 = 23.265$ | $d_3 = 2.68$ | $n_{d2} = 1.76802$ | $v_{d2} = 49.24$ |
| $r_4 = -65.988$(AS) | $d_4$ = variable | | |
| $r_5 = -20.758$(AS) | $d_5 = 0.87$ | $n_{d3} = 1.88300$ | $v_{d3} = 40.76$ |
| $r_6 = 5.946$(AS) | $d_6 = 2.00$ | | |
| $r_7 = 13.375$ | $d_7 = 1.88$ | $n_{d4} = 2.10227$ | $v_{d4} = 17.10$ |
| $r_8 = 42.000$ | $d_8$ = variable | | |
| $r_9 = ∞$(S) | $d_9 = 0.10$ | | |
| $r_{10} = 4.646$(AS) | $d_{10} = 2.61$ | $n_{d5} = 1.58913$ | $v_{d5} = 61.14$ |
| $r_{11} = -14.474$(AS) | $d_{11} = 0.10$ | | |
| $r_{12} = 6.683$ | $d_{12} = 1.31$ | $n_{d6} = 1.67790$ | $v_{d6} = 50.72$ |
| $r_{13} = 34.534$ | $d_{13} = 0.80$ | $n_{d7} = 2.00069$ | $v_{d7} = 25.46$ |
| $r_{14} = 3.633$ | $d_{14}$ = variable | | |
| $r_{15} = 14.262$(AS) | $d_{15} = 2.07$ | $n_{d8} = 1.74330$ | $v_{d8} = 49.33$ |
| $r_{16} = -68.293$ | $d_{16}$ = variable | | |
| $r_{17} = ∞$ | $d_{17} = 0.40$ | $n_{d9} = 1.54771$ | $v_{d9} = 62.84$ |
| $r_{18} = ∞$ | $d_{18} = 0.50$ | | |
| $r_{19} = ∞$ | $d_{19} = 0.50$ | $n_{d10} = 1.51633$ | $v_{d10} = 64.14$ |
| $r_{20} = ∞$ | $d_{20} = 0.40$ | | |
| $r_{21} = ∞$(I) | | | |

Aspherical Coefficient

4th Surface

R = -65.988
K = 0.000
$A_4 = 1.39994e-05$   $A_6 = 4.31110e-08$   $A_8 = -9.73594e-10$
$A_{10} = 5.44916e-12$

5th Surface

R = -20.758
K = 0.005
$A_4 = 3.78537e-04$   $A_6 = -5.56165e-06$   $A_8 = 2.61919e-08$
$A_{10} = 2.68069e-10$

6th Surface

R = 5.946
K = -0.124
$A_4 = -2.24793e-04$   $A_6 = 1.51367e-05$   $A_8 = -1.22207e-06$
$A_{10} = 1.37423e-08$

10th Surface

R = 4.646
K = -0.078
$A_4 = -3.99703e-04$   $A_6 = 3.77334e-05$   $A_8 = 3.98996e-06$
$A_{10} = 7.39900e-07$

11th Surface

R = -14.474
K = 0.000
$A_4 = 1.73950e-03$   $A_6 = 8.20306e-05$   $A_8 = 9.91441e-06$
$A_{10} = 1.46222e-06$

15th Surface

R = 14.262
K = 0.000
$A_4 = -6.90526e-05$   $A_6 = 2.21932e-05$   $A_8 = -9.10533e-07$
$A_{10} = 1.48759e-08$

Zoom Data (∞)

|  | WE | ST | TE |
|---|---|---|---|
| f(mm) | 5.06 | 11.93 | 24.27 |
| $F_{NO}$ | 3.40 | 4.98 | 5.05 |
| 2ω(°) | 80.76 | 35.88 | 17.48 |
| $d_4$ | 0.67 | 4.54 | 15.84 |
| $d_8$ | 12.77 | 4.58 | 1.31 |
| $d_{14}$ | 2.83 | 8.28 | 8.63 |
| $d_{16}$ | 2.62 | 3.08 | 2.92 |

NUMERICAL EXAMPLE 8

| | | | |
|---|---|---|---|
| $r_1 = 58.074$ | $d_1 = 0.80$ | $n_{d1} = 2.00170$ | $v_{d1} = 20.64$ |
| $r_2 = 29.126$ | $d_2 = 0.10$ | | |
| $r_3 = 22.139$ | $d_3 = 2.59$ | $n_{d2} = 1.76802$ | $v_{d2} = 49.24$ |
| $r_4 = -78.668$(AS) | $d_4$ = variable | | |
| $r_5 = -25.718$(AS) | $d_5 = 0.87$ | $n_{d3} = 1.88300$ | $v_{d3} = 40.76$ |
| $r_6 = 5.522$(AS) | $d_6 = 1.79$ | | |
| $r_7 = 10.009$ | $d_7 = 2.14$ | $n_{d4} = 1.94595$ | $v_{d4} = 17.98$ |
| $r_8 = 26.958$ | $d_8$ = variable | | |
| $r_9 = ∞$(S) | $d_9 = 1.56$ | | |
| $r_{10} = 5.426$(AS) | $d_{10} = 2.61$ | $n_{d5} = 1.58913$ | $v_{d5} = 61.14$ |
| $r_{11} = -11.325$(AS) | $d_{11} = 0.10$ | | |
| $r_{12} = 6.525$ | $d_{12} = 1.54$ | $n_{d6} = 1.69680$ | $v_{d6} = 55.53$ |
| $r_{13} = 23.505$ | $d_{13} = 0.80$ | $n_{d7} = 2.00069$ | $v_{d7} = 25.46$ |
| $r_{14} = 3.652$ | $d_{14}$ = variable | | |
| $r_{15} = 14.723$(AS) | $d_{15} = 2.07$ | $n_{d8} = 1.74330$ | $v_{d8} = 49.33$ |
| $r_{16} = -65.589$ | $d_{16}$ = variable | | |
| $r_{17} = ∞$ | $d_{17} = 0.40$ | $n_{d9} = 1.54771$ | $v_{d9} = 62.84$ |
| $r_{18} = ∞$ | $d_{18} = 0.50$ | | |
| $r_{19} = ∞$ | $d_{19} = 0.50$ | $n_{d10} = 1.51633$ | $v_{d10} = 64.14$ |
| $r_{20} = ∞$ | $d_{20} = 0.35$ | | |
| $r_{21} = ∞$(I) | | | |

Aspherical Coefficient

4th Surface

R = -78.668
K = 0.000
$A_4 = 1.24220e-05$   $A_6 = 2.39631e-08$   $A_8 = -6.58210e-10$
$A_{10} = 3.80349e-12$

5th Surface

R = -25.718
K = 0.004
$A_4 = 4.03510e-04$   $A_6 = -1.13800e-05$   $A_8 = 1.76519e-07$
$A_{10} = -9.01353e-10$

6th Surface

R = 5.522
K = -0.098
$A_4 = -1.95478e-04$   $A_6 = 1.65430e-05$   $A_8 = -2.04581e-06$
$A_{10} = 3.13050e-08$

10th Surface

R = 5.426
K = -0.062
$A_4 = -7.09426e-04$   $A_6 = 1.45894e-05$   $A_8 = -1.51869e-06$
$A_{10} = 3.20154e-07$

-continued

11th Surface

R = −11.325
K = 0.000
A$_4$ = 7.97676e−04    A$_6$ = 3.43174e−05    A$_8$ = −2.71403e−06
A$_{10}$ = 4.90147e−07

15th Surface

R = 14.723
K = 0.000
A$_4$ = −3.54230e−05   A$_6$ = 1.63624e−05    A$_8$ = −6.04370e−07
A$_{10}$ = 9.12960e−09

Zoom Data (∞)

|  | WE | ST | TE |
|---|---|---|---|
| f(mm) | 5.06 | 11.98 | 24.27 |
| F$_{NO}$ | 3.16 | 4.67 | 5.05 |
| 2ω(°) | 80.53 | 35.52 | 17.46 |
| d$_4$ | 0.64 | 4.47 | 15.72 |
| d$_8$ | 11.04 | 3.51 | 1.29 |
| d$_{14}$ | 2.77 | 8.06 | 8.79 |
| d$_{16}$ | 2.60 | 3.16 | 2.95 |

NUMERICAL EXAMPLE 9

| | | | |
|---|---|---|---|
| r$_1$ = 99.053 | d$_1$ = 0.80 | n$_{d1}$ = 2.00170 | ν$_{d1}$ = 20.64 |
| r$_2$ = 36.640 | d$_2$ = 0.10 | | |
| r$_3$ = 23.602 | d$_3$ = 2.72 | n$_{d2}$ = 1.76802 | ν$_{d2}$ = 49.24 |
| r$_4$ = −61.570(AS) | d$_4$ = variable | | |
| r$_5$ = −18.955(AS) | d$_5$ = 0.84 | n$_{d3}$ = 1.81600 | ν$_{d3}$ = 46.62 |
| r$_6$ = 6.082(AS) | d$_6$ = 2.15 | | |
| r$_7$ = 15.037 | d$_7$ = 1.72 | n$_{d4}$ = 2.10227 | ν$_{d4}$ = 17.10 |
| r$_8$ = 42.000 | d$_8$ = variable | | |
| r$_9$ = ∞(S) | d$_9$ = 0.10 | | |
| r$_{10}$ = 4.594(AS) | d$_{10}$ = 2.61 | n$_{d5}$ = 1.58913 | ν$_{d5}$ = 61.14 |
| r$_{11}$ = −14.782(AS) | d$_{11}$ = 0.10 | | |
| r$_{12}$ = 7.013 | d$_{12}$ = 1.29 | n$_{d6}$ = 1.67790 | ν$_{d6}$ = 50.72 |
| r$_{13}$ = 35.080 | d$_{13}$ = 0.80 | n$_{d7}$ = 2.00069 | ν$_{d7}$ = 25.46 |
| r$_{14}$ = 3.735 | d$_{14}$ = variable | | |
| r$_{15}$ = 14.317(AS) | d$_{15}$ = 2.07 | n$_{d8}$ = 1.74330 | ν$_{d8}$ = 49.33 |
| r$_{16}$ = −56.567 | d$_{16}$ = variable | | |
| r$_{17}$ = ∞ | d$_{17}$ = 0.40 | n$_{d9}$ = 1.54771 | ν$_{d9}$ = 62.84 |
| r$_{18}$ = ∞ | d$_{18}$ = 0.50 | | |
| r$_{19}$ = ∞ | d$_{19}$ = 0.50 | n$_{d10}$ = 1.51633 | ν$_{d10}$ = 64.14 |
| r$_{20}$ = ∞ | d$_{20}$ = 0.37 | | |
| r$_{21}$ = ∞(I) | | | |

Aspherical Coefficient

4th Surface

R = −61.570
K = 0.000
A$_4$ = 1.41315e−05    A$_6$ = 4.18374e−08    A$_8$ = −9.02777e−10
A$_{10}$ = 4.86502e−12

5th Surface

R = −18.955
K = 0.005
A$_4$ = 4.04887e−04    A$_6$ = −6.53532e−06   A$_8$ = 6.53892e−08
A$_{10}$ = −1.64331e−10

6th Surface

R = 6.082
K = −0.124
A$_4$ = −1.71542e−04   A$_6$ = 1.45171e−05    A$_8$ = −1.17570e−06
A$_{10}$ = 1.72357e−08

10th Surface

R = 4.594
K = −0.078
A$_4$ = −3.30111e−04   A$_6$ = 4.86037e−05    A$_8$ = 3.10752e−06
A$_{10}$ = 9.98370e−07

11th Surface

R = −14.782
K = 0.000
A$_4$ = 1.89564e−03    A$_6$ = 1.06499e−04    A$_8$ = 6.77189e−06
A$_{10}$ = 2.31800e−06

15th Surface

R = 14.317
K = 0.000
A$_4$ = −7.77744e−05   A$_6$ = 1.98878e−05    A$_8$ = −7.24814e−07
A$_{10}$ = 9.65808e−09

Zoom Data (∞)

|  | WE | ST | TE |
|---|---|---|---|
| f(mm) | 5.06 | 11.89 | 24.27 |
| F$_{NO}$ | 3.37 | 4.92 | 4.99 |
| 2ω(°) | 81.17 | 35.94 | 17.43 |
| d$_4$ | 0.67 | 4.57 | 15.91 |
| d$_8$ | 12.76 | 4.53 | 1.15 |
| d$_{14}$ | 2.81 | 8.30 | 8.66 |
| d$_{16}$ | 2.67 | 3.09 | 2.96 |

Figure 10A:
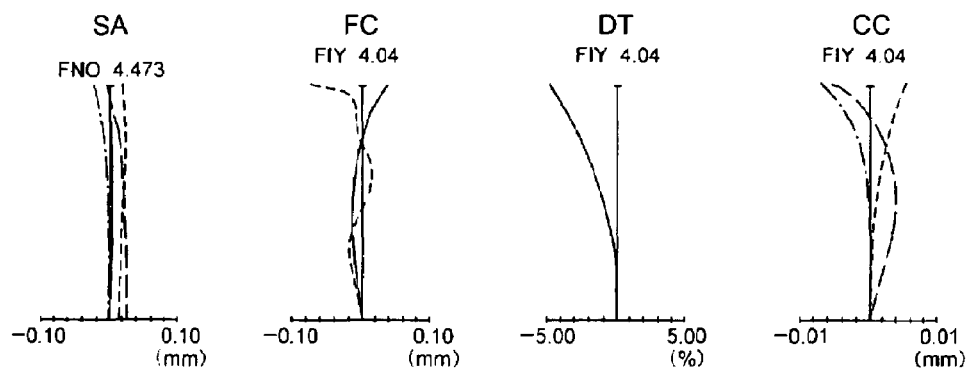
FIGS. 10A to 10C are aberration diagrams of Example 1 of the zoom lens system according to the present invention when focused at infinity, showing a spherical aberration (SA), an astigmatism (FC), a distortion (DT) and a chromatic aberration of magnification (CC)
Figure 10B:
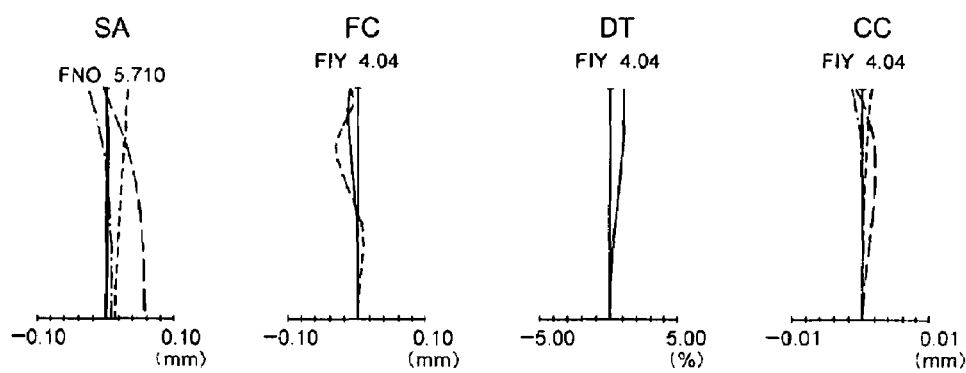
Figure 10C:
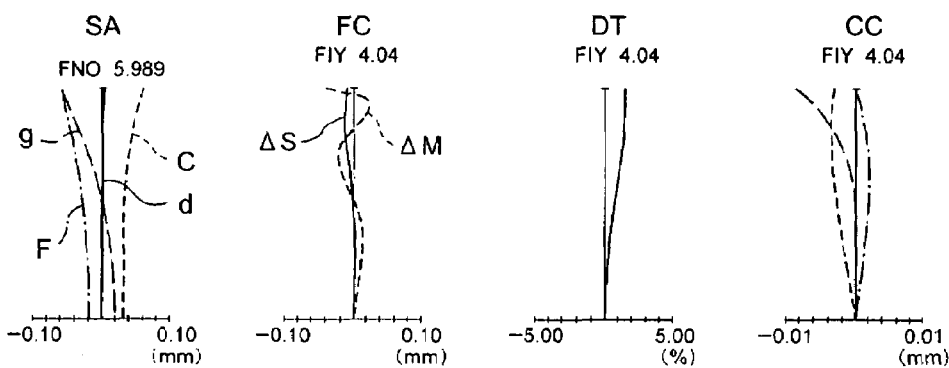
Figure 11A:
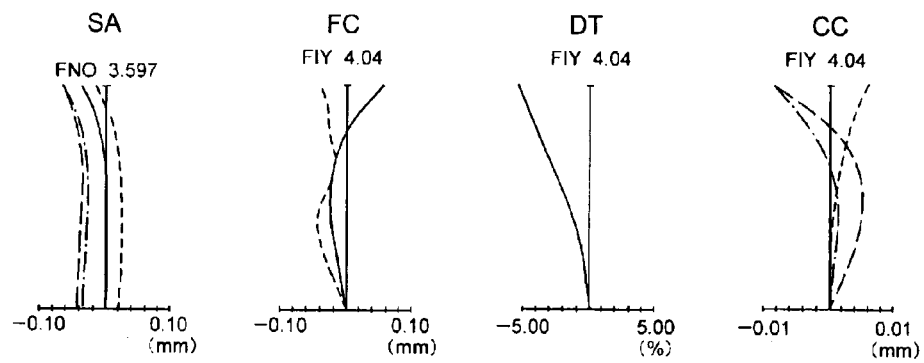
FIGS. 11A to 11C are aberration diagrams of Example 2 of the zoom lens system according to the present invention when focused at infinity, showing a spherical aberration (SA), an astigmatism (FC), a distortion (DT) and a chromatic aberration of magnification (CC)
Figure 11B:
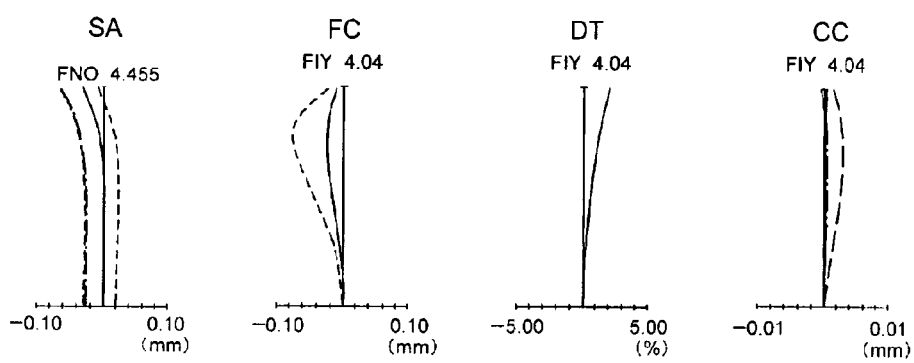
Figure 11C:
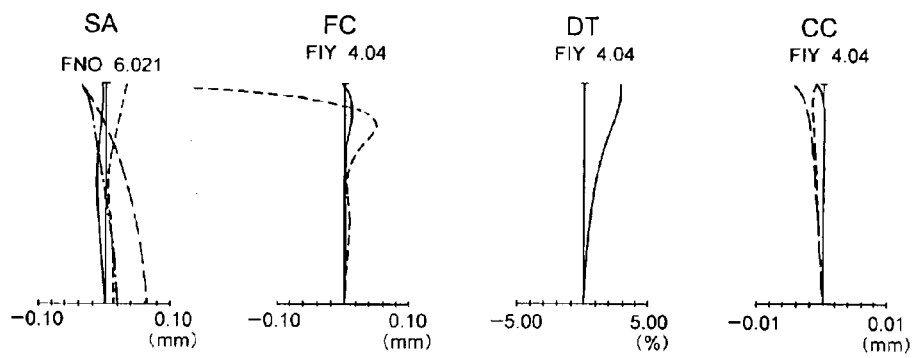
Figure 12A:
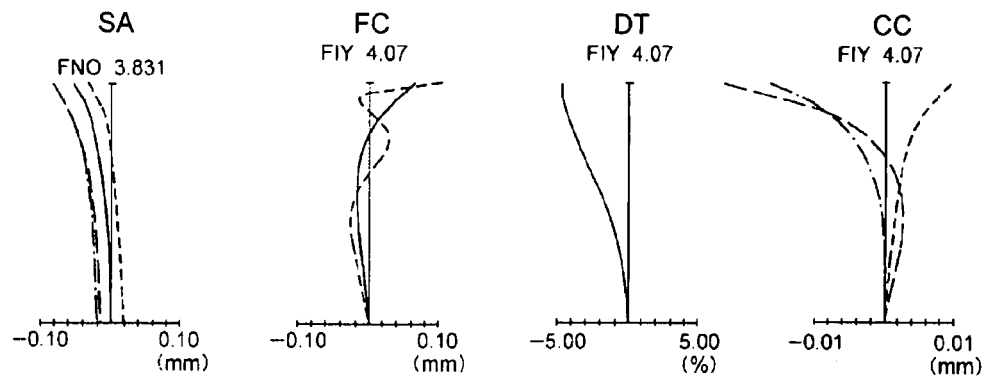
FIGS. 12A to 12C are aberration diagrams of Example 3 of the zoom lens system according to the present invention when focused at infinity, showing a spherical aberration (SA), an astigmatism (FC), a distortion (DT) and a chromatic aberration of magnification (CC)
Figure 12B:
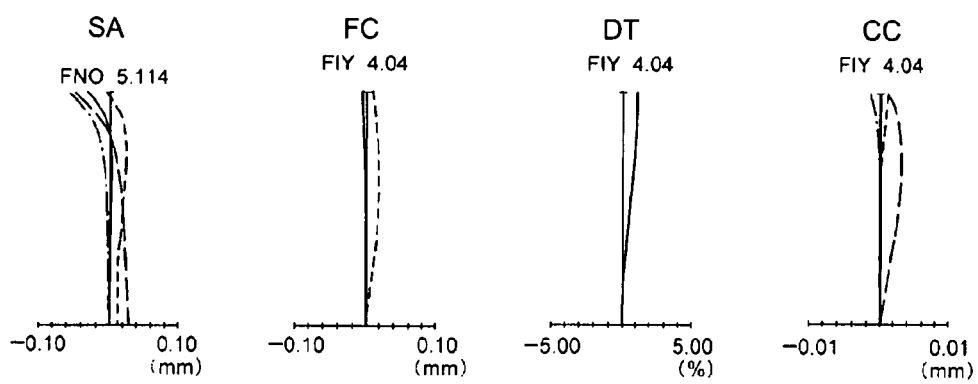
Figure 12C:
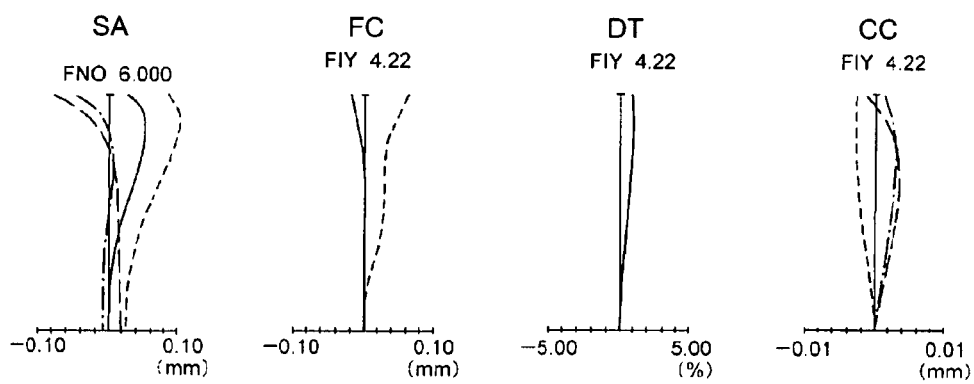
Figure 13A:
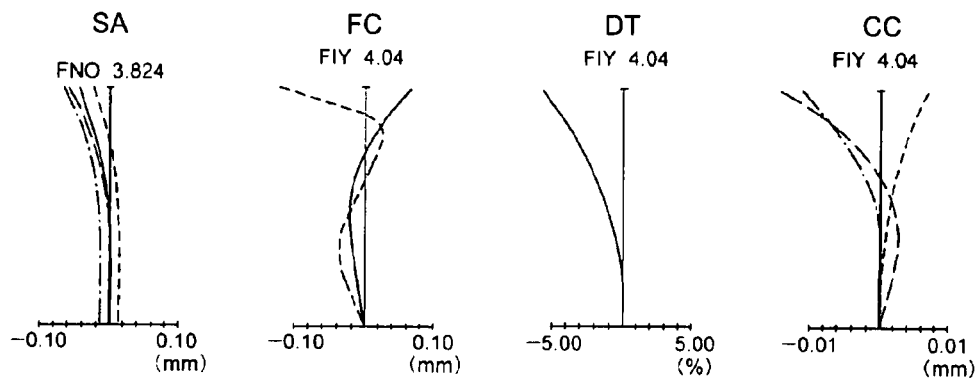
FIGS. 13A to 13C are aberration diagrams of Example 4 of the zoom lens system according to the present invention when focused at infinity, showing a spherical aberration (SA), an astigmatism (FC), a distortion (DT) and a chromatic aberration of magnification (CC)
Figure 13B:
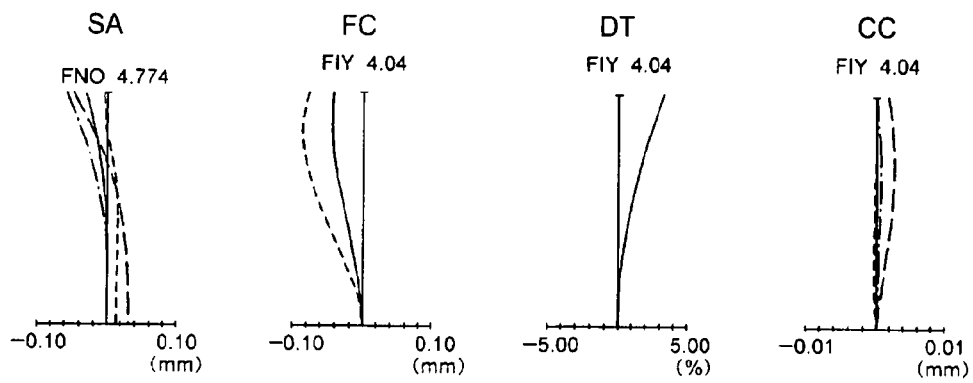
Figure 13C:
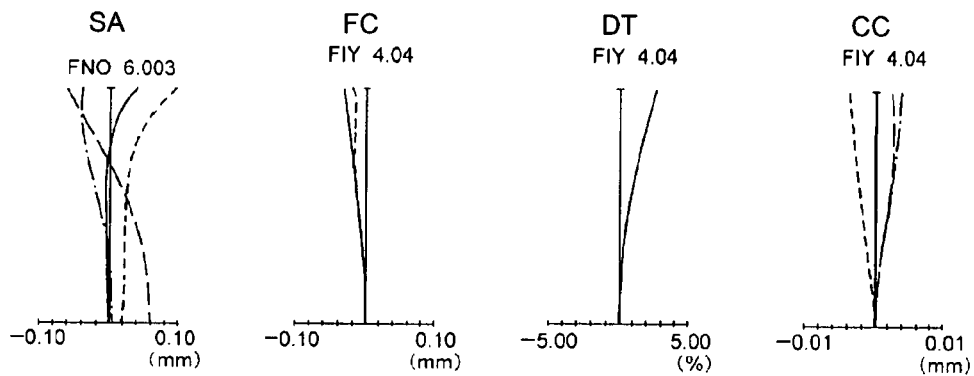
Figure 14A:
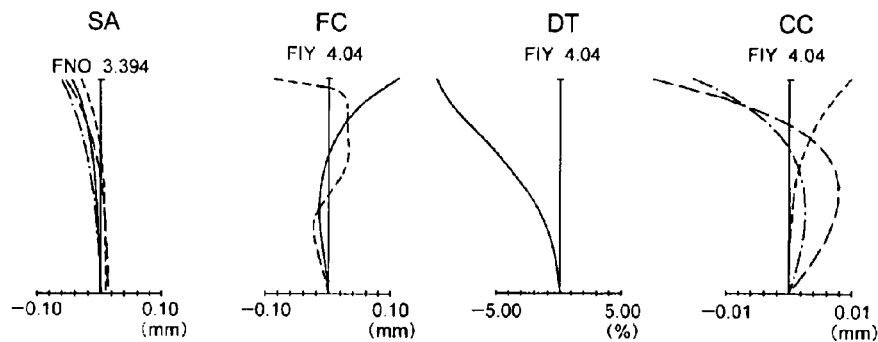
FIGS. 14A to 14C are aberration diagrams of Example 5 of the zoom lens system according to the present invention when focused at infinity, showing a spherical aberration (SA), an astigmatism (FC), a distortion (DT) and a chromatic aberration of magnification (CC)
Figure 14B:
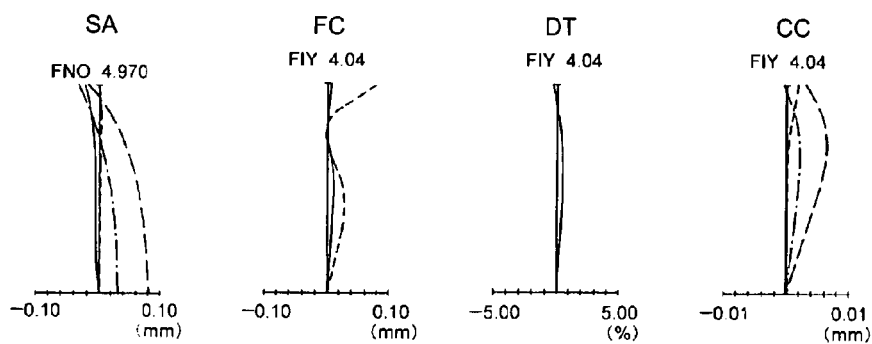
Figure 14C:
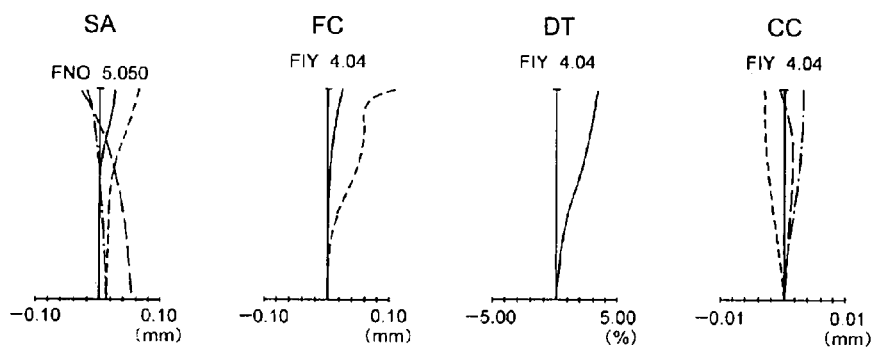
Figure 15A:
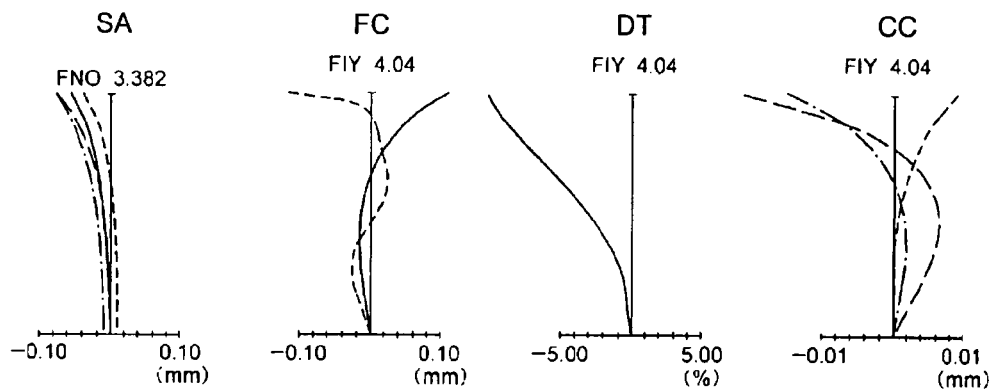
FIGS. 15A to 15C are aberration diagrams of Example 6 of the zoom lens system according to the present invention when focused at infinity, showing a spherical aberration (SA), an astigmatism (FC), a distortion (DT) and a chromatic aberration of magnification (CC)
Figure 15B:
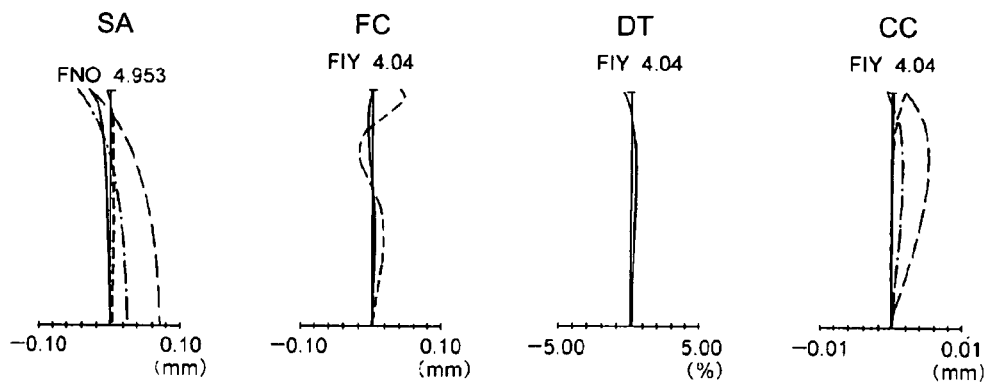
Figure 15C:
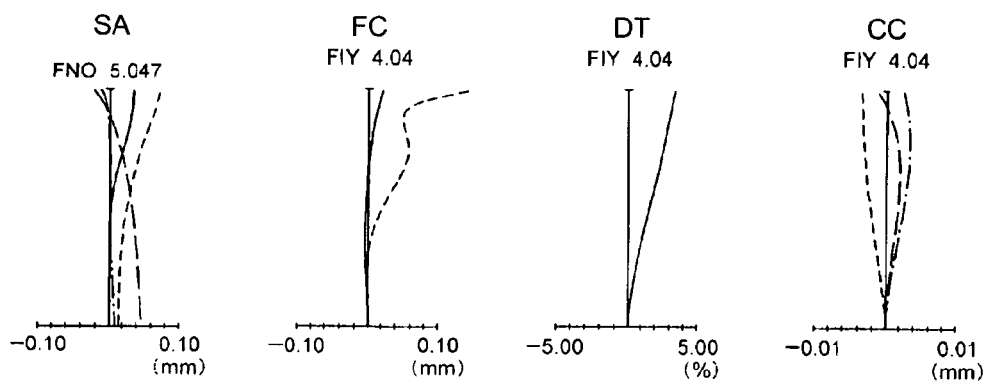
Figure 16A:
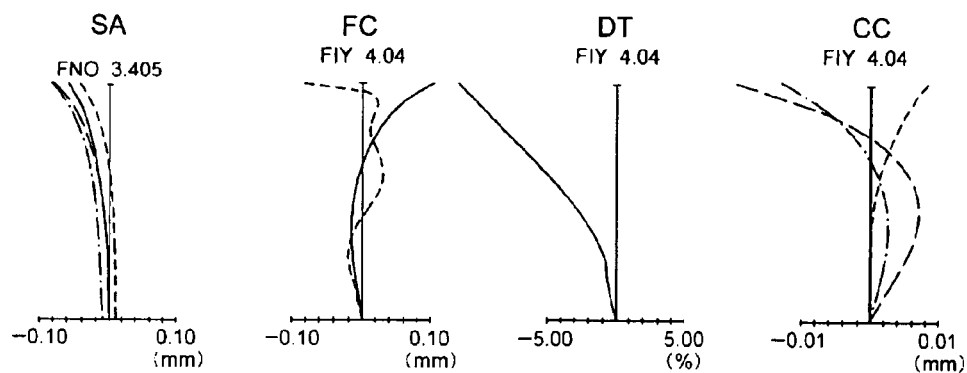
FIGS. 16A to 16C are aberration diagrams of Example 7 of the zoom lens system according to the present invention when focused at infinity, showing a spherical aberration (SA), an astigmatism (FC), a distortion (DT) and a chromatic aberration of magnification (CC)
Figure 16B:
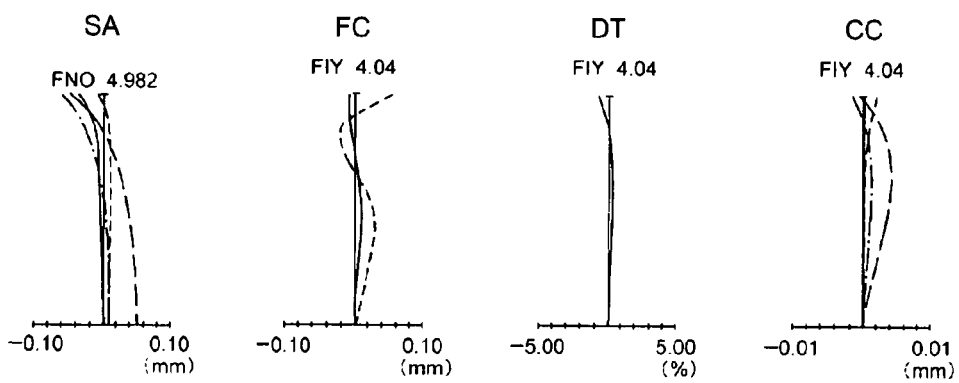
Figure 16C:
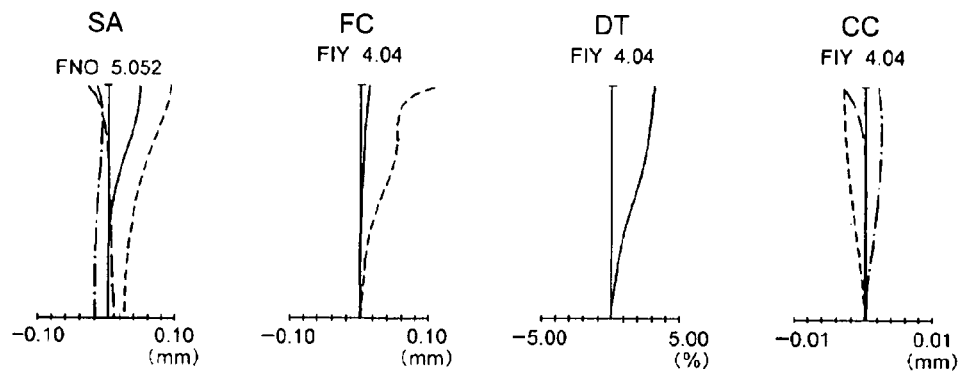
Figure 17A:
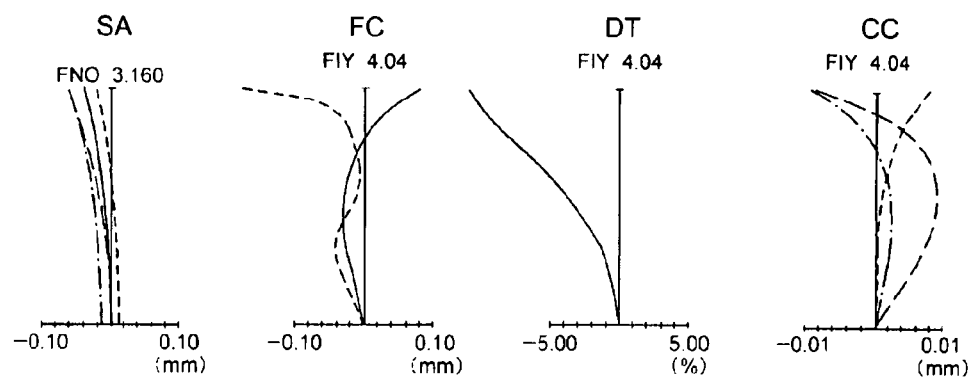
FIGS. 17A to 17C are aberration diagrams of Example 8 of the zoom lens system according to the present invention when focused at infinity, showing a spherical aberration (SA), an astigmatism (FC), a distortion (DT) and a chromatic aberration of magnification (CC)
Figure 17B:
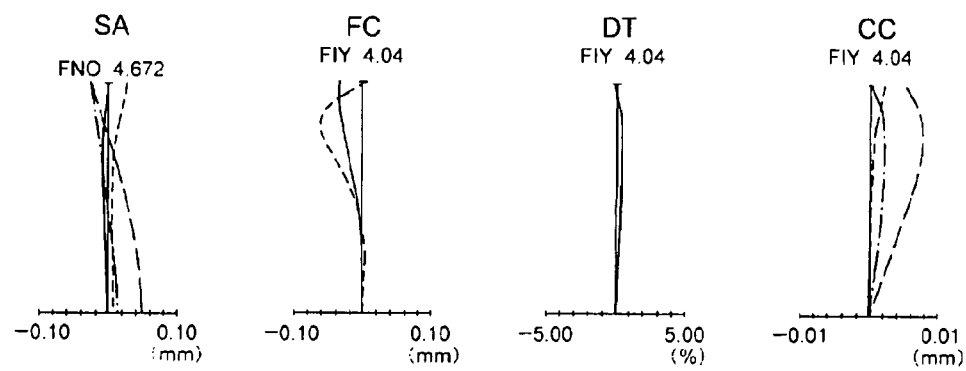
Figure 17C:
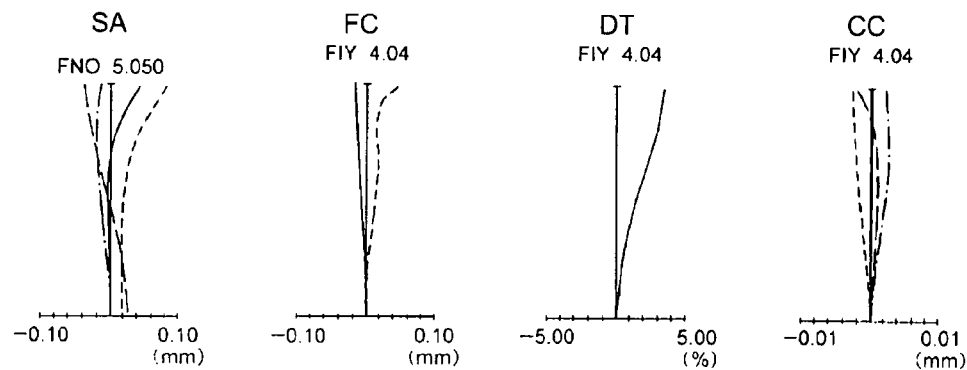
Figure 18A:
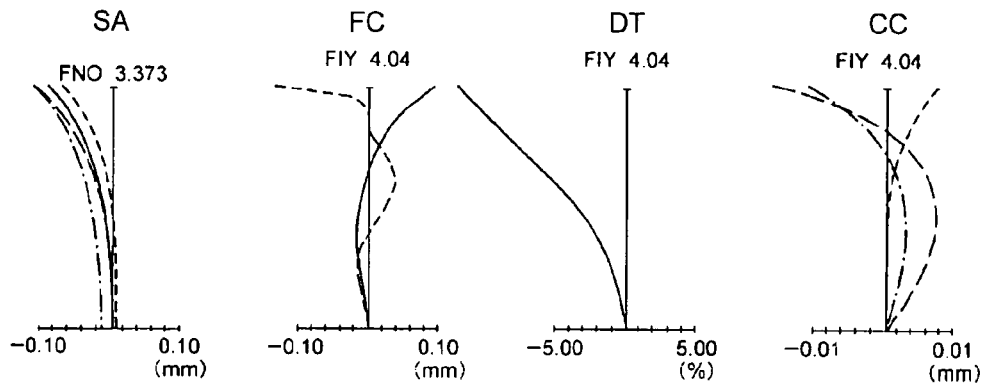
FIGS. 18A to 18C are aberration diagrams of Example 9 of the zoom lens system according to the present invention when focused at infinity, showing a spherical aberration (SA), an astigmatism (FC), a distortion (DT) and a chromatic aberration of magnification (CC)
Figure 18B:
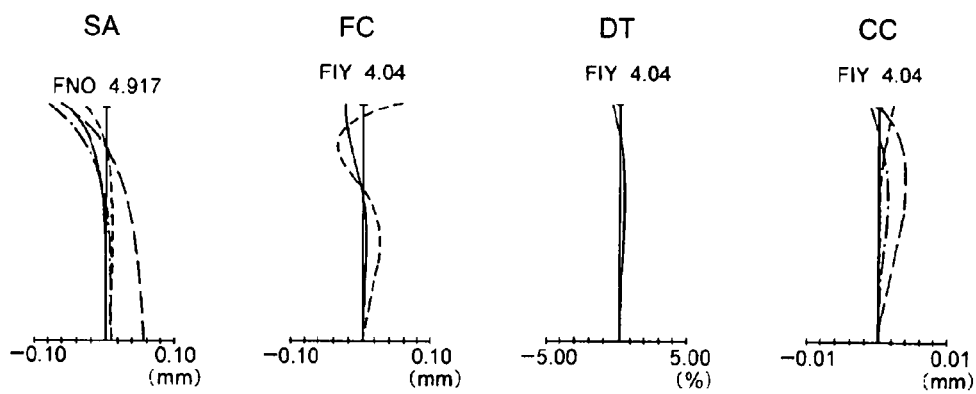
Figure 18C:
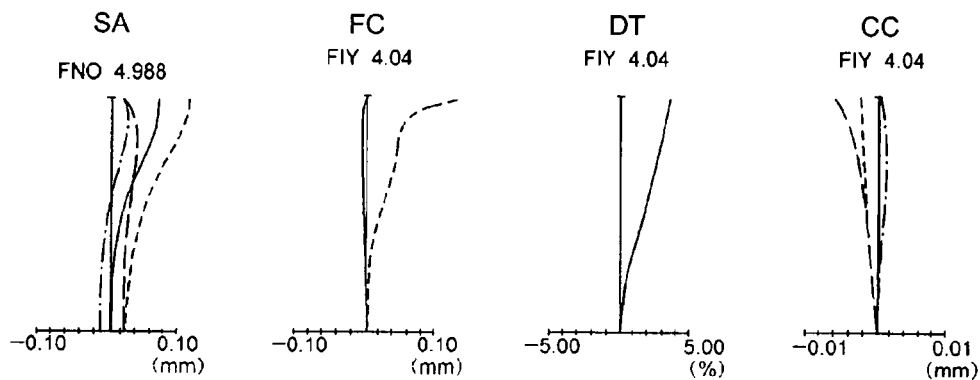

FIGS. 10A to 18C are aberration diagrams of Examples 1 to 9 when focused at infinity In these drawings, FIGS. 10A, A, 12A, . . . show a spherical aberration (SA), an astigmatism (FC), a distortion (DT) and a chromatic aberration of magnification (CC) in a wide-angle end, FIGS. 10B, 11B, 12B, . . . show the aberrations in an intermediate sate, and FIGS. 10C, 11C, 12C, . . . show the aberrations in a telephoto end. In the drawings, "FIY" is a maximum image height.

Values of the conditions of the examples are as follows:

| | Numerical Example | | | | |
|---|---|---|---|---|---|
| | 1 | 2 | 3 | 4 | 5 |
| (1A) n$_{d2p}$ | 1.92286 | 1.92286 | 1.92286 | 2.0017 | 1.94595 |
| (2A) ν$_{d2p}$ | 18.90 | 18.90 | 18.90 | 20.64 | 17.98 |
| (A) |f$_{1n}$|/f$_t$ | 2.697 | 1.579 | 1.367 | 2.042 | 2.425 |
| (B) |f$_{2n}$|/f$_t$ | 0.162 | 0.163 | 0.166 | 0.148 | 0.209 |
| (C) |f$_{1n}$|/|f$_{2n}$| | 16.63 | 9.67 | 8.26 | 13.84 | 11.59 |
| (D) |f$_{1n}$|/f$_{1p}$ | 3.368 | 2.421 | 2.363 | 3.053 | 2.616 |
| (3A) SF$_{2p}$ | −1.955 | −2.593 | −2.667 | −2.542 | −1.902 |
| (4A) |f$_2$/f$_t$| | 0.273 | 0.266 | 0.270 | 0.255 | 0.351 |
| (5A) n$_{d2n}$ | 1.88300 | 1.80495 | 1.80495 | 1.80495 | 1.88300 |
| (6A) ν$_{d2n}$ | 40.76 | 40.9 | 40.9 | 40.9 | 40.76 |
| (7A) SF$_{2n}$ | 0.663 | 0.568 | 0.624 | 0.616 | 0.602 |
| (8A) (|ASP$_{2nf}$| + |ASP$_{2nr}$|)/f$_w$ | 0.054 | 0.059 | 0.057 | 0.090 | 0.131 |
| (9A) L$_{1np}$/L$_1$ | 0.079 | — | 0.095 | 0.077 | 0.028 |

-continued

|  | | | | | |
|---|---|---|---|---|---|
| (10A) $f_1/f_t$ | 1.161 | 1.145 | 1.010 | 1.021 | 1.492 |
| (11A) $f_3/f_t$ | 0.326 | 0.314 | 0.333 | 0.328 | 0.381 |
| (12A) $f_4/f_t$ | 0.586 | 0.539 | 0.490 | 0.502 | 0.594 |
| (13A) $f_t/f_w$ | 4.810 | 4.800 | 4.847 | 4.781 | 4.791 |
| (1B) $n_{d2n}$ | 1.88300 | 1.80495 | 1.80495 | 1.80495 | 1.88300 |
| (2B) $v_{d2n}$ | 40.76 | 40.9 | 40.9 | 40.9 | 40.76 |

| | Numerical Example | | | |
|---|---|---|---|---|
| | 6 | 7 | 8 | 9 |
| (1A) $n_{d2p}$ | 1.94595 | 2.10226 | 1.94595 | 2.10226 |
| (2A) $v_{d2p}$ | 17.98 | 17.10 | 17.98 | 17.1 |
| (A) $|f_{1n}|/f_t$ | 2.449 | 2.486 | 2.438 | 2.407 |
| (B) $|f_{2n}|/f_t$ | 0.217 | 0.212 | 0.209 | 0.229 |
| (C) $|f_{1n}|/|f_{2n}|$ | 11.30 | 11.70 | 11.64 | 10.51 |
| (D) $|f_{1n}|/f_{1p}$ | 2.634 | 2.658 | 2.600 | 2.594 |
| (3A) $SF_{2p}$ | −2.243 | −1.935 | −2.181 | −2.115 |
| (4A) $|f_2/f_t|$ | 0.348 | 0.353 | 0.349 | 0.357 |
| (5A) $n_{d2n}$ | 1.83481 | 1.88300 | 1.88300 | 1.81600 |
| (6A) $v_{d2n}$ | 42.71 | 40.76 | 40.76 | 46.62 |
| (7A) $SF_{2n}$ | 0.588 | 0.555 | 0.646 | 0.5142 |
| (8A) $(|ASP_{2nf}| + |ASP_{2nr}|)/f_w$ | 0.150 | 0.124 | 0.108 | 0.1180 |
| (9A) $L_{1np}/L_1$ | 0.027 | 0.028 | 0.029 | 0.028 |
| (10A) $f_1/f_t$ | 1.495 | 1.489 | 1.523 | 1.4984 |
| (11A) $f_3/f_t$ | 0.379 | 0.384 | 0.375 | 0.3870 |
| (12A) $f_4/f_t$ | 0.599 | 0.563 | 0.574 | 0.5459 |
| (13A) $f_t/f_w$ | 4.800 | 4.794 | 4.793 | 4.7947 |
| (1B) $n_{d2n}$ | 1.83481 | 1.88300 | 1.88300 | 1.81600 |
| (2B) $v_{d2n}$ | 42.71 | 40.76 | 40.76 | 46.62 |

Each example realizes a zoom lens optical system which is developed so as to easily thin a camera and which has a high zoom ratio of about five. A satisfactory image quality of a shot image is maintained, and the system is suitable for an electronic image pickup device such as a CCD image sensor or a CMOS type image sensor. Moreover, a zoom lens system is realized in which the number of lenses constituting the zoom lens system is reduced. In consequence, without impairing portability of the camera, a user's demand to expand a photographing region can be satisfied.

It is to be noted that, in a case where each example is provided with a shutter unit which moves integrally with an aperture stop, the shutter unit is not enlarged, and an only small dead space is required in moving the aperture stop and the shutter unit.

Moreover, to cut unnecessary light such as ghost or flare, in addition to the aperture stop, a flare stop may be arranged. The flare stop may be arranged at one of a position on the object side in the first lens unit, a position between the first lens unit and the second lens unit, a position between the second lens unit and the third lens unit, a position between the third lens unit and the fourth lens unit and a position between the fourth lens unit and the image surface. A frame member may be constituted so as to cut a flare ray, or another member may be disposed to constitute the flare stop. The flare stop may directly be printed, coated or attached as a seal to an optical system. A shape of an aperture of the flare stop may be any shape such as a circular shape, an elliptic shape, a rectangular shape, a polygonal shape or a shape of a range surrounded with a function curve. Not only a harmful light flux but also a light flux such as a coma flare in the peripheral portion of the image may be cut.

Furthermore, each lens may be provided with an anti-reflection coating to reduce the ghost or the flare. A multi-layered coating is preferable because the coating can effectively reduce the ghost or the flare. An infrared ray cutting coating may be applied to the lens surface, the cover glass or the like.

In addition, to prevent the generation of the ghost or the flare, an air contact surface of the lens is generally provided with the anti-reflection coating. On the other hand, an adhesive material of a cementing surface of the cemented lens has a refractive index which is sufficiently higher than that of air. Therefore, a reflectance of the cementing surface is originally substantially equal to or less than that of a single-layered anti-reflection coating in many cases, and the cementing surface is little provided with the anti-reflection coating.

However, when the cementing surface is positively provided with the anti-reflection coating, the ghost or the flare can further be reduced, and a more satisfactory image can be obtained. Especially, in recent years, a vitreous material having a high refractive index becomes to be widely used. Since the material has a high aberration correcting effect, the material is frequently used in the camera optical system. However, when the vitreous material having a high refractive index is used as the cemented lens, reflection on the cementing surface cannot be ignored. In such a case, it is especially effective that the cementing surface is provided with the anti-reflection coating.

An effective method of using the coating on the cementing surface is disclosed in Japanese Patent Application Laid-Open Nos. 2-27,301, 2001-324,676 and 2005-92,115, U.S. Pat. No. 7,116,482 and the like. In these documents, the coating disposed on the cementing surface of the cemented lens of the first lens unit of a positive-lead type zoom lens system is described. The cemented lens surface of the first lens unit having a positive power according to the present invention may be constituted as disclosed in these documents. The material for use in the coating may appropriately be selected from $Ta_2O_5$, $TiO_2$, $Nb_2O_5$, $ZrO_2$, $HfO_2$, $CeO_2$, $SnO_2$, $In_2O_3$, $ZnO$, $Y_2O_3$ and the like having a comparatively high refractive index, $MgF_2$, $SiO_2$, $Al_2O_3$ and the like having a comparatively small refractive index in accordance with the refractive index of the lens constituting a substrate and the refractive index of the adhesive material, and a film thickness may be set so as to satisfy phase conditions.

The coating on the cementing surface may be a multi-layered coating in the same manner as in the coating on the air contact surface of the lens. When the coating materials and film thicknesses of two or more layers are appropriately combined, the reflectance can further be reduced, and a spectral characteristic, an angular characteristic and the like of the reflectance can be controlled. The lens cementing surface other than that of the first lens unit may be provided with the cementing surface coating based on a similar idea.

Moreover, it is preferable that focusing is performed by moving the fourth lens unit. When the fourth lens unit performs the focusing, an only small load is applied to a motor for driving the focusing lens, because the lens have a small weight. Furthermore, during the focusing, the total length of the zoom lens system does not change. The driving motor can be arranged in a lens barrel. Therefore, the lens barrel can advantageously be miniaturized.

The focusing may be performed by moving the first, second or third lens unit, or by moving a plurality of lens units. The whole lens system may be extended or retracted to perform the focusing, or a part of the lenses may be moved to perform the focusing.

Furthermore, the shading of the brightness of the peripheral portion of the image may be reduced by shifting a micro lens disposed at a CCD image sensor. For example, design of the micro lens disposed at the CCD image sensor may be changed in accordance with the incidence angle of the ray at each image height. A drop amount of brightness in the peripheral portion of the image may be corrected by image processing.

In addition, the distortion may be generated in the optical system, and the image is electrically processed after the photographing to correct the distortion.

When the image of each color of RGB is individually subjected to correction of the distortion or a magnification, the chromatic aberration of magnification can simultaneously electrically be corrected.

Figure 19:
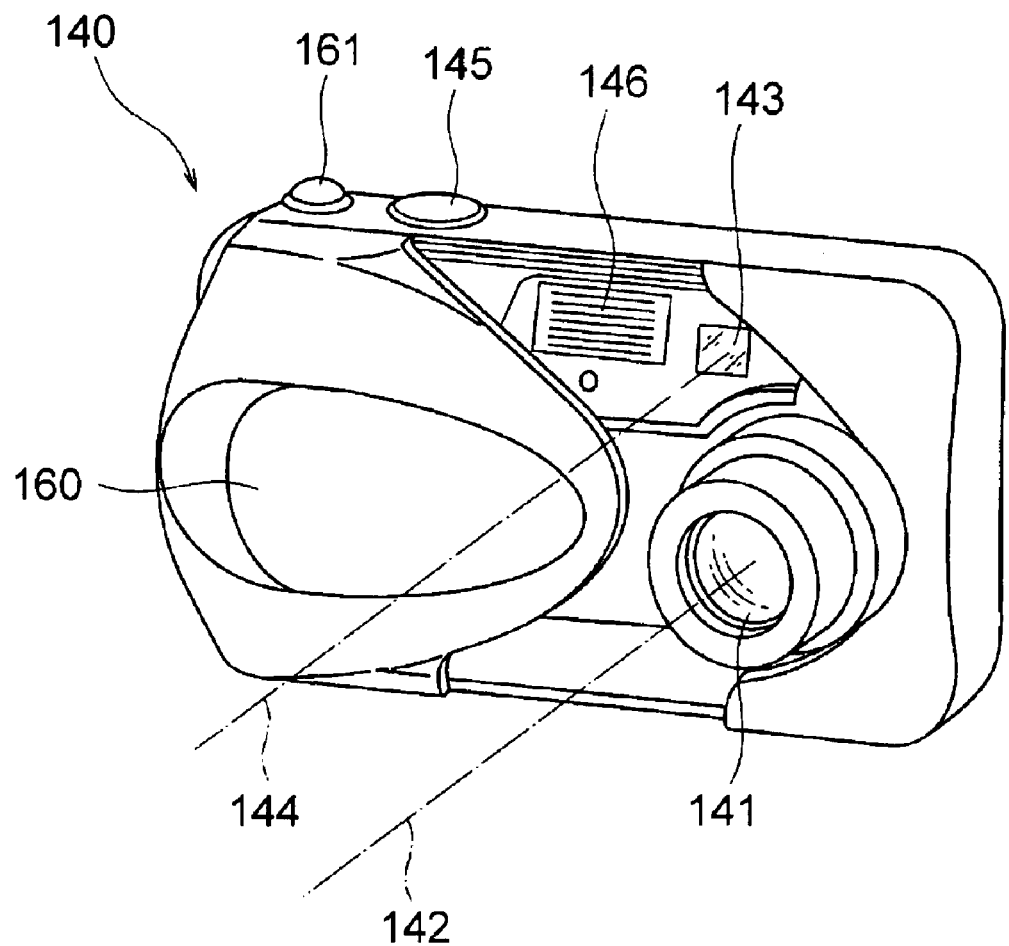
FIG. 19 is a front perspective view showing an appearance of a digital camera according to the present invention.
Figure 20:
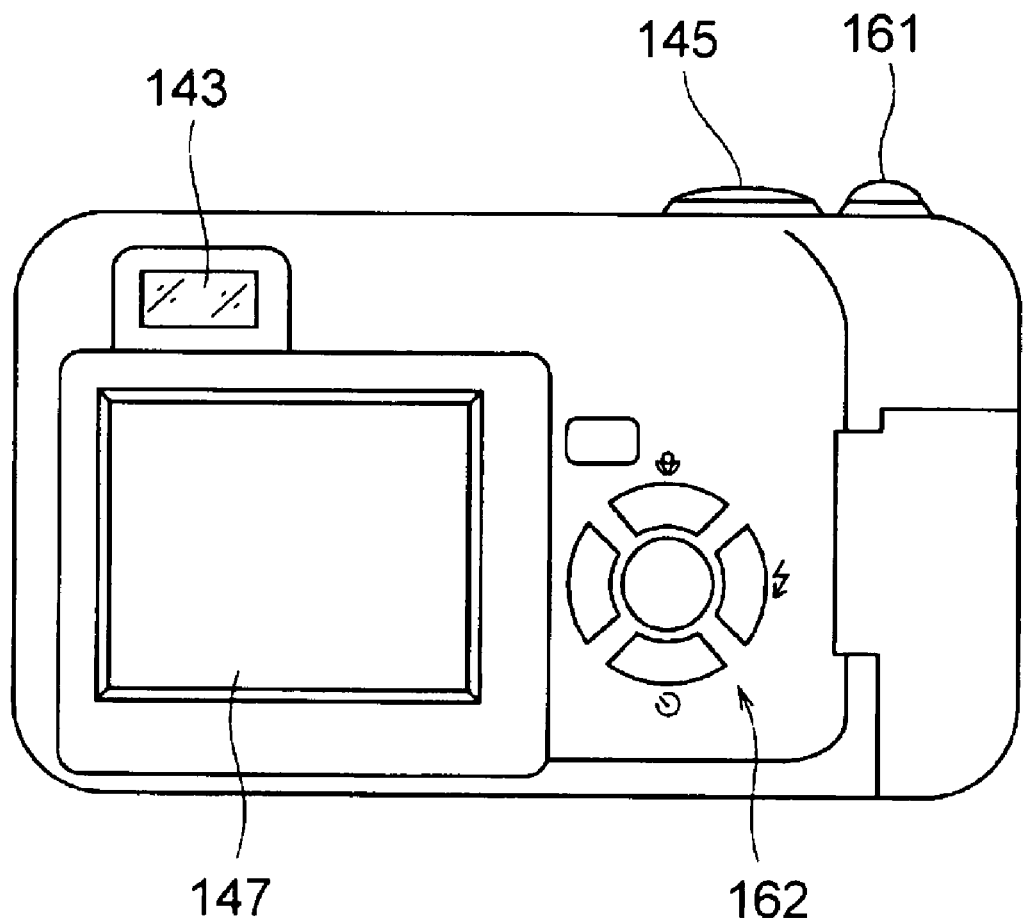
FIG. 20 is a back view of the digital camera of FIG. 19.
Figure 21:
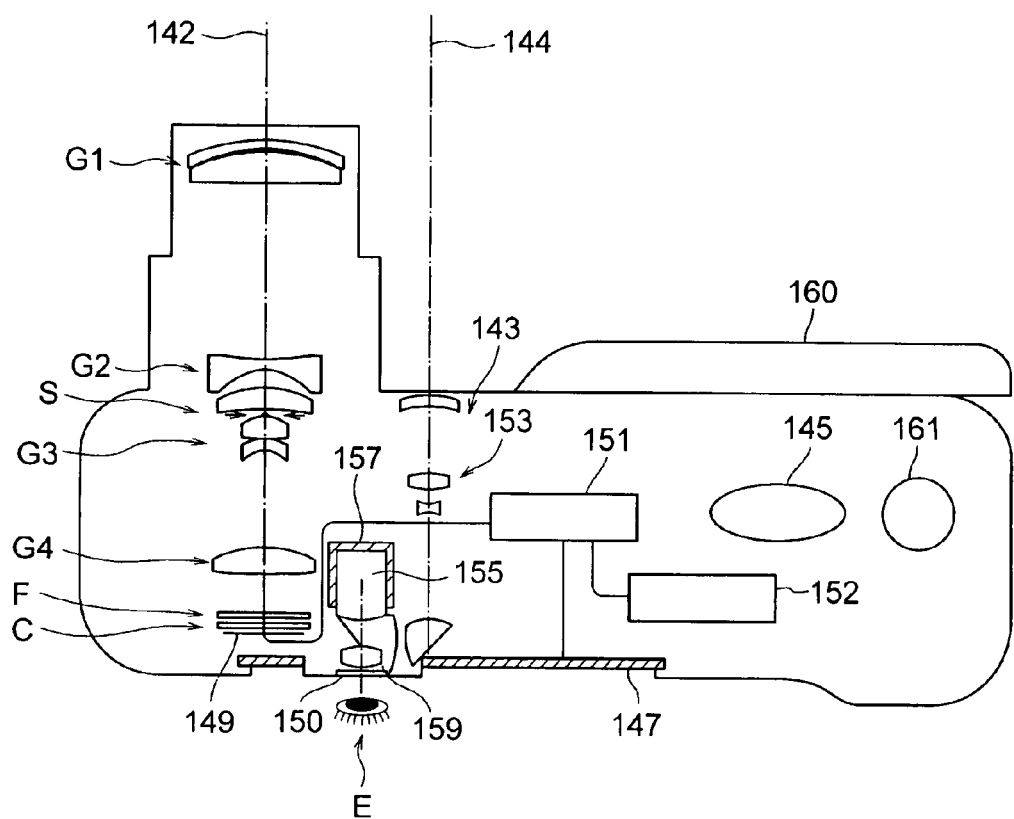
FIG. 21 is a schematic sectional view of the digital camera of FIG. 19.

FIGS. 19 to 21 are conceptual diagrams showing a constitution of a digital camera to which the zoom lens system of the present invention is applied. FIG. 19 is a front perspective view showing an appearance of a digital camera, FIG. 20 is a back view of the digital camera, and FIG. 21 is a schematic sectional view of the digital camera of FIG. 19. FIGS. 19 and 21 show a non-collapsed state of a photographing optical system.

A digital camera 140 includes a photographing optical system 141 having an optical path 142 for photographing, a finder optical system 143 having an optical path 144 for a finder, a shutter release button 145, a flash lamp 146, a liquid crystal display monitor 147, a focal length change button 161, a setting change switch 162 and the like. In a case where the photographing optical system 141 is collapsed, when a cover 160 is slid, the photographing optical system 141, the finder optical system 143 and the flash lamp 146 are covered with the cover 160. Moreover, when the cover 160 is opened to bring the camera 140 into a photographing state, the photographing optical system 141 is brought into the non-collapsed state shown in FIG. 21. When the shutter release button 145 disposed at an upper portion of the camera 140 is pressed, the photographing is performed through the photographing optical system 141 in response to the pressed button. In the example of FIG. 21, the zoom lens system of Example 1 is used as the photographing optical system 141. The zoom lens systems of other Examples may be used. An image of an object to be photographed is formed by the photographing optical system 141 on an image pickup surface of a CCD image sensor 149 via a low pass filter F and a cover glass C provided with a wavelength band restrictive coating. The object image received by the CCD image sensor 149 is converted into an electric signal and displayed as an electronic image in the liquid crystal display monitor 147 provided at a back surface of the camera via processing means 151. The processing means 151 is connected to recording means 152, and the photographed electronic image can be recorded. This recording means 152 may be integrated with the processing means 151, or the means may separately be arranged. As the recording means 152, a hard disk drive (HDD), a memory card, a DVD or the like may be used.

An objective optical system 153 for the finder is disposed along the optical path 144 for the finder. The objective optical system 153 for the finder is constituted of a plurality of lens units (three lens units in the drawing) and two prisms. The system includes a zoom optical system in which a focal length changes in conjunction with the zooming performed by the photographing optical system 141. The object image is formed by the objective optical system 153 for the finder on a view field frame 157 of an erecting prism 155 which is an image erecting member. Behind this erecting prism 155, an eyepiece optical system 159 is disposed which guides an erected object image into an observer's eyeball E. A cover member 150 is disposed on an emission side of the eyepiece optical system 159.

In the digital camera 140 constituted in this manner, the zoom lens system according to the present invention is used as the photographing optical system 141. Therefore, the camera has a remarkably small thickness when the lens barrel is collapsed, and has a high zoom ratio. Moreover, an image forming performance is remarkably stable in the whole zooming region. Therefore, the high performance, the miniaturization and the wide angle of view can be realized.

The above-described example implementations of the present invention are not to be regarded as limiting and may be varied in many ways without departing from the spirit and scope of the invention, and such modifications are intended to be included within the scope of the present invention.

What is claimed is:

1. A zoom lens system comprising: in order from an object side,
    a first lens unit having a positive refractive power, wherein the total number of lenses of the first lens unit is two or less;
    a second lens unit having a negative refractive power;
    a third lens unit having a positive refractive power; and
    a fourth lens unit having a refractive power,
    during zooming from a wide-angle end to a telephoto end, a space between the first lens unit and the second lens unit, a space between the second lens unit and the third lens unit and a space between the third lens unit and the fourth lens unit being changed,
    the second lens unit including two lenses of a negative lens and a positive lens in order from the object side, wherein the positive lens of the second lens unit is a meniscus lens having a convex shape which faces the object side and wherein the total number of lenses of the second lens unit is two;
    the zoom lens system further comprises an aperture stop;
    during the zooming from the wide-angle end to the telephoto end, the first, second, third and fourth lens units being moved so that the space between the first lens unit and the second lens unit enlarges, the space between the second lens unit and the third lens unit narrows and the space between the third lens unit and the fourth lens unit enlarges, the aperture stop being moved together with the third lens unit in an optical axis direction, and the following conditions being satisfied:

$$1.88 < n_{d2p} < 2.20 \quad (1A);$$

$$13.0 < v_{d2p} < 3.00 \quad (2A); \text{ and}$$

$$-5.0 < SF_{2p} < -1.0 \quad (3A),$$

in which $n_{d2p}$ is a refractive index of the positive lens of the second lens unit for the d-line, $v_{d2p}$ is the Abbe number of the positive lens of the second lens unit, and $SF_{2p}$ is defined by $SF_{2p} = (R_{2pf} + R_{2pr})/(R_{2pf} - R_{2pr})$, wherein $R_{2pf}$ is a paraxial radius of curvature of an object-side surface of the positive lens of the second lens unit, and $R_{2pr}$ is a paraxial radius of curvature of an image-side surface of the positive lens of the second lens unit.

2. The zoom lens system according to claim 1, which satisfies the following condition:

$$0.12 < |f_2/f_t| < 0.60 \quad (4A),$$

in which $f_2$ is a focal length of the second lens unit, and $f_t$ is a focal length of the zoom lens system in the telephoto end.

3. The zoom lens system according to claim 1, which satisfies the following conditions:

$$1.76 < n_{d2n} < 2.00 \quad (5A); \text{ and}$$

$$35.0 < v_{d2n} < 50.0 \quad (6A),$$

in which $n_{d2n}$ is a refractive index of the negative lens of the second lens unit for the d-line, and $v_{d2n}$ is the Abbe number of the negative lens of the second lens unit.

4. The zoom lens system according to claim 1, wherein the negative lens of the second lens unit is a double-concave lens which satisfies the following condition:

$$0.35 < SF_{2n} < 1.00 \quad (7A),$$

in which $SF_{2n}$ is defined by $SF_{2n} = (R_{2nf} + R_{2nr})/(R_{2nf} - R_{2nr})$, $R_{2nf}$ is a paraxial radius of curvature of an object-side surface of the negative lens of the second lens unit, and $R_{2nr}$ nr is a paraxial radius of curvature of an image-side surface of the negative lens of the second lens unit.

5. The zoom lens system according to claim 1, wherein at least one lens surface of the negative lens of the second lens unit is an aspherical surface, and satisfies the following condition:

$$0.030 < (|ASP_{2nf}| + |ASP_{2nr}|)/f_w < 0.320 \quad (8A),$$

in which $ASP_{2nf}$ is an aspherical displacement of an object-side surface of the negative lens of the second lens unit, $ASP_{2nr}$ is an aspherical displacement of an image-side surface of the negative lens of the second lens unit, and $f_w$ is a focal length of the zoom lens system in the wide-angle end.

6. The zoom lens system according to claim 5, wherein said at least one aspherical surface of the negative lens of the second lens unit has a refractive power of a portion of which increases as the portion of the aspherical surface comes away from an optical axis.

7. The zoom lens system according to claim 6, wherein the negative lens of the second lens unit is a double-concave lens, and each of an object-side surface and an image-side surface of the double-concave lens is an aspherical surface, and each of the object-side surface and the image-side surface of the double-concave lens has a refractive power of a portion of which increases as the portion of the aspherical surface comes away from an optical axis.

8. The zoom lens system according to claim 1, wherein the first lens unit includes a negative lens and a positive lens in order from the object side.

9. The zoom lens system according to claim 1, wherein the first lens unit includes a negative lens and a positive lens in order from the object side, and the negative lens is cemented to the positive lens.

10. The zoom lens system according to claim 1, wherein the first lens unit includes a negative lens and a positive lens, and the negative lens and the positive lens are single lenses, respectively, which are arranged separately.

11. The zoom lens system according to claim 10, wherein an axial space between the negative lens and the positive lens of the first lens unit satisfies the following condition:

$$0.0 < L_{1np}/L_1 < 0.2 \quad (9A),$$

in which $L_{1np}$ is the axial space between the negative lens and the positive lens of the first lens unit, and $L_1$ is a total axial thickness of the first lens unit.

12. The zoom lens system according to claim 1, wherein the total number of the lenses of the third lens unit is three or less.

13. The zoom lens system according to claim 12, wherein the third lens unit includes a positive lens and a negative lens in order from the object side, and the total number of the lenses of the third lens unit is two.

14. The zoom lens system according to claim 12, wherein the third lens unit includes three lenses of a positive lens, a positive lens and a negative lens in order from the object side.

15. The zoom lens system according to claim 14, wherein the negative lens of the third lens unit is cemented to the adjacent positive lens on the object side.

16. The zoom lens system according to claim 14, which satisfies the following condition:

$$0.50 < f_1/f_t < 2.00 \quad (10A),$$

in which $f_1$ is a focal length of the first lens unit, and $f_t$ is a focal length of the zoom lens system in the telephoto end.

17. The zoom lens system according to claim 1, which satisfies the following condition:

$$0.16 < f_3/f_t < 0.80 \quad (11A),$$

in which $f_3$ is a focal length of the third lens unit, and $f_t$ is a focal length of the zoom lens system in the telephoto end.

18. The zoom lens system according to claim 1, which satisfies the following condition:

$$0.24 < f_4/f_t < 0.80 \quad (12A),$$

in which $f_4$ is a focal length of the fourth lens unit, and $f_t$ is a focal length of the zoom lens system in the telephoto end.

19. The zoom lens system according to claim 1, wherein during the zooming from the wide-angle end to the telephoto end, the first lens unit moves so as to be positioned closer to the object side in the telephoto end than in the wide-angle end, the second lens unit moves, the third lens unit moves toward only the object side, and the fourth lens unit moves, and the aperture stop is positioned between the second lens unit and the third lens unit, and moves integrally with the third lens unit in the optical axis direction during the zooming.

20. The zoom lens system according to claim 1, which is a four-unit zoom lens system, the total number of lens units included in the zoom lens system being four.

21. The zoom lens system according to claim 1, wherein the fourth lens unit has a positive refractive power.

22. An electronic image pickup apparatus comprising:
the zoom lens system according to claim 1; and
an electronic image pickup device which is arranged on an image side of the zoom lens system and which converts an optical image formed by the zoom lens system into an electric signal.

23. A zoom lens system comprising: in order from an object side.
a first lens unit having a positive refractive power;
a second lens unit having a negative refractive power;
a third lens unit having a positive refractive power; and
a fourth lens unit having a refractive power,
during zooming from a wide-angle end to a telephoto end, a space between the first lens unit and the second lens unit, a space between the second lens unit and the third lens unit and a space between the third lens unit and the fourth lens unit being changed,
the first lens unit including a positive lens and a negative lens, the total number of the lenses of the first lens unit being two,
the second lens unit including a negative lens and a positive lens in order from the object side, the total number of the lenses of the second lens unit being two,
the zoom lens system further comprises an aperture stop,
during the zooming from the wide-angle end to the telephoto end, the first, second, third and fourth lens units being moved so that the space between the first lens unit and the second lens unit enlarges, the space between the second lens unit and the third lens unit narrows and the space between the third lens unit and the fourth lens unit enlarges,
the aperture stop being moved together with the third lens unit in an optical axis direction,
wherein the following conditions are satisfied:

$$1.78 < n_{d2n} < 2.10 \quad (1B); \text{ and}$$

$$35.0 < v_{d2n} < 50.0 \quad (2B),$$

in which $n_{d2n}$ is a refractive index of the negative lens of the second lens unit for the d-line, and $v_{d2n}$ is the Abbe number of the negative lens of the second lens unit.

24. The zoom lens system according to claim 23, which satisfies the following conditions:

$$0.6 < |f_{1n}|/f_t < 5.0 \quad (A);$$

$$0.08 < |f_{2n}|/f_t < 0.35 \quad (B); \text{ and}$$

$$5.0 < |f_{1n}|/|f_{2n}| < 25.0 \quad (C),$$

in which $f_{1n}$ is a focal length of the negative lens of the first lens unit, $f_{2n}$ is a focal length of the negative lens of the second lens unit, and $f_t$ is a focal length of the zoom lens system in the telephoto end.

25. The zoom lens system according to claim 23, which satisfies the following condition:

$$1.4 < |f_{1n}|/f_{1p} < 4.5 \quad (D),$$

in which $f_{1p}$ is a focal length of the positive lens of the first lens unit, and $f_{1n}$ is a focal length of the negative lens of the first lens unit.

26. The zoom lens system according to claim 23, wherein the positive lens of the second lens unit is a meniscus lens having a convex shape which faces the object side and which satisfies the following condition:

$$-5.0 < SF_{2p} < -1.0 \quad (3A),$$

in which $SF_{2p}$ is defined by $SF_{2p} = (R_{2pf} + R_{2pr})/(R_{2pf} - R_{2pr})$, $R_{2pf}$ is a paraxial radius of curvature of an object-side surface of the positive lens of the second lens unit, and $R_{2pr}$ is a paraxial radius of curvature of an image-side surface of the positive lens of the second lens unit.

27. The zoom lens system according to claim 23, which satisfies the following condition:

$$0.12 < |f_2|/f_t < 0.60 \quad (4A),$$

in which $f_2$ is a focal length of the second lens unit, and $f_t$ is a focal length of the zoom lens system in the telephoto end.

28. The zoom lens system according to claim 23, which satisfies the following conditions:

$$1.88 < n_{d2p} < 2.20 \quad (1A); \text{ and}$$

$$13.0 < v_{d2p} < 30.0 \quad (2A),$$

in which $n_{d2p}$ is a refractive index of the positive lens of the second lens unit for the d-line, and $v_{d2p}$ is the Abbe number of the positive lens of the second lens unit.

29. The zoom lens system according to claim 23, wherein the negative lens of the second lens unit is a double-concave lens which satisfies the following condition:

$$0.35 < SF_{2n} < 1.00 \quad (7A),$$

in which $SF_{2n}$ is defined by $SF_{2n} = (R_{2nf} + R_{2nr})/(R_{2nf} - R_{2nr})$, $R_{2nf}$ is a paraxial radius of curvature of an object-side surface of the negative lens of the second lens unit, and $R_{2nr}$ is a paraxial radius of curvature of an image-side surface of the negative lens of the second lens unit.

30. The zoom lens system according to claim 23, wherein at least one lens surface of the negative lens of the second lens unit is an aspherical surface, and satisfies the following condition:

$$0.030 < (|ASP_{2nf}| + |ASP_{2nr}|)/f_w < 0.320 \quad (8A),$$

in which $ASP_{2nf}$ is an aspherical displacement of an object-side surface of the negative lens of the second lens unit, $ASP_{2nr}$ is an aspherical displacement of an image-side surface of the negative lens of the second lens unit, and $f_w$ is a focal length of the zoom lens system in the wide-angle end.

31. The zoom lens system according to claim 30, wherein said at least one aspherical surface of the negative lens of the second lens unit has a refractive power of a portion of which increases as the portion of the aspherical surface comes away from an optical axis.

32. The zoom lens system according to claim 29, wherein the negative lens of the second lens unit is a double-concave lens, and each of an object-side surface and an image-side surface of the double-concave lens is an aspherical surface, and each of the object-side surface and the image-side surface of the double-concave lens has a refractive power of a portion of which increases as the portion of the aspherical surface comes away from an optical axis.

33. The zoom lens system according to claim 23, wherein the first lens unit includes two lenses of a negative lens and a positive lens in order from the object side.

34. The zoom lens system according to claim 33, wherein the negative lens is cemented to the positive lens in the first lens unit.

35. The zoom lens system according to claim 33, wherein the negative lens and the positive lens of the first lens unit are single lenses, respectively, which are arranged separately.

36. The zoom lens system according to claim 35, wherein an axial space between the negative lens and the positive lens of the first lens unit satisfies the following condition:

$$0.0 < L_{1np}/L_1 < 0.2 \quad (9A),$$

in which $L_{1np}$ is the axial space between the negative lens and the positive lens of the first lens unit, and $L_1$ is a total axial thickness of the first lens unit.

37. The zoom lens system according to claim 23, wherein the total number of the lenses of the third lens unit is three or less.

38. The zoom lens system according to claim 37, wherein the third lens unit includes a positive lens and a negative lens in order from the object side, and
the total number of the lenses of the third lens unit is two.

39. The zoom lens system according to claim 37, wherein the third lens unit includes three lenses of a positive lens, a positive lens and a negative lens in order from the object side.

40. The zoom lens system according to claim 39, wherein the negative lens of the third lens unit is cemented to the adjacent positive lens on the object side.

41. The zoom lens system according to claim 23, which satisfies the following condition:

$$0.50 < f_1/f_t < 2.00 \quad (10A),$$

in which $f_1$ is a focal length of the first lens unit, and $f_t$ is a focal length of the zoom lens system in the telephoto end.

42. The zoom lens system according to claim 23, which satisfies the following condition:

$$0.16 < f_3/f_t < 0.80 \quad (11A),$$

in which $f_3$ is a focal length of the third lens unit, and $f_t$ is a focal length of the zoom lens system in the telephoto end.

43. The zoom lens system according to claim 23, which satisfies the following condition:

$$0.24 < f_4/f_t < 0.80 \quad (12A),$$

in which $f_4$ is a focal length of the fourth lens unit, and $f_t$ is a focal length of the zoom lens system in the telephoto end.

44. The zoom lens system according to claim 23, wherein during the zooming from the wide-angle end to the telephoto end,
the first lens unit moves so as to be positioned closer to the object side in the telephoto end than in the wide-angle end,
the second lens unit moves,
the third lens unit moves toward only the object side, and
the fourth lens unit moves, and
the aperture stop is arranged between the second lens unit and the third lens unit, and moves integrally with the third lens unit in the optical axis direction during the zooming.

45. The zoom lens system according to claim 23, which is a four-unit zoom lens system, the total number of lens units included in the zoom lens system being four.

46. The zoom lens system according to claim 23, wherein the fourth lens unit has a positive refractive power.

47. An electronic image pickup apparatus comprising:
the zoom lens system according to claim 23; and
an electronic image pickup device which is arranged on an image side of the zoom lens system and which converts an optical image formed by the zoom lens system into an electric signal.

48. A zoom lens system comprising: in order from an object side,
a first lens unit having a positive refractive power;
a second lens unit having a negative refractive power;
a third lens unit having a positive refractive power; and
a fourth lens unit having a refractive power,
during zooming from a wide-angle end to a telephoto end,
a space between the first lens unit and the second lens unit, a space between the second lens unit and the third lens unit and a space between the third lens unit and the fourth lens unit being changed,
the total number of the lenses of the first lens unit is two or less,
the second lens unit including two lenses of a negative lens and a positive lens in order from the object side,
the third lens unit including a positive lens and a negative lens in order from the object side, the total number of the lenses of the third lens unit being two,
the zoom lens system further comprises an aperture stop,
during the zooming from the wise-angle end to the telephoto end, the first, second, third and fourth lens units being moved so that the space between the first lens unit and the second lens unit enlarges, the space between the second lens unit and the third lens unit narrows and the space between the third lens unit and the fourth lens unit enlarges,
the aperture stop being moved together with the third lens unit in an optical axis direction, and
wherein the following conditions are satisfied:

$$1.88 < n_{d2p} < 2.20 \quad (1A); \text{ and}$$

$$13.0 < v_{d2p} < 30.0 \quad (2A),$$

in which $n_{d2p}$ is a refractive index of the positive lens of the second lens unit for the d-line, and $v_{d2p}$ is the Abbe number of the positive lens of the second lens unit.

49. A zoom lens system comprising: in order from an object side,
a first lens unit having a positive refractive power;
a second lens unit having a negative refractive power;
a third lens unit having a positive refractive power; and
a fourth lens unit having a refractive power,
during zooming from a wide-angle end to a telephoto end,
a space between the first lens unit and the second lens unit, a space between the second lens unit and the third lens unit and a space between the third lens unit and the fourth lens unit being changed,
the first lens unit includes a negative lens and a positive lens, and the negative lens and the positive lens are single lenses, respectively, which are arranged separately,
the total number of the lenses of the first lens unit is two,
the second lens unit including two lenses of a negative lens and a positive lens in order from the object side,
the negative lens of the second lens unit is a double-concave lens, and each of an object-side surface and an image-side surface of the double-concave lens is an aspherical surface, and
wherein the following conditions are satisfied:

$$1.88 < n_{d2p} < 2.20 \quad (1A); \text{ and}$$

$$13.0 < v_{d2p} < 30.0 \quad (2A),$$

in which $n_{d2p}$ is a refractive index of the positive lens of the second lens unit for the d-line, and $v_{d2p}$ is the Abbe number of the positive lens of the second lens unit.

* * * * *